United States Patent [19]

Hoppe et al.

[11] Patent Number: 5,340,928

[45] Date of Patent: * Aug. 23, 1994

[54] REACTIVE DYESTUFF CONTAINING TRIAZINYL AND HALOPYRIMIDINE MOIETIES

[75] Inventors: Manfred Hoppe, Kürten; Karl-Josef Herd, Odenthal-Holz; Thomas Eizenhöfer, Köln; Wolfgang Harms, Odenthal; Hermann Henk, Köln; Klaus Kunde, Neunkirchen-Seelscheid; Wolfram Reddig, Bergisch Gladbach, all of Fed. Rep. of Germany

[73] Assignee: Bayer Aktiengesellschaft, Leverkusen, Fed. Rep. of Germany

[*] Notice: The portion of the term of this patent subsequent to Dec. 28, 2010 has been disclaimed.

[21] Appl. No.: 880,110

[22] Filed: May 6, 1992

[30] Foreign Application Priority Data

May 15, 1991 [DE] Fed. Rep. of Germany ....... 4115833
May 28, 1991 [DE] Fed. Rep. of Germany ....... 4117387

[51] Int. Cl.$^5$ .................. C09B 62/022; D06P 1/382
[52] U.S. Cl. .................. 534/618; 534/617; 534/624; 534/632; 534/634; 540/126; 544/76; 544/189; 544/193.1; 544/208; 544/209
[58] Field of Search ........... 534/618, 632, 624, 634; 540/126; 544/76, 189, 193.1, 208, 209

[56] References Cited

U.S. PATENT DOCUMENTS

| 4,248,771 | 2/1981 | Scholl et al. ............ 534/634 X |
| 4,330,469 | 5/1982 | Gati et al. ............ 540/126 |
| 4,806,640 | 2/1989 | Harms et al. ............ 544/76 |

FOREIGN PATENT DOCUMENTS

| 97119 | 12/1983 | European Pat. Off. ............ 534/634 |
| 345577 | 12/1989 | European Pat. Off. ............ 534/632 |
| 1450102 | 10/1965 | France . |
| 2341626 | 9/1977 | France . |
| 2417532 | 9/1979 | France . |
| 1115778 | 5/1968 | United Kingdom . |
| 1530104 | 10/1978 | United Kingdom . |
| 2200131 | 7/1988 | United Kingdom ............ 534/634 |
| 2039289 | 8/1988 | United Kingdom ............ 534/634 |

OTHER PUBLICATIONS 84-1001470/01, "Dyes cont'g fluoro-triazinyl and tri:-halo...", Chem.Ab.J-5, Textiles;Paper;Cellulose, p. 14 (J5-F). (1984).
100:122758g, K. Seitz, "Reactive Dyes", Chem. Ab., V100, (1984) pp. 81-82.

Primary Examiner—Mary C. Lee
Assistant Examiner—Fiona T. Powers
Attorney, Agent, or Firm—Sprung Horn Kramer & Woods

[57] ABSTRACT

Reactive dyestuffs of the formula (1)

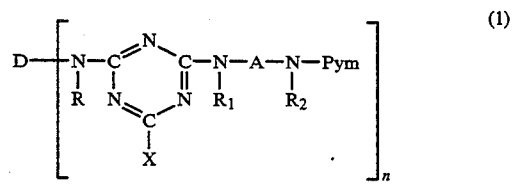

in which
D denotes the radical of an organic dyestuff,
R, R$_1$ and R$_2$, independently of one another, denote hydrogen or substituted or unsubstituted C$_{1-4}$-alkyl,
A denotes a substituted or unsubstituted aliphatic, aromatic or aromatic-aliphatic bridging member,
X denotes Cl, F
Pym denotes the radicals

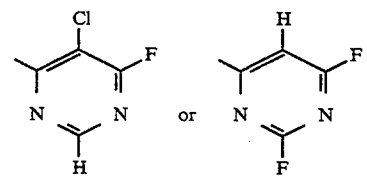

n denotes 1 or 2, are suitable in particular for the dyeing of cellulose fibres.

13 Claims, No Drawings

REACTIVE DYESTUFF CONTAINING TRIAZINYL AND HALOPYRIMIDINE MOIETIES

The invention relates to new reactive dyestuffs, their preparation and their use.

Reactive dyestuffs are disclosed, for example, in EP-A-97 119. However, the reactive dyestuffs mentioned there still have disadvantages, for example in the fastness properties.

The present invention relates to reactive dyestuffs of the formula (1)

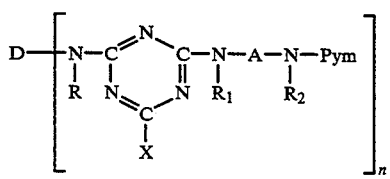

in which
D denotes the radical of an organic dyestuff,
R, $R_1$ and $R_2$, independently of one another, denote hydrogen or substituted or unsubstituted $C_{1-4}$-alkyl,
A denotes a substituted or unsubstituted aliphatic, aromatic or aromatic-aliphatic bridging member,
Pym denotes the radicals

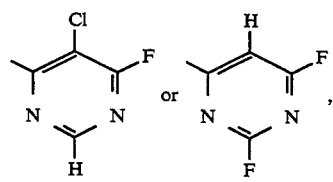

X denotes Cl, F
n denotes 1 or 2.

Particularly preferred reactive dyestuffs have the following formulae (1a) and (1b)

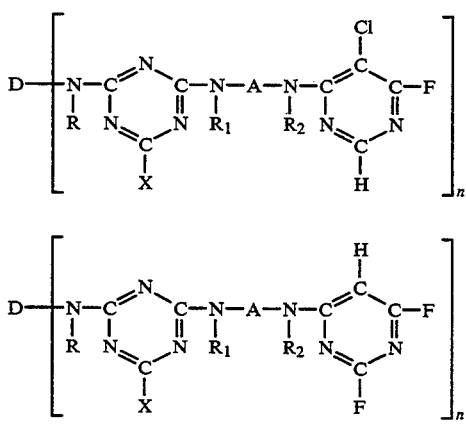

in which
D, R, $R_1$, $R_2$, A, X and n have the abovementioned meaning.

The radical D is in particular the radical of a sulpho-containing organic dyestuff from the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarboximide series.

1 or 2 bireactive fluorotriazinylfluoropyrimidine groupings can be bound to the dyestuff radical D in formula (1). If the dyestuff 2 contains groupings of this type (where n is 2), they are independent of one another and can thus be identical or different with respect to the radicals R, $R_1$, $R_2$ or A.

The radical D in formula (1) can be substituted in the usual manner and contains in particular one or more sulpho groups. Examples of further substituents on the radical D are: alkyl groups having 1 to 4 carbon atoms, such as methyl, ethyl, propyl, isopropyl and butyl, alkoxy groups having 1 to 4 carbon atoms, such as methoxy, ethoxy, propoxy, isopropoxy and butoxy, acylamino groups having 1 to 6 carbon atoms, such as acetylamino and propionylamino, benzoylamino, amino, alkylamino having 1 to 4 carbon atoms, phenylamino, alkoxycarbonyl having 1 to 4 carbon atoms in the alkoxy radical, nitro, cyano, trifluoromethyl, halogen, such as fluorine, chlorine and bromine, sulphamoyl, carbamoyl, ureido, hydroxyl, carboxyl, sulphomethyl and sulpho. Those reactive dyestuffs in which D is the radical of an azo dyestuff contain as substituents in particular methyl, ethyl, methoxy, benzoylamino, amino, acetylamino, ureido, sulphomethyl, hydroxyl, carboxyl, halogen and sulpho.

A suitable alkyl radical for R, $R_1$ and $R_2$ in formula (1) is a straight-chain or branched alkyl radical which may also be substituted, for example by halogen, sulphato, carboxyl, hydroxyl, cyano or sulpho. Examples of R are: methyl, ethyl, propyl, isopropyl, butyl, isobutyl, sec.-butyl, tert.-butyl, β-chloroethyl, β-hydroxyethyl, β-hydroxybutyl, β-cyanoethyl, β-sulphatoethyl, carboxymethyl and sulphomethyl. Preferred groups $R_1$ and $R_2$ are: hydrogen, methyl, ethyl, β-hydroxyethyl and β-sulphatoethyl.

A is preferably an alkylene, arylene or aralkyl radical. The term aliphatic bridging member also includes cycloaliphatic radicals. Thus, A can be a long (for example having 10 or more carbon atoms) or relatively short, straight-chain or branched alkylene radical; in particular, an alkylene radical having 2 to 6 carbon atoms is suitable, for example ethylene, propylene, butylene, hexylene or cyclohexylene. As an arylene radical, A is, for example, a naphthylene radical, the radical of a diphenyl or stilbene or in particular a phenylene radical. The radical A can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propyloxy and isopropyloxy, carboxyl, hydroxyl or sulpho. A is preferably $C_{2-6}$-alkylene or substituted or unsubstituted phenylene. Preference is given to the ethylene, propylene, phenylene and sulphophenylene radical.

Preferred subgroups of the reactive dyestuffs of the formula (1) are:
a) reactive dyestuffs of the formula (1) in which
D is the radical of a sulpho-containing organic dyestuff from the mono- or polyazo, metal complex azo, anthraquinone, phthalocyanine, formazan or dioxazine series,
Pym has the abovementioned meaning,
n is 1 or 2,
X is Cl or F and
R represents hydrogen, methyl or ethyl, $R_1$, $R_2$, independently of one another, represent H or $C_1$–$C_4$-alkyl which may be substituted by OR, $OSO_3H$, $SO_3H$, COOR or halogen, A represents a substituted or unsubstituted phenylene or a substituted or unsubstituted aromatic-aliphatic bridging member or a straight-chain or branched $C_1$–$C_6$-alkylene which may be interrupted by hetero atoms or groupings containing hetero atoms such as NR, O or S and which may be substituted by OR, $OSO_3H$, $SO_3H$, COOR or halogen.

Within the bridging member A, NR together with $NR_1$ or $NR_2$ can also form a heterocyclic, aliphatic ring.

b) Dyestuffs of the formula (1) in which
A, D, n, R, $R_1$ and $R_2$ have the meaning as in a) and X is F.

c) Reactive dyestuffs of the formula

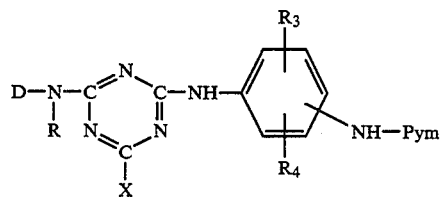

in which

D, X, R and Pym have the same meanings as in a) and
$R_3$ and $R_4$, independently of one another, are hydrogen, methyl, ethyl, methoxy, ethoxy, chlorine, carboxyl or sulpho.

d) Reactive dyestuffs according to c), in which
D, X, R and Pym have the same meanings as in c) and
$R_3$ and $R_4$, independently of one another, are hydrogen or sulpho.

e) Reactive dyestuffs of the formulae

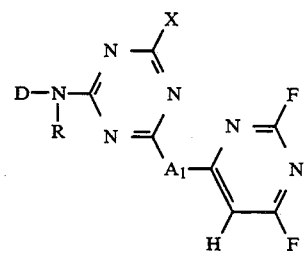

and

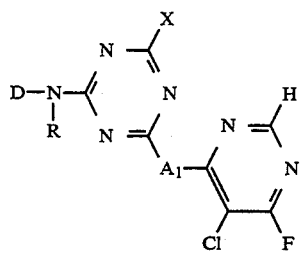

in which

D, X and R have the same meanings as in a) and
$A_1$ represents an aliphatic, straight-chain or branched $C_1$–$C_6$-diaminoalkylene which may be interrupted by hetero atoms or groupings containing hetero atoms such as $NR_1$, O or S and which may be substituted by OR, $OSO_3H$, $SO_3H$, COOR or halogen. This also includes hetero- and carbocyclic aliphatic diamines.

$R_1$ has the same meaning as in a).
Preferred aliphatic diamines are:

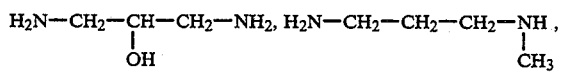

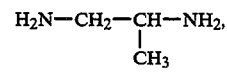

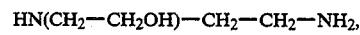

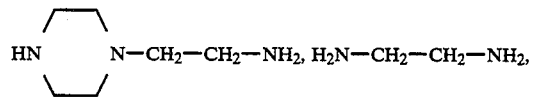

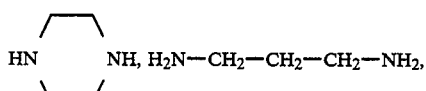

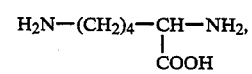

f) Reactive dyestuffs of the formulae

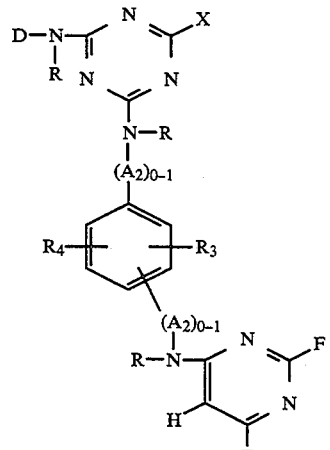

and

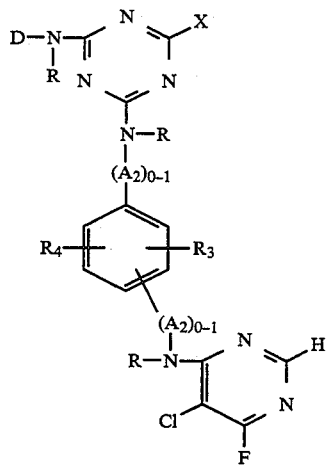

in which

D, X and R have the same meanings as in a) and

R₃ and R₄, independently of one another, are H, methyl, ethyl or sulpho and

A₂ represents an aliphatic, straight-chain or branched $C_1$-$C_6$ bridging member which may be interrupted by hetero atoms or groupings containing hetero atoms such as NR₁, O or S and which may be substituted by OR, OSO₃H, SO₃H, COOR or halogen.

They also include hetero- and carbocyclic aliphatic linking members.

g) Reactive dyestuffs according to c), d), e) and f), in which

X represents F.

The reactive dyestuffs of the formula (1) are preferably prepared by condensing an organic dyestuff of the formula

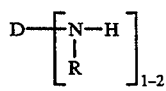
(5)

or a dyestuff precursor, 2,4,6-trifluoro-s-triazine or 2,4,6-trichloro-s-triazine, a compound of the formula

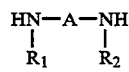
(6)

and 2,4,6-trifluoropyrimidine or 4,6-difluoro-5-chloropyrimidine with one another, in which D, R, R₁, R₂ and A have the meanings given in the abovementioned formulae under formula (1) and, if dyestuff precursors are used, by converting the intermediates obtained into the desired final dyestuffs.

In the process described above, the individual process steps can be carried out in a different order, if desired some of them may also be carried out simultaneously. For this, various process variants are possible. In general, the reaction is carried out stepwise in succession.

Which of the possible process variants gives the best results or under which special conditions, for example at which condensation temperature, it is most advantageous to carry out the reaction depends on the structure of the starting materials.

Important process variants are characterised in that:
1. an organic dyestuff of the formula (5) is condensed with 2,4,6-trifluoro-s-triazine or 2,4,6-trichloro-s-triazine, furthermore a compound of the formula (6) is condensed with 2,4,6-trifluoropyrimidine or 4,6-difluoro-5-chloropyrimidine, and both intermediates are condensed with one another;
2. an organic dyestuff of the formula (5) is condensed with 2,4,6-trifluoro-s-triazine or 2,4,6-trichloro-2-triazine, the primary condensation product is condensed with a compound of the formula (6), and the secondary condensation product obtained is condensed with 2,4,6-trifluoropyrimidine or 4,6-difluoro-5-chloropyrimidine;
3. a compound of the formula (6) is condensed with 2,4,6-trifluoropyrimidine or 4,6-difluoro-5-chloropyrimidine, the primary condensation product is condensed with 2,4,6-trifluoro-s-triazine or 2,4,6-trichloro-s-triazine, and the resulting intermediate is condensed with an organic dyestuff of the formula (5);
4. 2,4,6-trifluoro-s-triazine or 2,4,6-trichloro-s-triazine is condensed with a compound of the formula (6), the primary condensation product is condensed with an organic dyestuff of the formula (5), and the secondary condensation product obtained is condensed in a last step with 2,4,6-trifluoropyrimidine or 4,6-difluoro-5-chloropyrimidine.

The condensation reactions of organic dyestuffs (5), dyestuff precursors and diamines (6) with 2,4,6-trifluoro-s-triazine, 2,4,6-trichloro-s-triazine, 2,4,6-trifluoropyrimidine or 4,6-difluoro-5-chloropyrimidine or their primary condensation products are carried out by known processes, preferably in aqueous or aqueous-organic media in the presence of acid-binding agents.

The formulae given are those of the free acids. The preparation in general gives the salts, in particular the alkali metal salts such as sodium salts, potassium salts or lithium salts. The dyestuffs can also be used as concentrated solutions.

The dyestuffs according to the invention are highly suitable for the dyeing and printing of natural and synthetic OH— or amido-containing materials, in particular those made of cellulose and polyamides. They are particularly suitable for the dyeing of cellulose materials by the exhaust and cold pad-batch methods, and for the printing of cotton and staple viscose.

Dyeings having good general fastness properties, in particular wet fastness properties, in combination with good build-up properties and high fixation yields are obtained.

Below, possible starting materials which can be used for the preparation of the reactive dyestuffs of the formula (1) are mentioned individually.

Suitable dyestuffs of the formula (5) are in particular dyestuffs of the following structural types:

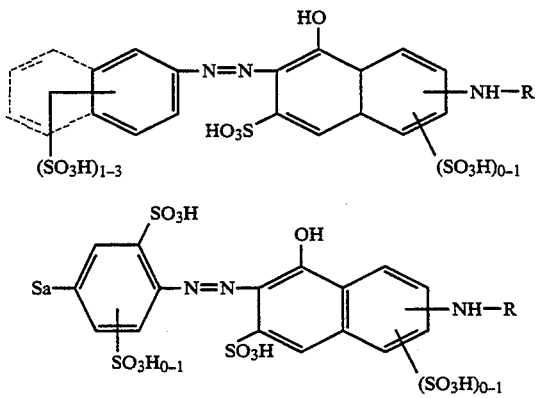

where Sa is H₅C₂—O— or H₃C—O—

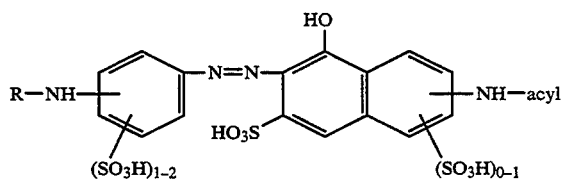

-continued
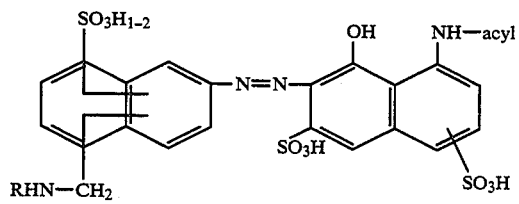
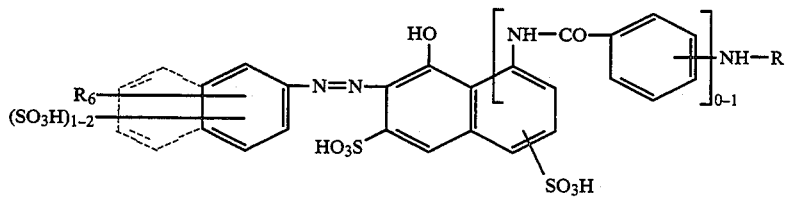
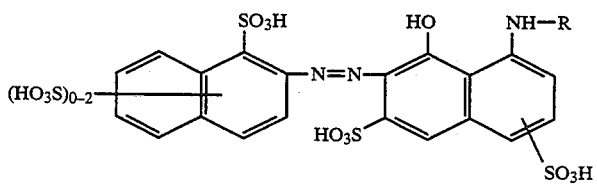
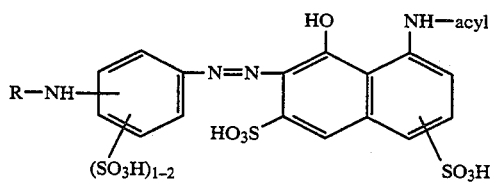
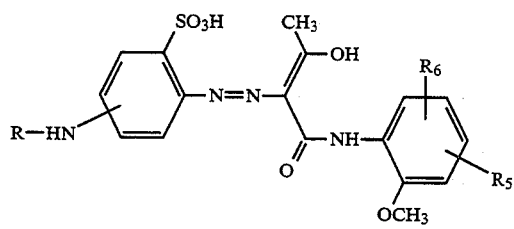
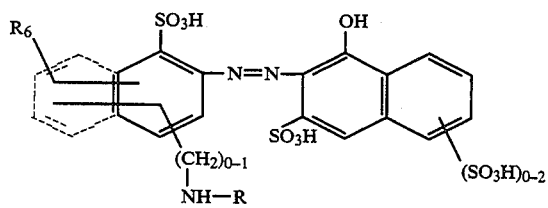
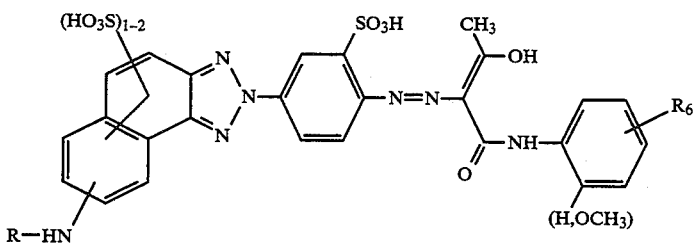

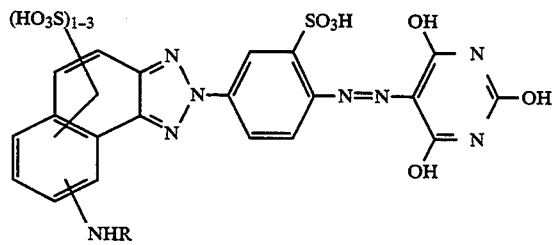

in which acyl is, for example, acetyl or substituted or unsubstituted benzoyl,

R is H, $CH_3$ or $C_2H_5$, $R_5$ is H, $CH_3$, $OCH_3$ or Cl, $R_6$ is H, $C_1$–$C_4$-alkyl, $C_1$–$C_4$-alkoxy, Cl, Br, COOH, $SO_3H$.

Metal complexes of dyestuffs of the formulae:

in which $R_7$ is H, OH, $NH_2$, $NHCOCH_3$, NHCOPh, Cl, $C_1$–$C_4$-alkoxy or $C_1$–$C_4$-alkyl.

Preferred metal atoms are Cu (1:1 complex) or Cr and Co (1:2 complex). Cr complexes and Co complexes can contain the azo compound of the abovementioned formula once or twice, i.e. they can have a symmetrical structure or, together with any other ligand groups, an unsymmetrical structure.

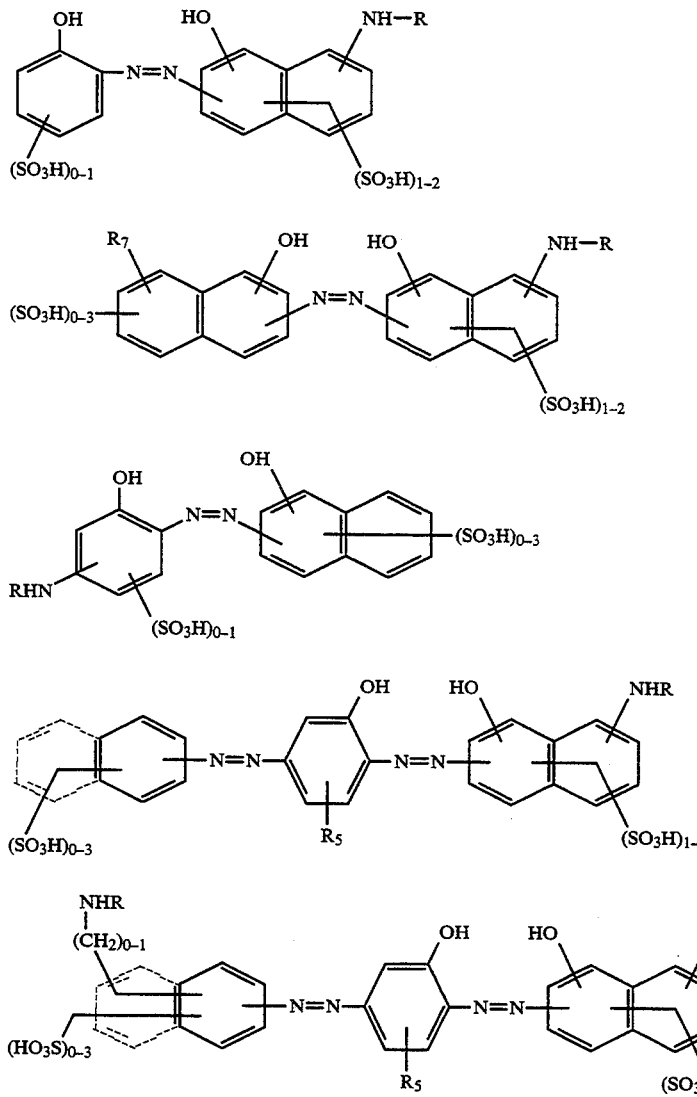

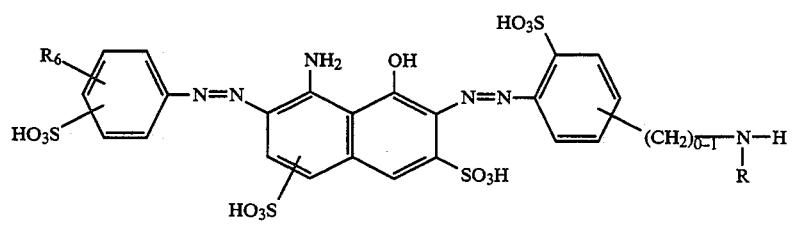
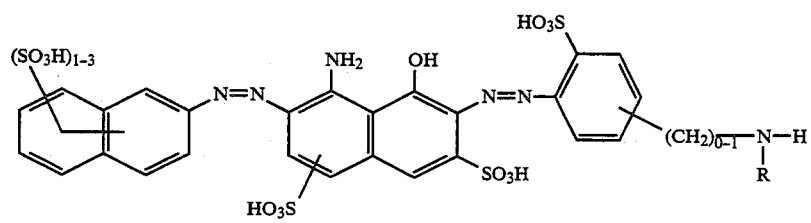
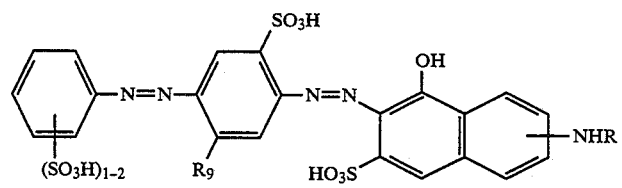
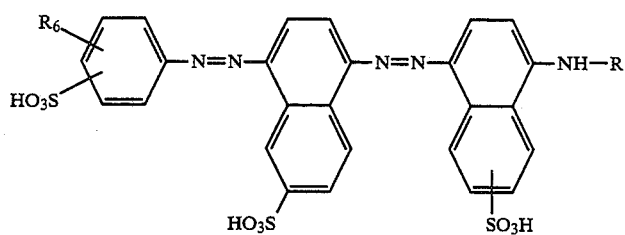
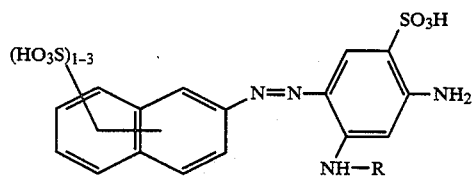
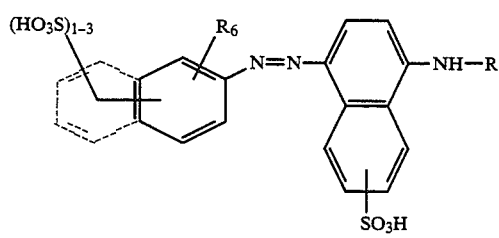
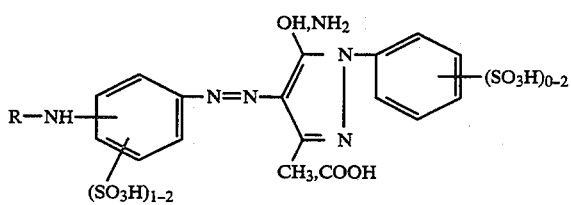
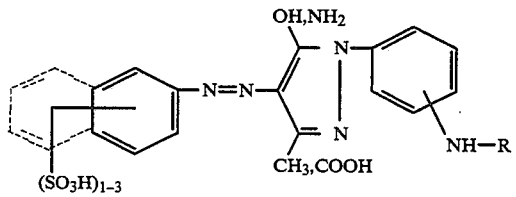

-continued

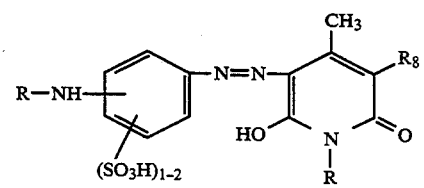

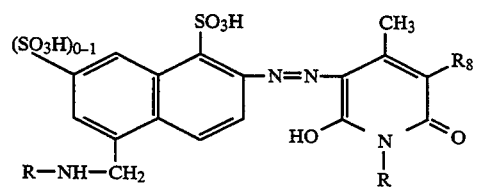

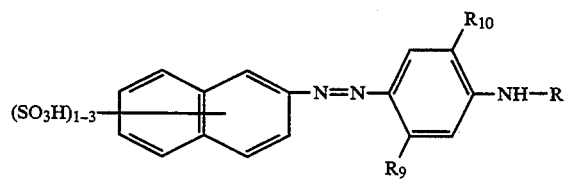

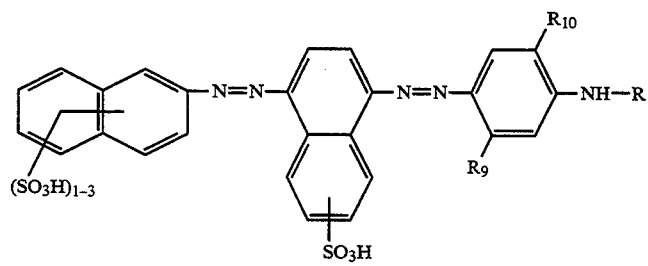

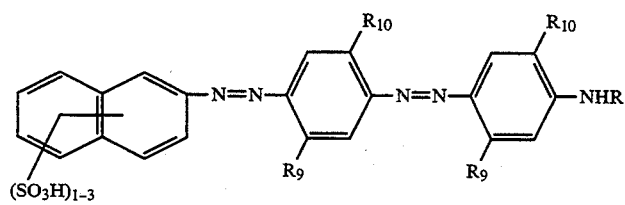

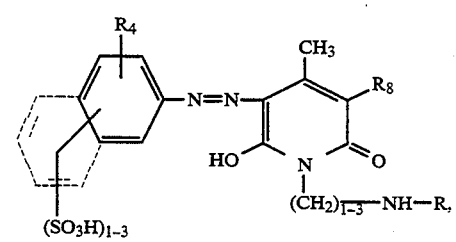

in which
$R_8$ is H, $SO_3H$, $CH_2SO_3H$, Cl, $C_1$-$C_4$-alkylsulphonyl, CN, carboxamide, in particular $CONH_2$,
$R_9$ is H, $C_1$-$C_4$-alkyl, $C_1$-$C_4$-alkoxy, acylamino, in particular $C_1$-$C_4$-alkylcarbonylamino or arylcarbonylamino, such as, for example, substituted or unsubstituted phenylcarbonylamino, $C_1$-$C_4$-alkylsulphonylamino, Cl, Br, aminocarbonylamino, $C_1$-$C_4$-alkylsulphonylamino, arylsulphonylamino,
$R_{10}$ is H, $C_1$-$C_4$-alkyl, $C_1$-$C_4$-alkoxy, OH, $SO_3H$.

The fused rings indicated by dashed lines represent naphthalene systems which are possible as an alternative.

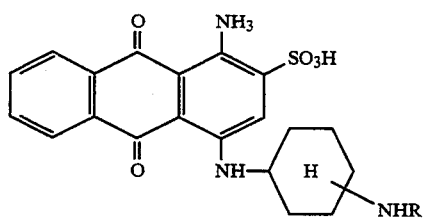

-continued
$R_5$ is H, methyl, methoxy, chlorine
$R_{11}$ is H, $SO_3H$ and
R is H, methyl, ethyl.
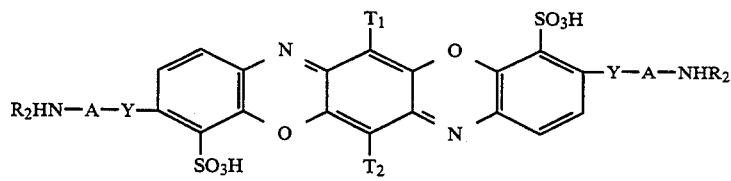
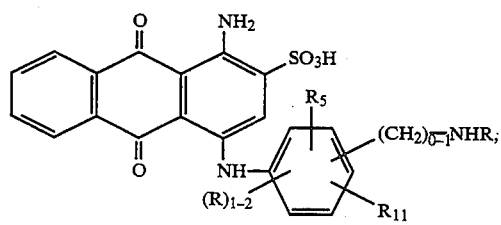
in which
in which
Y is
O and
$T_1$, $T_2$ are H, Cl, Br, $C_1$-$C_2$-alkyl, $OCH_3$, $OC_2H_5$, acylamino $C_1$-$C_2$-alkoxycarbonyl.
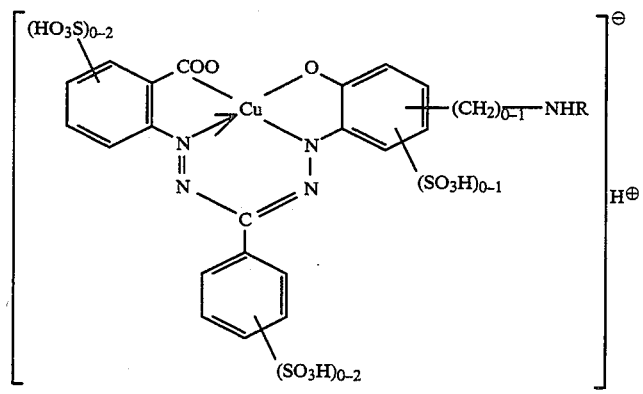
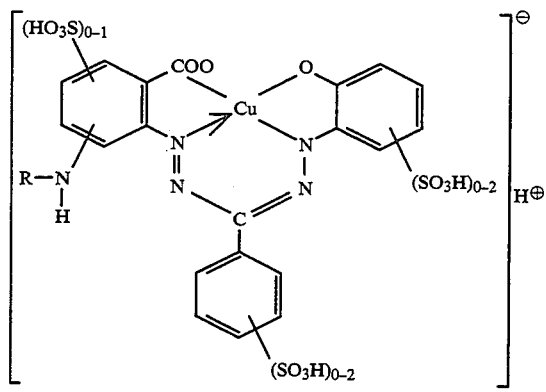

-continued
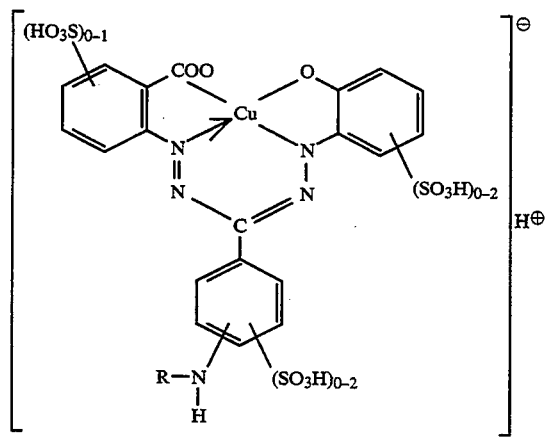
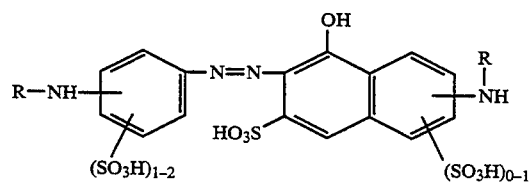
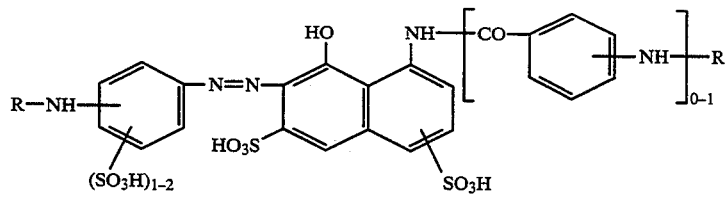
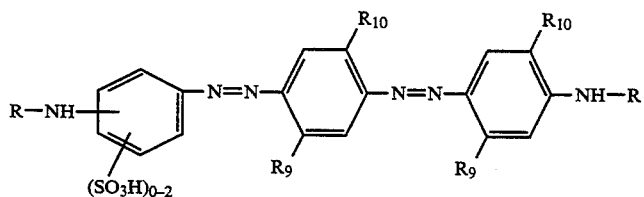
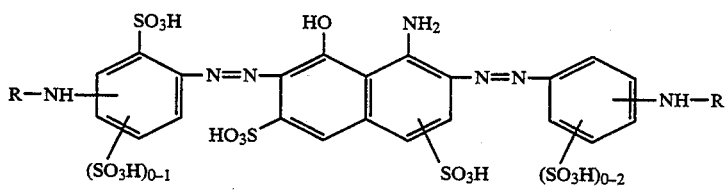
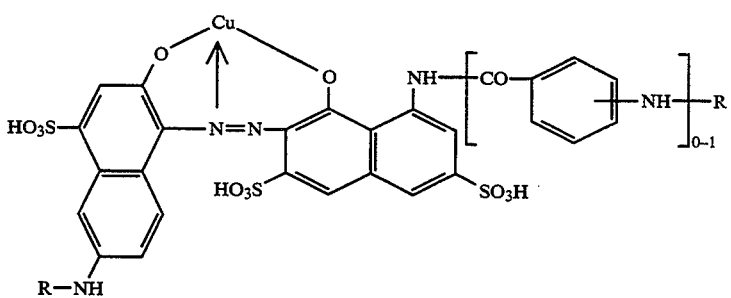

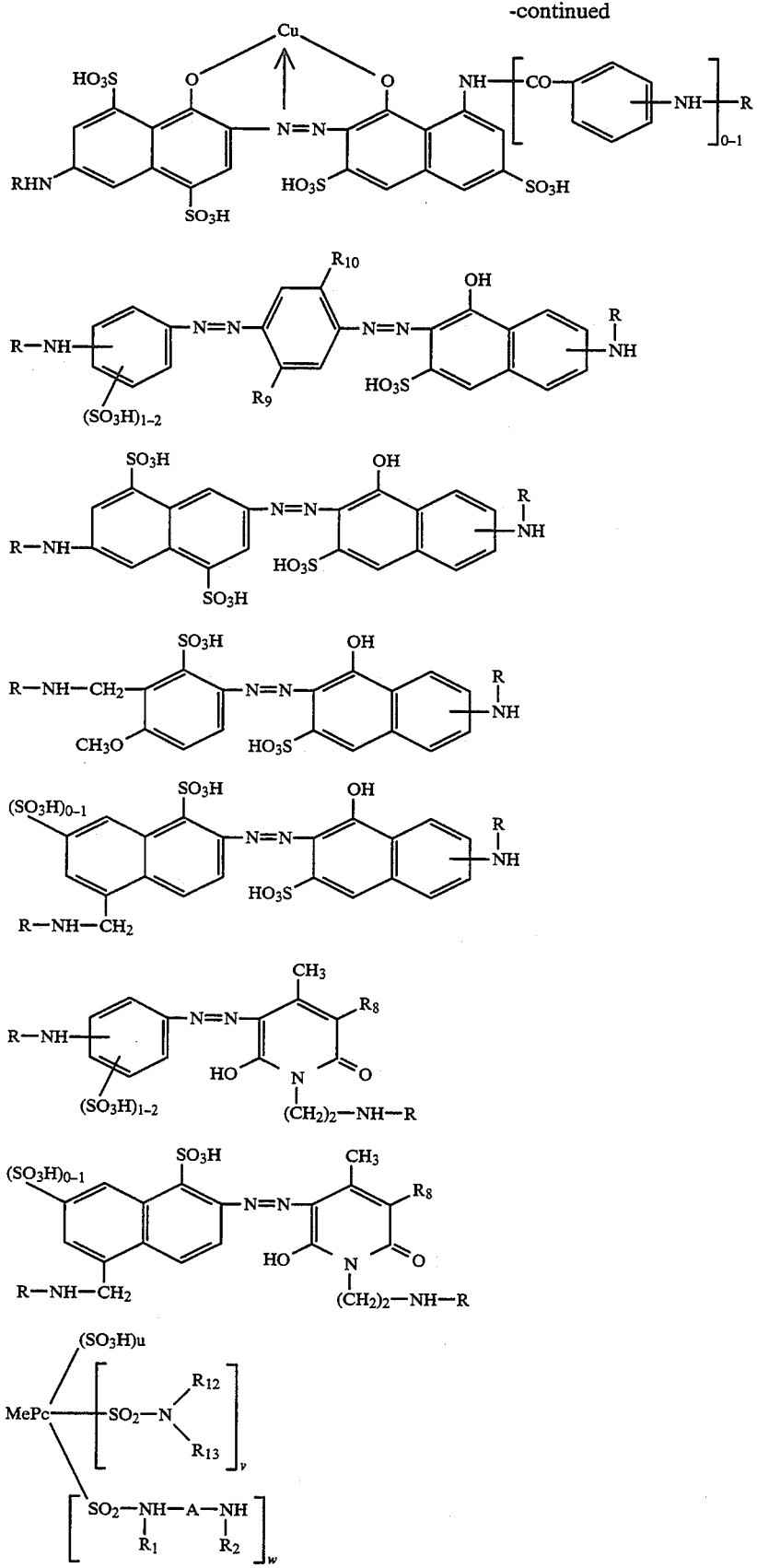
in which
Me is Cu, Ni,
u+v+w is 3.4–4.0, with the proviso that
u is 0.8–2.0,
v is 0–1.0,
w is 1.0–3.0 and $R_1$, $R_2$ and A have the abovementioned meanings,
$R_{12}$ and $R_{13}$ are H, $C_1$–$C_2$-alkyl, which is substituted or unsubstituted by OH, $OSO_3H$, $SO_3H$ or COOH.

bonylamino, $C_1$–$C_4$-alkylsulphonylamino, substituted or unsubstituted phenylsulphonylamino, Me is a divalent metal atom, preferably Fe, Cu, Zn, Co,

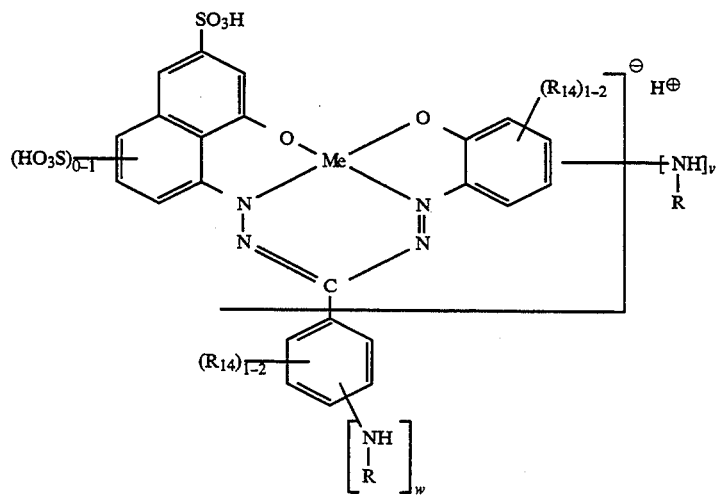

v, w are 0 or 1, where w is not equal to v,

Ni,

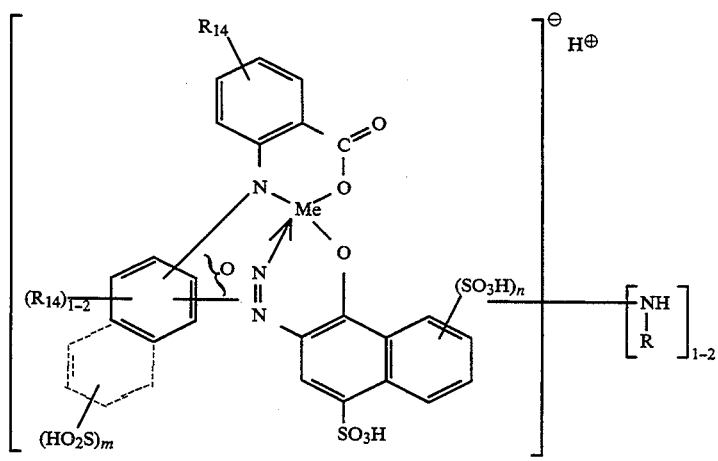

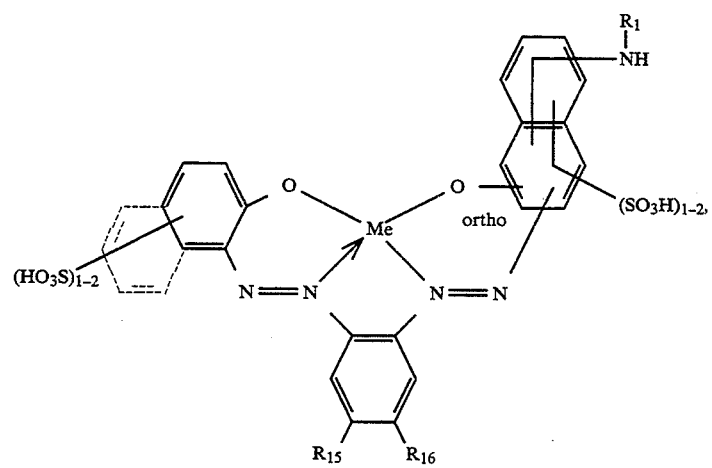

in which $R_{14}$ is H, $C_1$–$C_4$-alkyl, $C_1$–$C_4$-alkoxy, OH, halogen, COOH, $NO_2$, $SO_3H$, sulphonamido, $C_1$–$C_4$-alkylcarbonylamino, substituted or unsubstituted phenylcar- $R_{15}$ is $C_1$–$C_4$-alkyl, halogen, in particular chlorine, $C_1$–$C_4$-alkoxy, $C_1$–$C_4$-alkylcarbonylamino, arylcarbonylamino, aralkylcarbonylamino, $R_{16}$ is $C_1$–$C_4$-alkoxy, or $R_{15}$ and $R_{16}$ form a ring and have the following meaning:

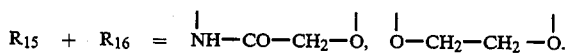

$$R_{15} + R_{16} = \overset{|}{N}H\text{—}CO\text{—}CH_2\text{—}\overset{|}{O}, \quad \overset{|}{O}\text{—}CH_2\text{—}CH_2\text{—}\overset{|}{O}.$$

agent has come to a standstill after several hours and a chromatographic sample indicates the disappearance of the coloured educt, the solution is salted out with 20% of sodium chloride, the dyestuff is filtered off with suction and washed with 20% strength sodium chloride solution and dried at 50° C. in vacuo. The dyestuff of the formula

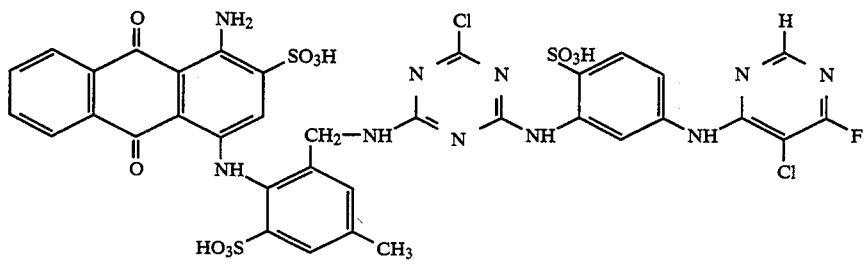

EXAMPLE 1

1.1 18.8 g of 2,4-diaminobenzenesulphonic acid are dissolved in 80 ml of water by neutralisation with 10% strength lithium hydroxide solution, and the solution is condensed at 20° to 30° C. with 15.4 g of 4,6-difluoro-5-chloropyrimidine at a pH of 5.5 to 6.0. After consumption of lithium hydroxide has ended, 19.3 g of cyanuric chloride are added to the solution of the condensation product, the temperature is maintained at 20° to 25° C. and the pH at 5.0 using lithium hydroxide. When no more diazotisable amino group can be detected, the second condensation step is complete and the solution dyes cotton and staple viscose by the known printing and continuous processes in a high fixation yield in brilliant reddish blue shades having excellent wet fastness properties. $\lambda_{max}=621$ nm, 583 nm in $H_2O$.

EXAMPLE 2

If the condensation product obtained from 2,4-diaminobenzene and 4,6-difluoro-5-chloropyrimidine in Example 1.1 is reacted with 14.2 g of cyanuric fluoride instead of cyanuric chloride at 0° to 5° C. and a pH of 4.5 to 5.0 and the difluorotriazinyl product obtained is then condensed with the dyestuff from Example 1.2 at 0° to 10° C. and a pH of 6.0, a dyestuff of the formula

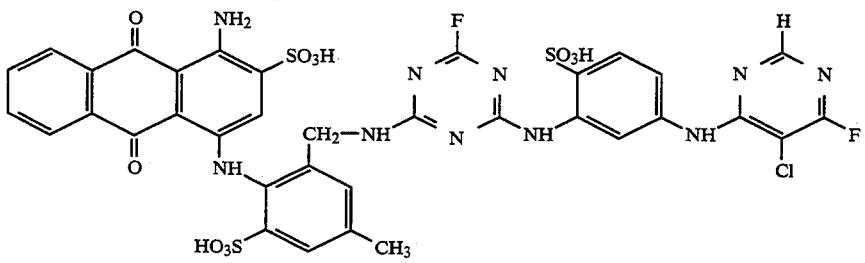

or viscous suspension of the compound

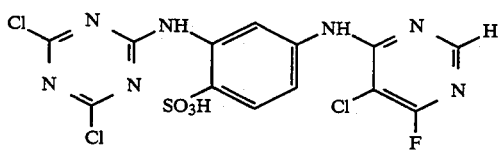

in the form of its lithium salt has been formed.

1.2 46.5 g of 1-amino-4-(2'-aminomethyl-4'-methyl-6'-sulphophenylamino)-anthraquinone-2-sulphonic acid are dissolved in 300 ml of water and 10 g of caprolactam with neutralisation at a pH of 7° and 70° C. After cooling to room temperature, the solution is added to the condensation product from Example 1.1, and the pH in the reaction mixture is maintained at 6.0 to 6.5 with 10% sodium carbonate solution or lithium hydroxide solution. When consumption of the alkaline condensating is obtained, which after a suitable work-up likewise dyes cellulose fibres in high fixation yields in brilliant blue shades. $\lambda_{max}=621$ nm, 583 nm in $H_2O$.

EXAMPLE 3

The condensation product mentioned in Example 2 and prepared from 18.8 g of 2,4-diaminobenzenesulphonic acid, 15.4 g of 4,6-difluoro-5-chloropyrimidine and 14.2 g of cyanuric fluoride is introduced into a neutralised solution of 41.9 g of 1-amino-4-(3'-amino-2'-methyl-5'-sulphophenylamino)-anthraquinone-2-sulphonic acid in 500 ml of water at 10° to 15° C. and the pH is maintained at 5.5 to 6.0 using 10% strength sodium carbonate solution. After the reaction is complete, the dyestuff is salted out with sodium chloride, filtered off with suction and washed with 10% strength sodium chloride solution. The blue powder obtained after drying at 40° C. in vacuo has the formula

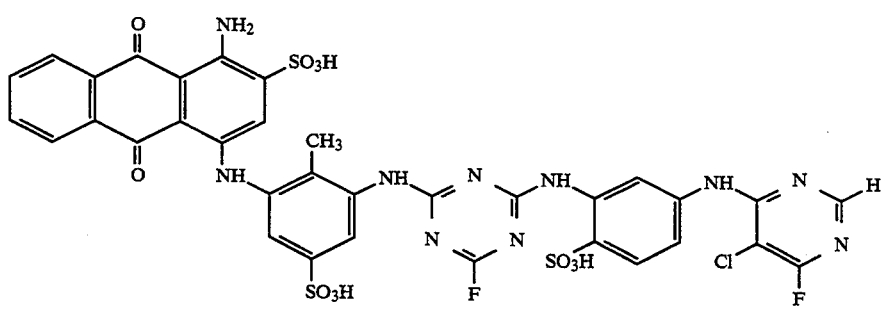

and dyes cotton in neutral blue shades. $\lambda_{max}=611$ nm in $H_2O$.

EXAMPLE 4

39.9 g of 4-amino-6-(4'-fluoro-5'-chloro-6'-pyrimidinylamino)-benzene-1,3-disulphonic acid (prepared by sulphonation of the condensation product from 2,4-diaminobenzenesulphonic acid with 4,6-difluoro-5-chloropyrimidine in 4.5 times the amount of 20 to 30% strength oleum, pouring the oleum solution onto ice-water and removing the sulphuric acid by precipitation with calcium carbonate) are condensed in 250 ml of water with 19.4 g of cyanuric chloride at 15° C. and a pH of 4.5 to 5.0. After condensation is complete, the pH is brought to 7 and the temperature to 20° C.

A solution of 34.8 g of 1-amino-4-(4'-aminocyclohexylamino)-anthraquinone-2-sulphonic acid in 380 ml of water brought to a pH of 11.5 is then run in at such a rate that a pH of 8.5 to 9.8 is maintained in the reaction mixture by simultaneous metering-in of 2N sodium hydroxide solution. The solid obtained is salted out with potassium chloride, filtered off with suction, washed and dried at 50° C. in vacuo. It has the formula

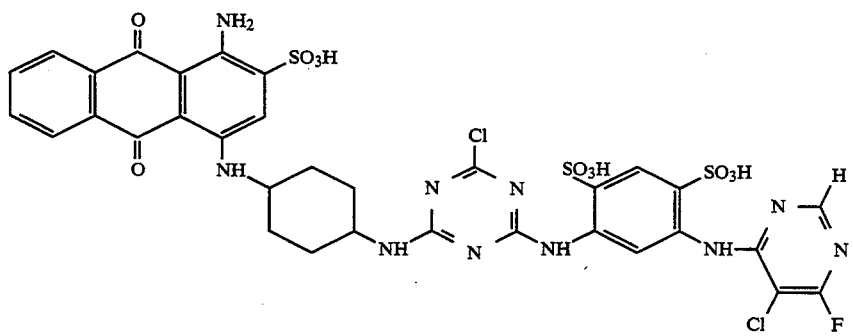

and dyes and prints cellulose fibres by the known techniques in very high fixation yields in bright blue shades. $\lambda_{max}=634$ nm, 592 nm in $H_2O$.

EXAMPLE 5

53.1 g of 1-amino-4-(3'-amino-5'-sulpho-2',4',6'-trimethylphenylamino)-anthraquinone-2-sulphonic acid are dissolved in 530 parts of water at a pH of 6.

12.4 g of cyanuric chloride are dissolved in 100 ml of methyl ethyl ketone, and the solution is poured onto 100 g of ice. The dyestuff solution is then added dropwise to the cyanuric chloride suspension at 0° to 10° C., and the pH in the reaction mixture is maintained at 4.5 with 10% strength sodium carbonate solution. After reaction is complete, 41.8 g of the condensation product obtained from 2,5-diaminobenzene-1,4-disulphonic acid and 4,6-difluoro-5-chloropyrimidine are added in the form of an aqueous sodium salt solution, the pH is maintained at 6.0, the temperature at 25° C. for 3 hours, and later at 35° to 40° C. After condensation is complete, the product is salted out and dried.

The dyestuff obtained of the formula

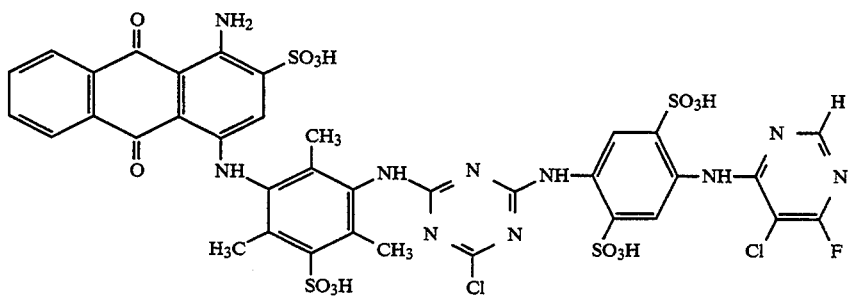

produces on cellulose fibres by the known continuous and printing processes in very high fixation yields brilliant reddish blue dyeings.

EXAMPLE 6

6.1 18.8 g of 2,5-diaminobenzenesulphonic acid are condensed in 150 ml of water with 15.4 g of 4,6-difluoro-5-chloropyrimidine analogously to Example 1.1. 14.2 g of cyanuric fluoride are added dropwise to the solution of the condensation product at 0° to 5° C., and the pH is maintained at 4.5 to 5.0 during this addition. A neutralised solution of 45 g of 1-amino-4-(4'-N-methylamino-methyl-2'-sulpho-phenylamino)-anthraquinone-2-sulphonic acid in 600 ml of water is added to the product formed of the formula phonic acid, 7.7 g of 4,6-difluoro-5-chloropyrimidine and 9.65 g of cyanuric chloride is introduced into a neutralised solution of 21 g of 1-amino-4-(3'-amino-4'-sulpho-phenylamino)-anthraquinone-2-sulphonic acid in 250 ml of water, the temperature is maintained at 25° C. and the pH at 6.0 to 6.5 using 20% strength sodium carbonate solution or 10% strength lithium hydroxide solution. Isolation of the product by salting out, followed by drying, gives a dyestuff of the formula

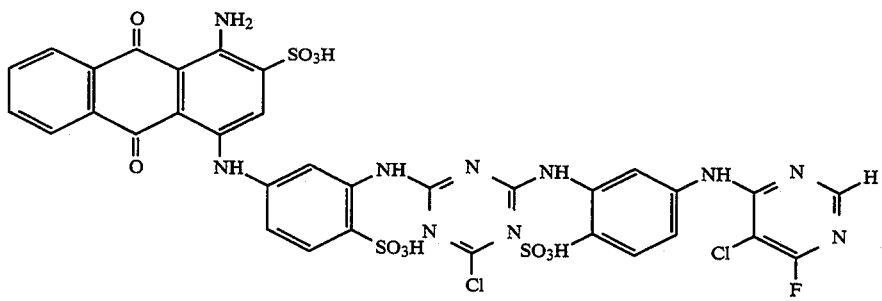

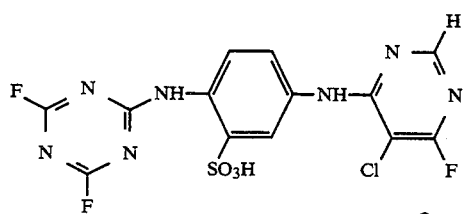

which dyes cotton in high fixation yields in blue shades. $\lambda_{max}=596$ nm in H$_2$O.

In analogy to Examples 1 to 7, the following dyestuffs of the general formula

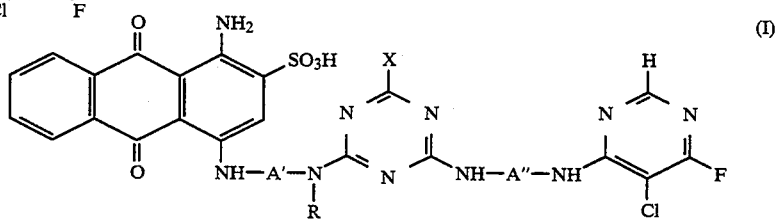

in which the substituents have the meanings given in the table below, can also be prepared.

the pH is maintained at 5.5 to 6.0 and the temperature is allowed to rise gradually to 15° C. over a period of 3 hours. After reaction is complete, the dyestuff is isolated by salting out, buffered at a pH of 6.0 by adding 3% of primary and secondary sodium phosphate and dried. The product of the formula

TABLE 1

| No. | A' | R | X | A" |
|---|---|---|---|---|
| 8 | cyclohexyl | H | F | phenyl-di-SO$_3$H |

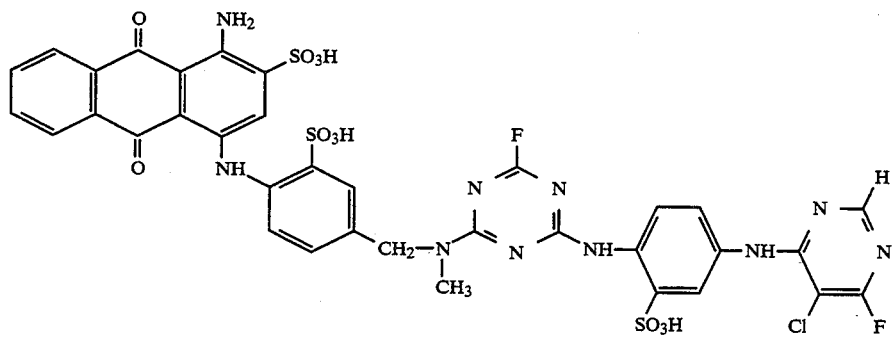

dyes cellulose fibres by the dyeing techniques customary for reactive dyestuffs in neutral blue shades. $\lambda_{max}=600$ nm in H$_2$O.

EXAMPLE 7

The condensation product prepared by the procedure of Example 1.1 from 9.4 g of 2,4-diaminobenzenesul-

| 9 | cyclohexyl | H | F | phenyl-di-SO$_3$H |

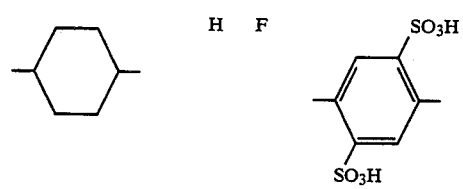

TABLE 1-continued
Table entries 10–24 show chemical structures for columns A', R, X, A''. Values for R and X:
| No. | R | X |
|---|---|---|
| 10 | H | Cl |
| 11 | H | F |
| 12 | H | Cl |
| 13 | H | Cl |
| 14 | H | F |
| 15 | H | F |
| 16 | H | F |
| 17 | H | F |
| 18 | H | Cl |
| 19 | CH₃ | F |
| 20 | CH₃ | Cl |
| 21 | CH₃ | Cl |
| 22 | H | F |
| 23 | CH₃ | F |
| 24 | H | F |
EXAMPLE 25
17.6 g of the triphendioxazine compound of the formula
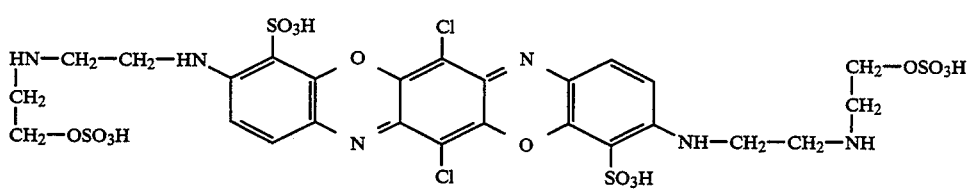

are dissolved in 600 ml of water by bringing the pH to 9 with 2N sodium hydroxide solution. The condensation product of the formula

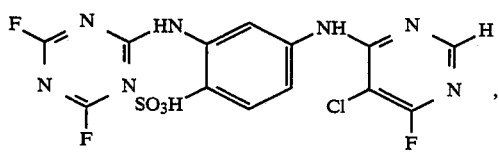

prepared from 9.8 g of 2,4-diaminobenzenesulphonic acid, 8.0 g of 4,6-difluoro-5-chloropyrimidine and 7.2 g of cyanuric fluoride is added to the solution at 0° to 10° C., and the pH of the reaction mixture is maintained at 8.5 to 9.0. After reaction is complete, the dyestuff of the formula

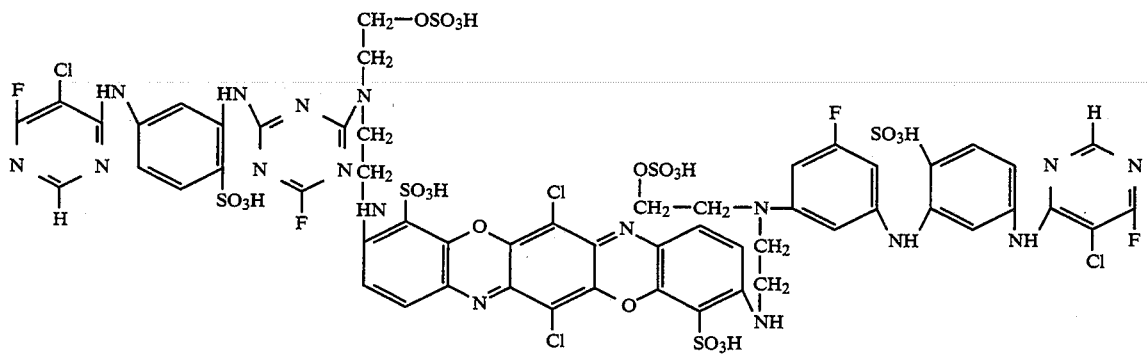

is isolated by salting out and dried at 50° C. in vacuo.

EXAMPLE 26

47.3 g of 4-amino-6-(4'-fluoro-5'-chloro-6'-pyrimidinylamino)-benzenesulphonic acid are condensed in 350 ml of water with 22.4 g of cyanuric chloride by the procedure of Example 4.

30.0 g of the triphendioxazine compound of the formula

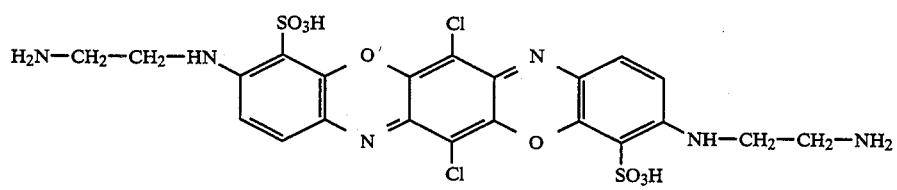

are dissolved in 500 ml by addition of 70 ml of 2N sodium hydroxide solution.

Both products are added evenly at 20° C. to 80 ml of previously introduced water at such a rate that a pH of 9.0 to 9.5 is established in the resulting reaction mixture. After the components have been combined, the pH is further maintained at this value using 2N sodium hydroxide solution until condensation is complete.

The resulting solid of the formula

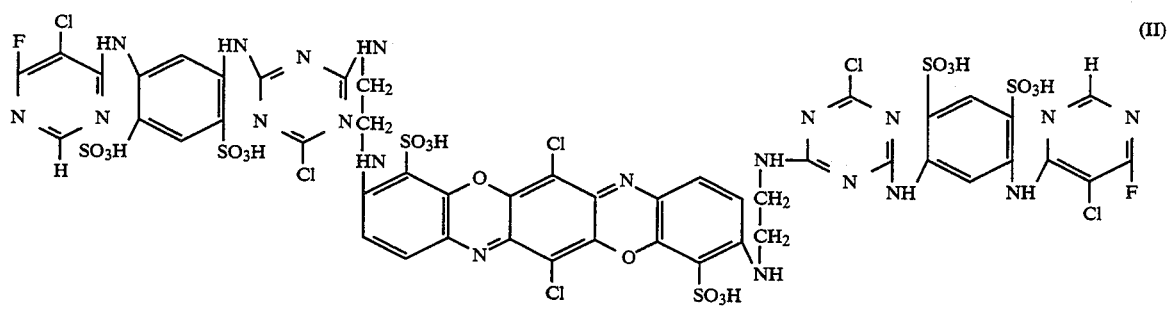

(II)

is salted out and dried at 50° C. in vacuo. It dyes cotton in strong blue shades. $\lambda_{max}=623$ nm in $H_2O$.

Analogously to Examples 25 and 26, further triphendioxazine reactive dyestuffs of the general formula

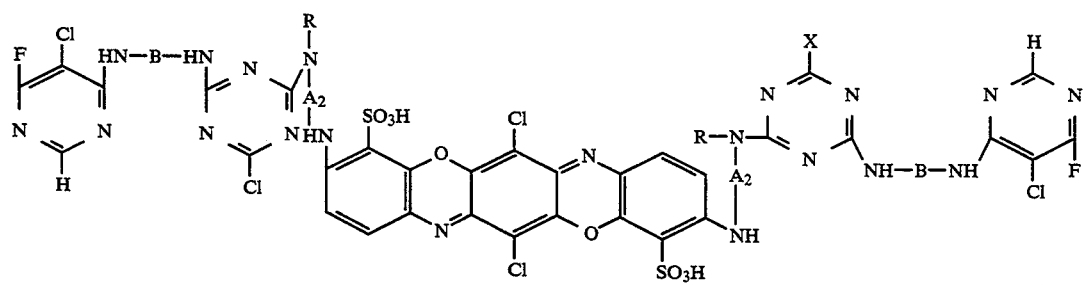

in which the substituents have the meanings given in the table, can be prepared. (Colour indicator numbers according to Colour Index Hue Indication Chart).

TABLE 2

| No. | A₂ | R | X | B | Colour indicator number |
|---|---|---|---|---|---|
| 27 | —(CH₂)₃— | H | F | HO₃S—⌬—SO₃H | 14 |
| 28 | —(CH₂)₂— | H | F | HO₃S—⌬—SO₃H | 14 |
| 29 | —(CH₂)₄— | H | Cl | ⌬(SO₃H)₂ | 14 |
| 30 | —(CH₂)₃— | CH₃ | F | HO₃S—⌬—SO₃H | 14 |
| 31 | —(CH₂)₂— | CH₂—CH₂—OSO₃H | F | HO₃S—⌬—SO₃H | 14 |
| 32 | —(CH₂)₃— | H | F | ⌬(SO₃H)₂ | 14 |

EXAMPLE 33

48.2 g of the copper phthalocyanine component of the formula

CuPc(3)—(SO₃H)₁,₈
      —(SO₂—NH₂)₀,₆
      —(SO₂—NH—CH₂—CH₂—NH₂)₁,₃ prepared by the procedure given in European Patent 0,073,267 are dissolved in 450 ml of water at a pH of 7. A suspension of the condensation product which was previously prepared by the procedure of Example 1 from 12.5 g of 2,4-diaminobenzenesulphonic acid, 10.3 g of 4,6-difluoro-5-chloropyrimidine and 12.9 g of cyanuric chloride is then added at 20° to 25° C., and the pH of the reaction mixture is maintained at 7.0 to 7.5 by addition of 2N sodium hydroxide solution. When the consumption of the sodium hydroxide solution has come to a standstill, the dyestuff formed of the formula

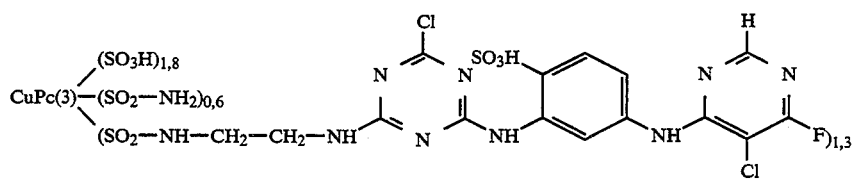

is salted out with sodium chloride and dried. The blue-green powder produces on cotton and staple viscose in high fixation yield clear greenish blue prints and dyeings having excellent wet fastness properties. $\lambda_{max}=669$ nm, 627 nm in $H_2O$.

EXAMPLE 34

If equimolar amounts of a nickel phthalocyanine component of the formula

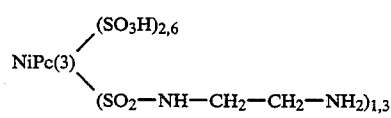

prepared by the procedure given in German Offenlegungsschrift 3,405,204 are used in Example 33 instead of the copper phthalocyanine component, a nickel phthalocyanine dyestuff of the formula

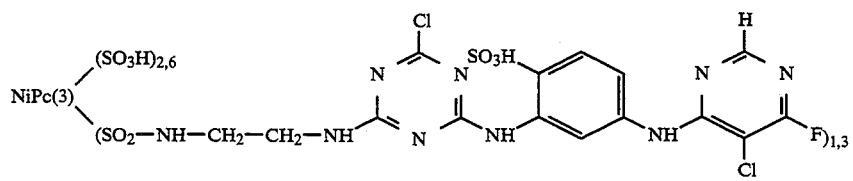

is obtained. $\lambda_{max}=662$ nm in $H_2O$.

The dyestuff produces on cotton and staple viscose clear bluish green dyeings having excellent wet fastness properties in a high fixation yield.

Analogously, further metal phthalocyanine reactive dyestuffs of the general formula

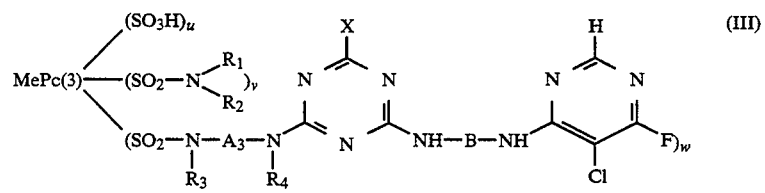

in which the meanings of the substituents and the indices are given in Examples No. 35 to 50 in the table below, can be synthesised.

TABLE 3

| No. | Me | R₁ | R₂ | R₃ | R₄ | A₃ | X | B | u | v | w |
|---|---|---|---|---|---|---|---|---|---|---|---|
| 35 | Cu | H | H | CH₃ | CH₃ | —(CH₂)₂— | Cl | ⌬—SO₃H | 1,9 | 0,8 | 1,1 |
| 36 | Cu | — | — | H | H | —(CH₂)₂— | Cl | ⌬—SO₃H | 2,6 | 0 | 1,3 |
| 37 | Cu | H | CH₂—CH₂—SO₃H | H | H | —(CH₂)₂— | Cl | ⌬—SO₃H | 2,0 | 0,6 | 1,3 |
| 38 | Cu | CH₃ | CH₂—CH₂—SO₃H | H | H | —CH₂)₂— | F | ⌬—SO₃H | 1,9 | 0,6 | 1,3 |

TABLE 3-continued

Phthalocyanine reactive dyestuffs of the formula III

| No. | Me | $R_1$ | $R_2$ | $R_3$ | $R_4$ | $A_3$ | X | B | u | v | w |
|---|---|---|---|---|---|---|---|---|---|---|---|
| 39 | Cu | H | H | H | H | —(CH$_2$)$_2$— | F | 2,4-disubst. phenyl-SO$_3$H | 1,9 | 0,6 | 1,3 |
| 40 | Cu | H | H | H | H | 1,3-phenylene | Cl | 2,4-disubst. phenyl-SO$_3$H | 2,6 | 0 | 1,3 |
| 41 | Cu | H | CH$_2$—CH$_2$—OSO$_3$H | H | CH$_3$ | —(CH$_2$)$_3$— | Cl | 2,5-disubst. phenyl-SO$_3$H | 2,4 | 0,5 | 1,0 |
| 42 | Cu | H | H | H | H | —(CH$_2$)$_2$— | Cl | 2,4-disubst. phenyl-SO$_3$H | 1,9 | 0,5 | 1,0 |
| 43 | Cu | H | H | H | H | —(CH$_2$)$_3$— | Cl | 2,4-disubst. phenyl-SO$_3$H | 2,4 | 0,4 | 1,5 |
| 44 | Ni | H | H | H | H | —(CH$_2$)$_2$— | Cl | 2,4-disubst. phenyl-SO$_3$H | 2,1 | 0,4 | 1,3 |
| 45 | Ni | H | H | CH$_3$ | CH$_3$ | —(CH$_2$)$_2$— | F | 2,4-disubst. phenyl-SO$_3$H | 2,7 | 0 | 1,2 |
| 46 | Cu | H | H | $R_3 + R_4$ = CH$_2$—CH$_2$—(CH$_2$)$_2$— | | | Cl | 2,4-disubst. phenyl-SO$_3$H | 2,1 | 0,5 | 1,3 |
| 47 | Cu | H | H | H | H | 2,5-disubst. phenyl-SO$_3$H | Cl | 2,5-disubst. phenyl-SO$_3$H | 2,2 | 0,5 | 1,2 |
| 48 | Cu | H | H | CH$_3$ | CH$_3$ | —(CH$_2$)$_2$— | F | 2,5-disubst. phenyl-SO$_3$H | 2,2 | 0,5 | 1,3 |

TABLE 3-continued

| | | | | Phthalocyanine reactive dyestuffs of the formula III | | | | | | | |
|---|---|---|---|---|---|---|---|---|---|---|---|
| No. | Me | $R_1$ | $R_2$ | $R_3$ | $R_4$ | $A_3$ | X | B | u | v | w |
| 49 | Ni | — | — | $R_3$-$R_4$ = $CH_2$—$CH_2$— | | —$(CH_2)_2$— | Cl | ![benzene with SO3H] | 2,5 | 0 | 1,3 |
| 50 | Ni | — | — | H | H | —$(CH_2)_2$— | Cl | ![benzene with HO3S and SO3H and CH3] | 2,4 | 0 | 1,4 |

EXAMPLE 51

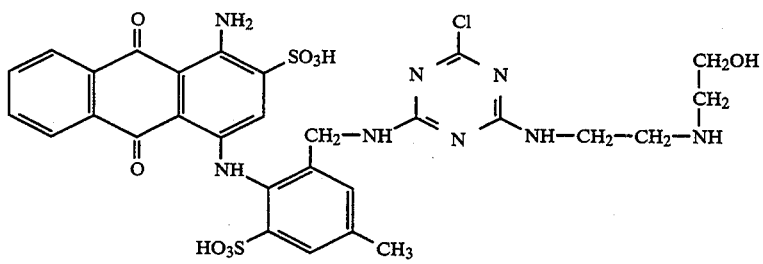

40 g of 1-amino-4-(2'-aminomethyl-4'-methyl-6'-sulphophenylamino)-anthraquinone-2-sulphonic acid are dissolved in 800 ml of water and 100 ml of acetone by neutralisation with about 45 ml of 2N sodium hydroxide solution at pH 7. The solution is cooled to 10° C., and a solution of 17.5 g of cyanuric chloride in 100 ml of acetone is added dropwise over a period of 15 to 20 minutes. During the dropwise addition, the pH of the reaction mixture is maintained at 6.0 to 7.0 with 2N sodium carbonate solution. When consumption of sodium carbonate has come to a standstill about 1 hour after the addition of the cyanuric chloride, a solution of 40 g of 2-(2-aminoethyl)-aminoethanol in 100 ml of water brought to a pH of 6 with concentrated hydrochloric acid is added, the temperature is raised to 20° to 25° C., and the pH is maintained at 5.5 to 6.0 with 2N sodium hydroxide solution. After condensation is complete, the dyestuff, which essentially has the formula is salted out, filtered off with suction, washed amine-free with saturated sodium chloride solution and dissolved again in 500 ml of water.

14.6 g of 4,6-difluoro-5-chloropyrimidine are added to the solution at 25° C., and the pH is maintained at 7.5 to 8.0 with 2N sodium hydroxide solution. When consumption of sodium hydroxide solution has come to a standstill and the above intermediate can no longer be detected, the resulting product of the formula

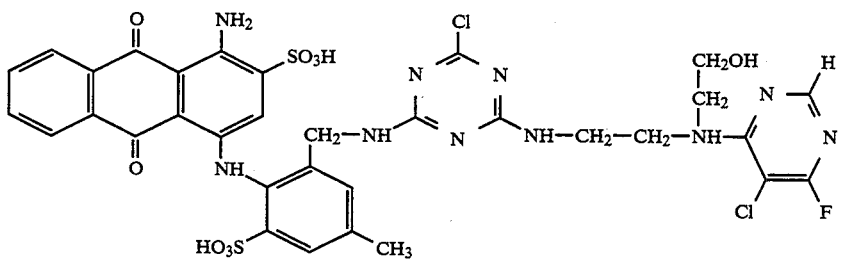

is salted out and dried at 50° C. in vacuo.

The dyestuff produces on cellulose fibres brilliant reddish blue prints having excellent wet fastness properties. $\lambda_{max}$=624 nm, 587 nm in $H_2O$.

EXAMPLE 52

If the corresponding sulphuric acid monoester is used in Example 51 instead of the 2-(2-aminoethyl)-aminoethanol, a dyestuff of the formula

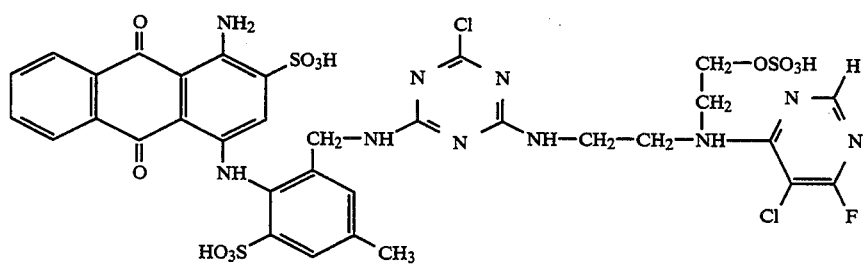

is obtained which, in printing and continuous processes on cotton, has similar fastness properties as the dyestuff from Example 51. $\lambda_{max}=624$ nm, 587 nm in $H_2O$.

Further anthraquinone dyestuffs containing an alkylenediamine bridging member between the halogenotriazinyl and 6-fluoro-5-chloro-4-pyrimidinyl radical are obtained if the following components are used:

TABLE 4

53 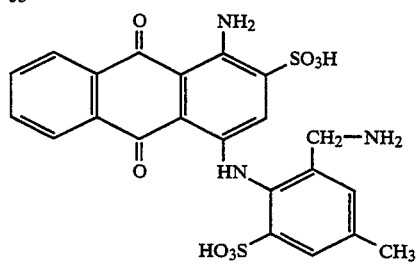  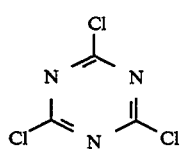  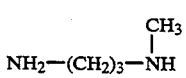  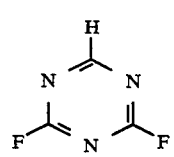

54 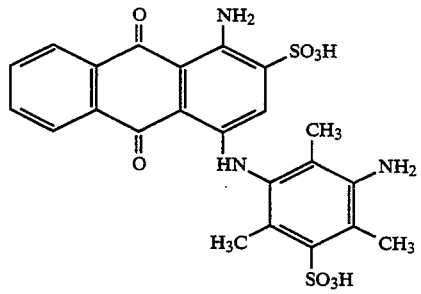  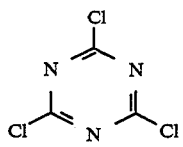  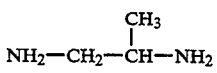  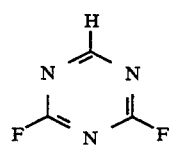

55 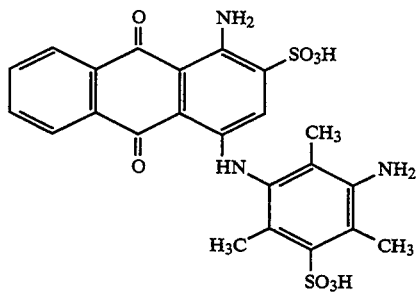  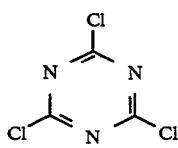  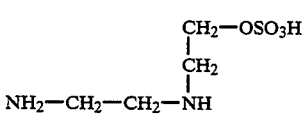  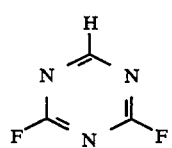

56 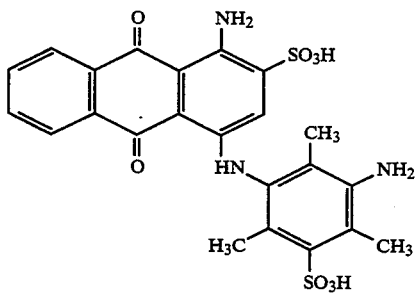  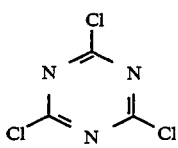  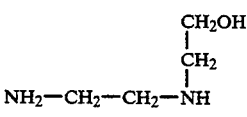  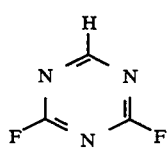

57

TABLE 4-continued
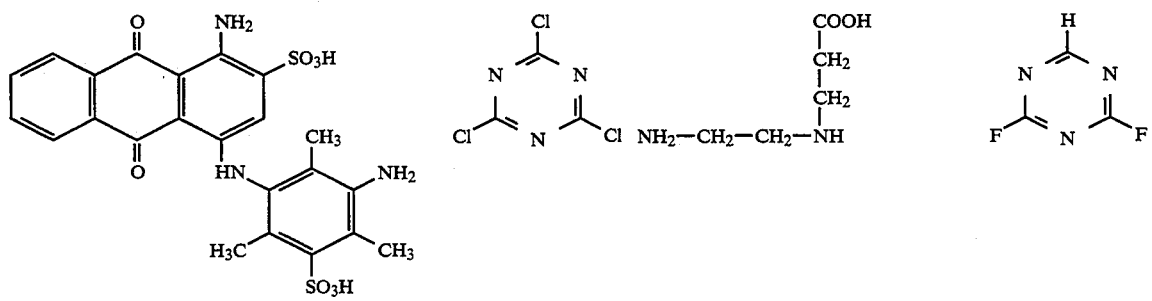
58
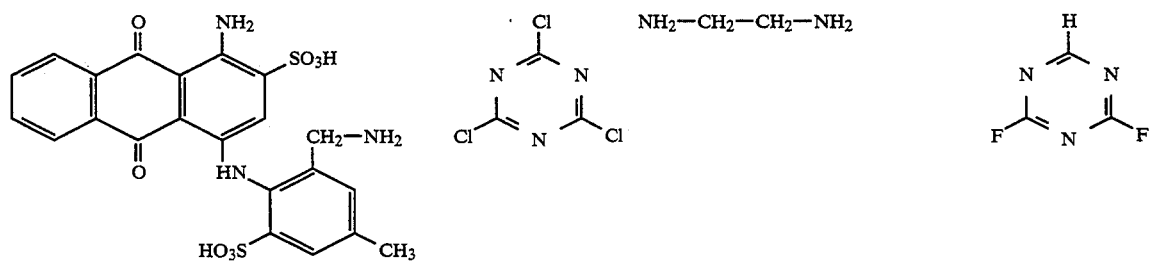
59
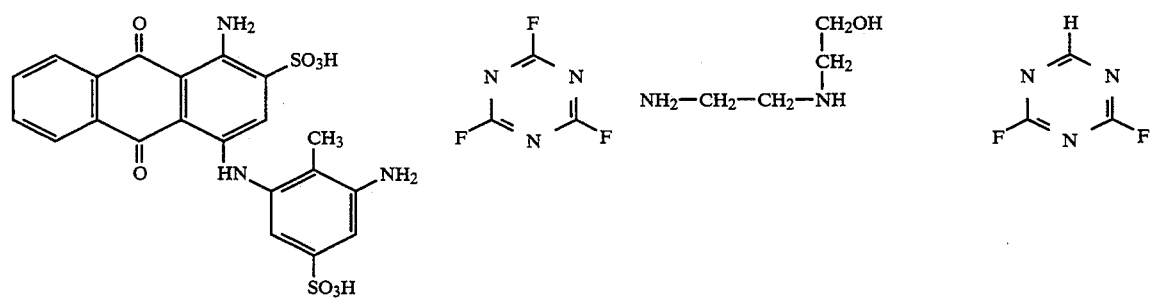
60
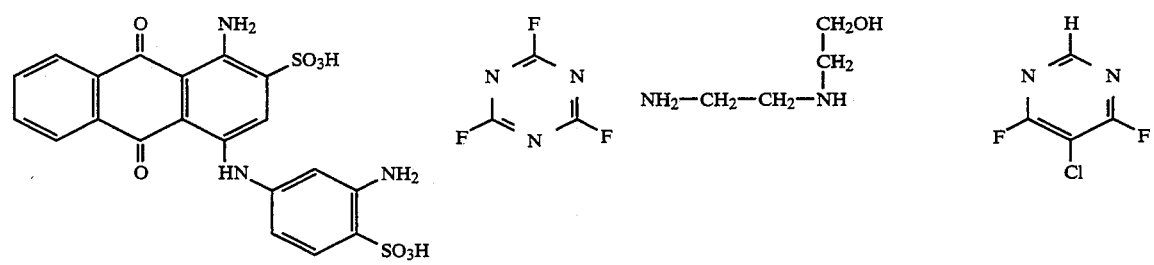
61
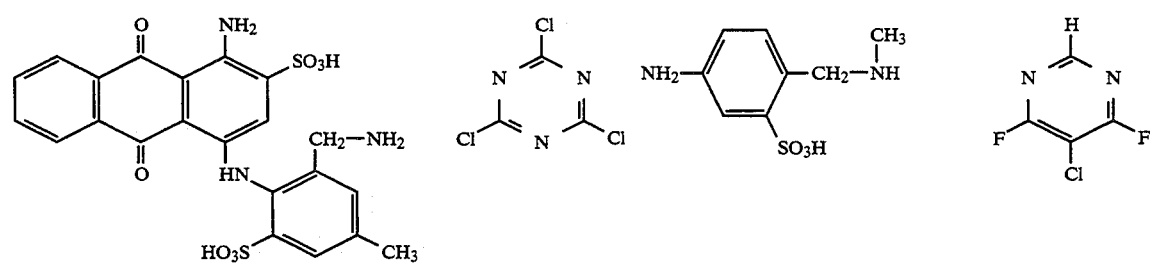
62

TABLE 4-continued

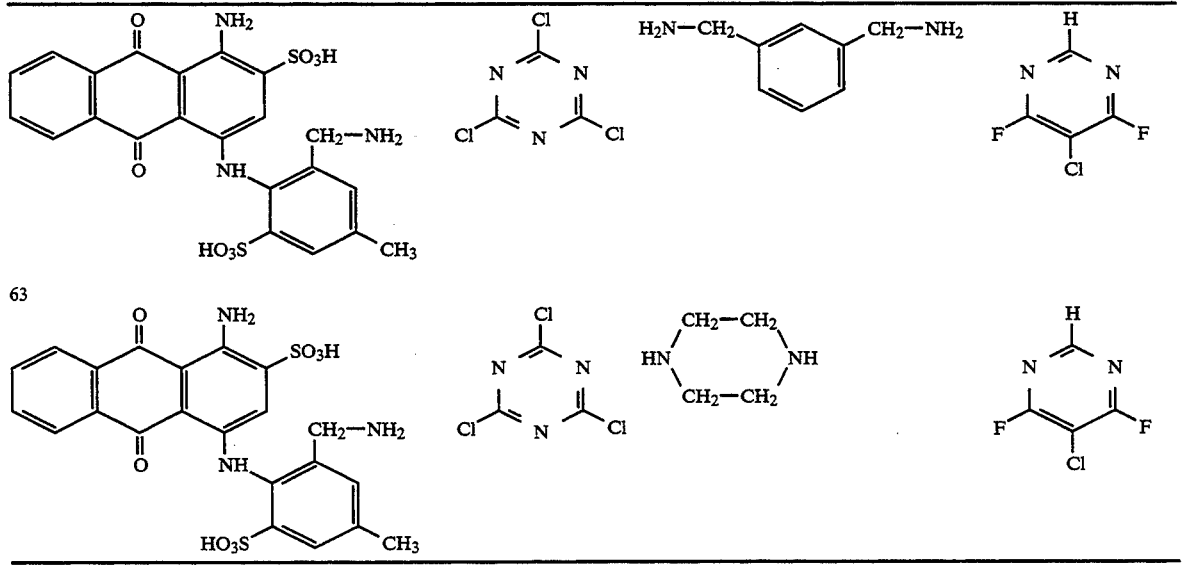

EXAMPLE 64

39.7 g of the copper phthalocyanine compound of the formula

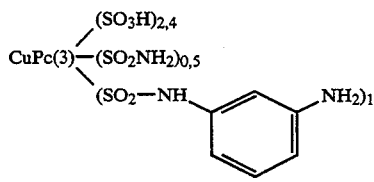

prepared by condensation of copper phthalocyanine (tetrasulphochloride/sulphonic acid) with 3-aminoacetanilide and ammonia, followed by hydrolysis of the acteylamino group with dilute sodium hydroxide solution are dissolved in 450 ml of water at pH 7.

The solution is run into a cyanuric chloride suspension prepared by dissolving 7.6 g of cyanuric chloride in 40 ml of methyl ethyl ketone and pouring the solution onto 60 g of ice. While the dyestuff base is run in, the temperature in the reaction mixture is maintained at 0° to 5° C. by external cooling and the pH at 4.5 to 5.0 using 10% strength sodium carbonate solution. After condensation is complete, a solution of 4.2 g of 2-(2-aminoethyl)-aminoethanol in 40 ml of water brought to a pH of 5.0 is added to the solution obtained.

The temperature is raised to 20° to 25° C. and the pH of the reaction mixture from 5.0 to 6.0 to 6.5 over a period of one hour using 2N sodium hydroxide solution. When consumption of sodium hydroxide solution has come to a standstill, indicating that condensation is complete, 7.2 g of 4,6-difluoro-5-chloropyrimidine are added to the reaction mixture, the temperature is maintained at 25° to 28° C. and the pH at 6.5 to 7.0 by addition of further sodium hydroxide solution. After several hours, condensation is complete. The dyestuff is salted out, filtered off with suction and dried in vacuo. It has the formula

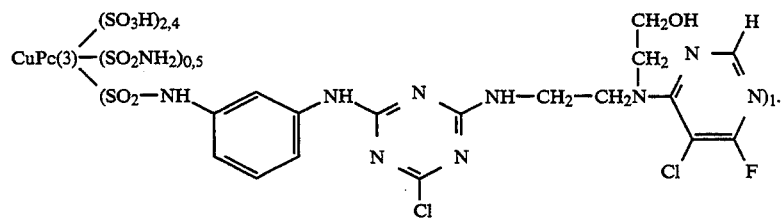

It dyes cotton in a clear greenish blue shade having excellent wet fastness properties and in high fixation yields. $\lambda_{max}=668$ nm in $H_2O$.

Further metal phthalocyanine reactive dyestuffs of the general formula

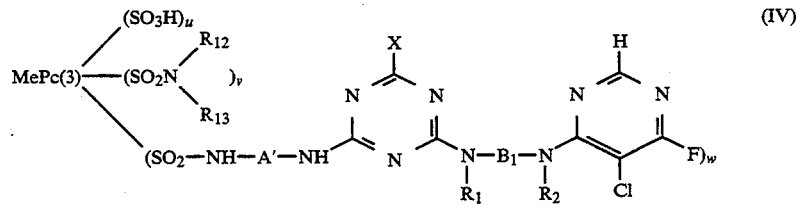
(IV)

in which the meanings of the substituents and indices can be seen from the table below, can be synthesised analogously.

TABLE 5

| No. | Me | $R_{12}$ | $R_{13}$ | $R_1$ | $R_2$ | A' | $B_1$ | X | u | v | w |
|---|---|---|---|---|---|---|---|---|---|---|---|
| 65 | Cu | H | H | H | $C_2H_5$ | 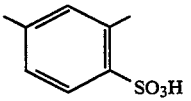 | $-(CH_2)_3-$ | F | 1,1 | 0,5 | 2,3 |
| 66 | Cu | — | — | H | H | 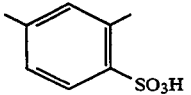 | $-CH_2-CH_2-$ <br> $\quad\quad\quad\ \ \vert$ <br> $\quad\quad\quad CH_3$ | Cl | 1,4 | 0 | 2,5 |
| 67 | Ni | H | H | H | $CH_2-CH_2OH$ | 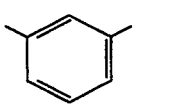 | $-(CH_2)_2-$ | Cl | 1,3 | 0 | 2,5 |
| 68 | Cu | $CH_3$ | $CH_2-CH_2-SO_3H$ | H | $CH_3$ | 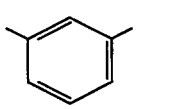 | $-(CH_2)_3-$ | Cl | 1,1 | 0,4 | 2,5 |
| 69 | Ni | H | H | H | H | 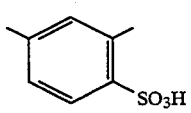 | $\begin{array}{c} CH_2-CH_2 \\ / \quad\quad \backslash \\ \backslash \quad\quad / \\ CH_2-CH_2 \end{array}$ | F | 1,1 | 0,5 | 2,3 |

EXAMPLE 70

26 g of the sodium salt of the compound of the formula

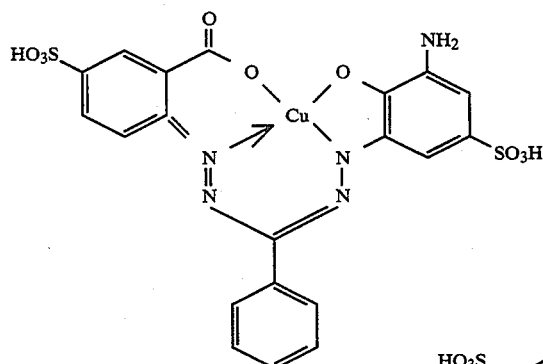

are dissolved in 200 ml of water at pH 7.5. The solution is cooled to 0° C., and 9 g of cyanuric chloride are added, during which the pH is maintained at 5.5 by addition of sodium carbonate solution. After reaction is complete, a neutralised solution of 9.5 g of 2,5-diaminobenzene-1,4-disulphonic acid in 100 ml of water is added dropwise. During this addition, the pH is maintained at 7 with sodium carbonate solution. The temperature is allowed to rise to 25° C. over a period of 2 hours. After condensation is complete, the dyestuff formed is salted out and filtered off with suction.

The dyestuff obtained of the formula

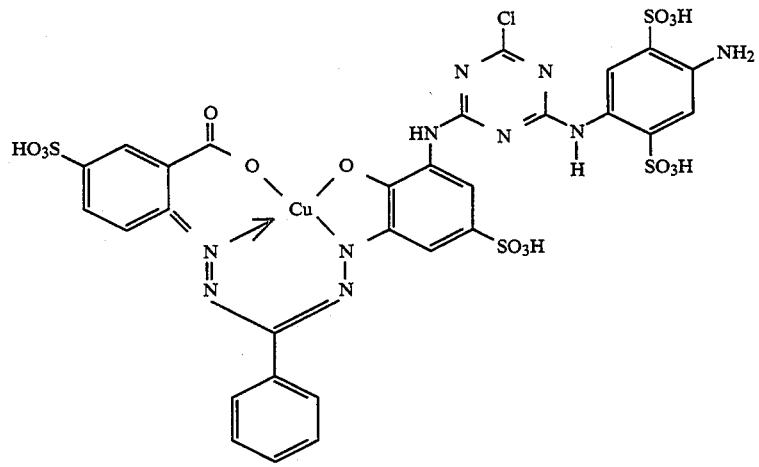

is suspended as a paste in 300 ml of water; the pH of the mixture is brought to 8 to 9 with 10% strength sodium hydroxide solution. 7 g of 5-chloro-4,6-difluoropyrimidine are then added at 40° to 50° C. over a period of 30 minutes, during which the pH is maintained at 8 to 9 with 10% strength sodium hydroxide solution.

After reaction is complete, the dyestuff is salted out, isolated, dried and milled.

The dyestuff thus obtained of the formula

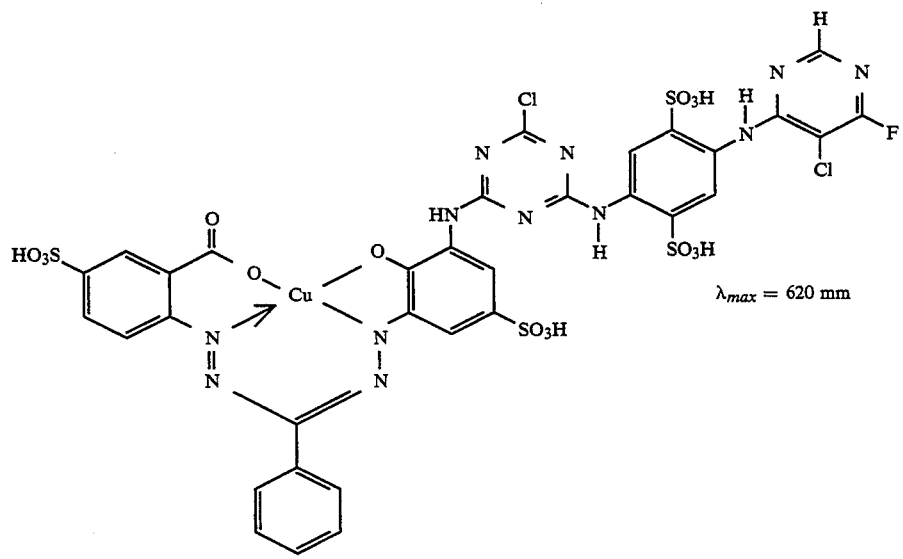

$\lambda_{max} = 620$ mm dyes cotton in blue hues having good fastness properties.

EXAMPLE 71

20 g of 2,5-diaminobenzenesulphonic acid are dissolved in 200 ml of water at a pH of 6.5 to 7.5. 12 g of 5-chloro-4,6-difluoropyrimidine are added at 20° C., and the pH is maintained at 6 to 7. Condensation is completed by heating the mixture to 35° to 45° C. The resulting cloudy solution of the intermediate of the formula

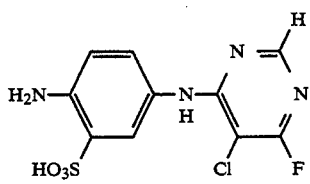

is filtered to give a clear filtrate, which is then cooled to −5° C., followed by addition of 9 ml of cyanuric fluoride. During this, the pH is maintained at 6 with 10% strength sodium hydroxide solution.

35 g of the sodium salt of the compound of the formula are dissolved in 200 ml of water at pH 7 to 8 and added in portions to the solution of the component of the formula

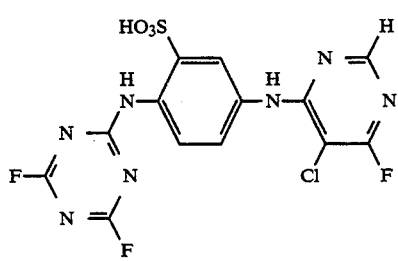

prepared above. During this addition, the pH is maintained at 7 with 10% strength sodium hydroxide solution. The temperature is allowed to rise to 20° C. over a period of 2 hours. The resulting dyestuff of the formula

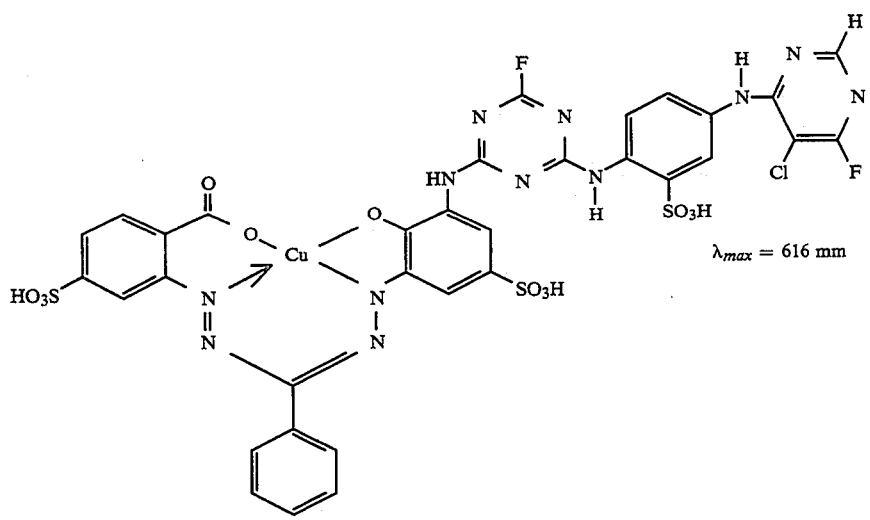

$\lambda_{max} = 616$ mm is salted out, filtered off and dried. It dyes cotton from a long liquor in very high fixation yields in blue hues.

EXAMPLE 72

Further valuable blue formazan dyestuffs according to the invention are obtained by the procedure of Examples 70 or 71 by reacting the components listed in Table 6.

In the bridge —A$_4$—, the N atom designated by * is bound to the C atom of the triazine rings.

The dyestuffs obtained have very good fibre-reactive dyestuff properties and produce, by the dyeing and printing processes customary for cellulose fibres, dyeings and prints of high colour strength and good fastness properties in very high fixation yields.

TABLE 6

| No. | D | Trihalogenotriazine | A$_4$ | $\lambda_{max}$ |
|---|---|---|---|---|
| 73 | N-(2-carboxy-4-sulphophenyl)-N'-(2'-hydroxy-3'-amino-5'-sulphophenyl)-ms-phenylformazan, Cu complex | 2,4,6-trichlorotriazine | HO$_3$S-, H$_2$N-*, -NH$_2$ (benzene) | 624 nm |
| 74 | N-(2-carboxy-4-sulphophenyl)-N'-(2'-hydroxy-3'-amino-5'-sulphophenyl)-ms-phenylformazan, Cu complex | 2,4,6-trifluorotriazine | HO$_3$S-, H$_2$N-, -NH$_2$, SO$_3$H (benzene) | 616 nm |
| 75 | N-(2-carboxy-4-sulphophenyl)-N'-(2'-hydroxy-3'-amino-5'-sulphophenyl)-ms-phenylformazan, Cu complex | 2,4,6-trifluorotriazine | SO$_3$H, *, H$_2$N-, -CH$_2$NH-CH$_3$ (benzene) | 626 nm |
| 76 | N-(2-carboxy-4-sulphophenyl)-N'-(2'-hydroxy-3'-amino-5'-sulphophenyl)-ms-phenylformazan, Cu complex | 2,4,6-trichlorotriazine | *HN-piperazine-N-CH$_2$CH$_2$-NH$_2$ | 620 nm |

TABLE 6-continued

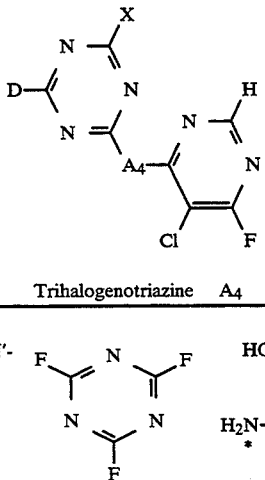

| No. | D | Trihalogenotriazine | A₄ | λ$_{max}$ |
|---|---|---|---|---|
| 77 | N-(2-carboxy-4-sulphophenyl)-N'-(2'-hydroxy-3'-amino-5'-sulphophenyl)-ms-phenylformazan, Cu complex | 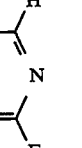 | 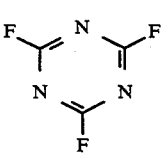 | 622 nm |
| 78 | N-(2-carboxy-5-sulphophenyl)-N'-(2'-hydroxy-3'-amino-5'-sulphophenyl)-ms-phenylformazan, Cu complex | 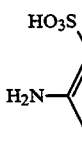 | 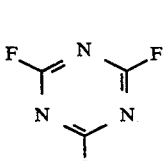 | 610 nm |
| 79 | N-(2-carboxy-5-sulphophenyl)-N'-(2'-hydroxy-3'-amino-5'-sulphophenyl)-ms-phenylformazan, Cu complex | 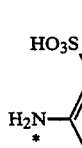 | 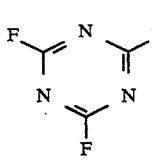 | 616 nm |
| 80 | N-(2-carboxy-5-sulphophenyl)-N'-(2'-hydroxy-3'-amino-5'-sulphophenyl)-ms-phenylformazan, Cu complex | 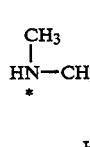 | 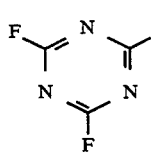 | 618 nm |
| 81 | N-(2-carboxy-5-sulphophenyl)-N'-(2'-hydroxy-3'-amino-5'-sulphophenyl)-ms-phenylformazan, Cu complex | 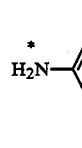 | 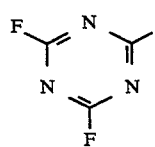 | 620 nm |
| 82 | N-(2-carboxy-5-sulphophenyl)-N'-(2'-hydroxy-3'-amino-5'-sulphophenyl)-ms-phenylformazan, Cu complex | 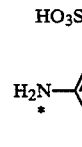 | 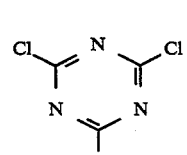 | 622 nm |
| 83 | N-(2-carboxy-5-sulphophenyl)-N'-(2'-hydroxy-3'-amino-5'-sulphophenyl)-ms-phenylformazan, Cu complex | 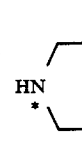 | 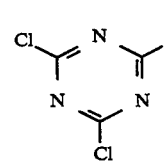 | 614 nm |
| 84 | N-(2-carboxy-5-sulphophenyl)-N'-(2'-hydroxy-3'-amino-5'-sulphophenyl)-ms-phenylformazan, Cu complex | 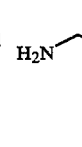 | H₂N−CH₂−CH(OH)−CH₂−NH₂ | 616 nm |

TABLE 6-continued

| No. | D | Trihalogenotriazine | A₄ | $\lambda_{max}$ |
|---|---|---|---|---|
| 85 | N-(2-carboxy-5-sulphophenyl)-N'-(2'-hydroxy-3'-amino-5'-sulphophenyl)-ms-phenylformazan, Cu complex | trifluorotriazine | H₂N-CH₂CH₂CH₂-NH-CH₃ (*on H₂N) | 614 nm |
| 86 | N-(2-carboxy-5-sulphophenyl)-N'-(2'-hydroxy-3'-amino-5'-sulphophenyl)-ms-phenylformazan, Cu complex | trifluorotriazine | H₂N-CH₂-CH(CH₃)-NH₂ (*on H₂N) | 610 nm |
| 87 | N-(2-carboxy-5-sulphophenyl)-N'-(2'-hydroxy-3'-amino-5'-sulphophenyl)-ms-phenylformazan, Cu complex | trifluorotriazine | H₂N-CH₂CH₂-NH-CH₂CH₂-OH (*on HN) | 612 nm |
| 88 | N-(2-carboxy-5-sulphophenyl)-N'-(2'-hydroxy-3'-amino-5'-sulphophenyl)-ms-phenylformazan, Cu complex | trifluorotriazine | 2-HO₃S-4-(NHCH₂CH₃)-aniline (*on H₂N) | 615 nm |
| 89 | N-(2-carboxy-4-aminophenyl)-N'-(2'-hydroxy-5'-sulphophenyl)-ms-(2''-sulphophenyl)-formazan, Cu complex | trichlorotriazine | 2-HO₃S-4-NH₂-aniline (*on H₂N) | 600 nm |
| 90 | N-(2-carboxy-4-aminophenyl)-N'-(2'-hydroxy-5'-sulphophenyl)-ms-(2''-sulphophenyl)-formazan, Cu complex | trifluorotriazine | 2-HO₃S-5-SO₃H-4-NH₂-aniline | 600 nm |
| 91 | N-(2-carboxy-5-aminophenyl)-N'-(2'-hydroxy-3'-amino-5'-sulphophenyl)-ms-(2''-sulphophenyl)-formazan, Cu complex | trifluorotriazine | 2-HO₃S-4-NH₂-aniline (*on H₂N) | 592 nm |
| 92 | N-(2-carboxy-4-aminophenyl)-N'-(2'-hydroxy-3',5'-disulphophenyl)-ms-(2''-sulphophenyl)-formazan, Cu complex | trifluorotriazine | 2-HO₃S-5-SO₃H-4-NH₂-aniline | 608 nm |

TABLE 6-continued

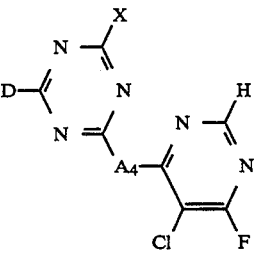

| No. | D | Trihalogenotriazine | A₄ | $\lambda_{max}$ |
|---|---|---|---|---|
| 93 | N-(2-carboxy-5-sulphophenyl)-N'-(2'-hydroxy-5'-amino-3'-sulphophenyl)-ms-phenylformazan, Cu complex |  | 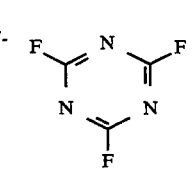 | 634 nm |
| 94 | N-(2-carboxy-5-sulphophenyl)-N'-(2'-hydroxy-5'-amino-3'-sulphophenyl)-ms-phenylformazan, Cu complex | 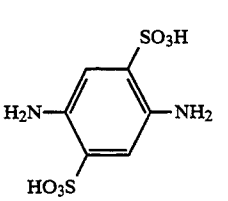 | 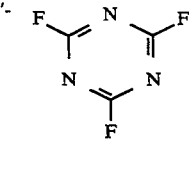 | 636 nm |
| 95 | N-(2-carboxy-4-sulphophenyl)-N'-(2'-hydroxy-5'-amino-3'-sulphophenyl)-ms-phenylformazan, Cu complex | 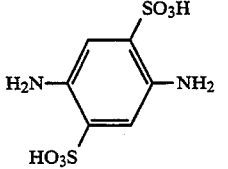 | 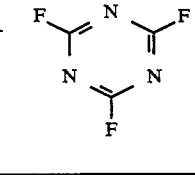 | 638 nm |
| 96 | N-(2-carboxy-4-sulphophenyl)-N'-(2'-hydroxy-5'-sulphophenyl)-ms-(3''-aminophenyl)-formazan, Cu complex | 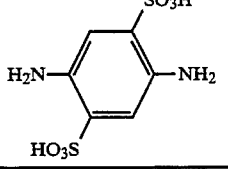 | 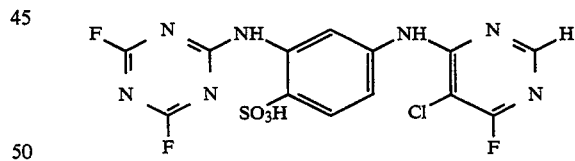 | 622 nm |

EXAMPLE 97

97.1 9.9 g of 2,4-diaminobenzenesulphonic acid are dissolved in 100 ml of water together with LiOH at pH 6.5. 7.6 g of 4,6-difluoro-5-chloropyrimidine are added dropwise to this solution at 35° to 40° C. over a period of 30 minutes and the pH is simultaneously maintained at 6.5 with Li₂CO₃. After 2 hours, 100 g of ice and 1 g of NaF are added. 6.6 g of cyanuric fluoride are added at 0° C., and the pH drops to about 3.7 to 3.8. After 5 minutes, the 2nd condensation is complete and, after filtration, a dark solution of the compound is obtained in the form of its lithium salt.

97.2 10.4 g of 7-amino-4-hydroxy-2-naphthalenesulphonic acid are dissolved in 150 ml of water together with LiOH at pH 7, and the condensation solution from Example 97.1 is added. During this addition, the pH is maintained at 5.5 with Na₂CO₃ solution. After 20 minutes, the pH is raised to 6.5 and, after a further 20 minutes, a suspension of diazotised 1,5-naphthalenedisulphonic acid (14.1 g) is added, and the pH is raised to 6.5.

After 1 hour, the azo coupling is complete, and the dyestuff is salted out, isolated and dried; it has the formula

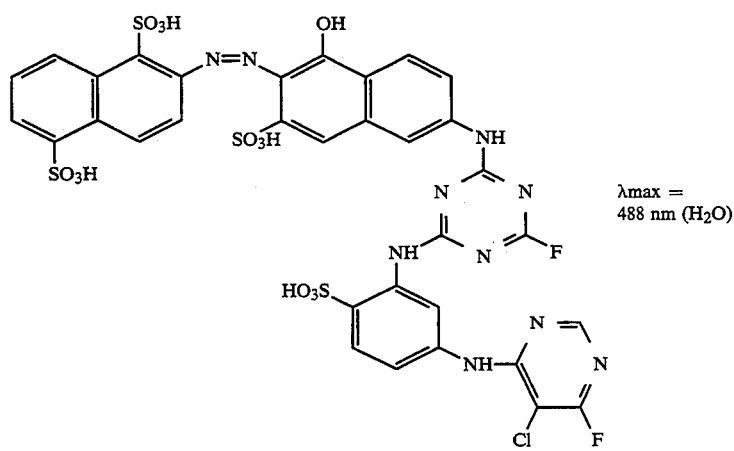

λmax = 488 nm (H₂O)

and dyes cotton in brilliant orange shades which have very good wet fastness properties.

97.3 A further method of preparing the dyestuff from Example 97.2 consists in condensing the azo dyestuff of the formula

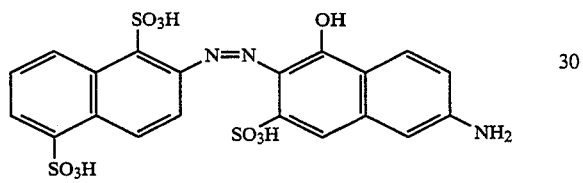

with the reactive component from Example 97.1 at pH 7 to 7.5.

By varying the diazo component (D), coupling component (K) and diamines (W), it is possible to prepare the dyestuffs of the general formula

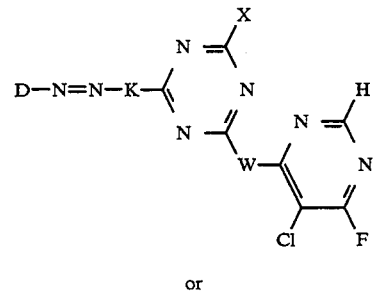

or

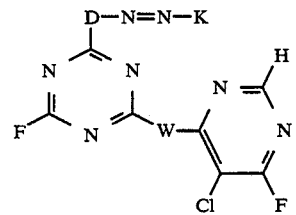

analogously to Examples 1 and 97; they dye cotton in the hues given.

TABLE 7

| No. | X | D | K | W | Hue λ$_{max}$ (H₂O) |
|---|---|---|---|---|---|
| 98 | F | ![D98] 2-amino-naphthalene-1-sulfonic acid | ![K98] 8-amino-1-hydroxy-naphthalene-3,6-disulfonic acid | ![W98] 2,4-diaminobenzenesulfonic acid | bluish red * 544 nm |
| 99 | F | ![D99] 2-aminobenzenesulfonic acid | ![K99] 8-amino-1-hydroxy-naphthalene-3,6-disulfonic acid | ![W99] 2,4-diaminobenzenesulfonic acid | yellowish red * |

TABLE 7-continued

| No. | X | D | K | W | Hue $\lambda_{max}$ (H$_2$O) |
|---|---|---|---|---|---|
| 100 | F | 2-amino-naphthalene-1,5-disulfonic acid | 8-amino-1-hydroxy-naphthalene-3,6-disulfonic acid | 2,4-diaminobenzenesulfonic acid | bluish red |
| 101 | Cl | 2-amino-naphthalene-1-sulfonic acid | 8-amino-1-hydroxy-naphthalene-3,5-disulfonic acid | 2,4-diaminobenzenesulfonic acid | red |
| 102 | F | 2-amino-naphthalene-1-sulfonic acid | 8-amino-1-hydroxy-naphthalene-3,5-disulfonic acid | 2,4-diaminobenzenesulfonic acid | red |
| 103 | F | 1,3-diamino-benzene-4-sulfonic acid | 8-benzoylamino-1-hydroxy-naphthalene-3,6-disulfonic acid | 2,4-diaminobenzenesulfonic acid | red 515 nm |
| 104 | F | 2-amino-4-(methylaminomethyl)-benzenesulfonic acid | 8-benzoylamino-1-hydroxy-naphthalene-3,6-disulfonic acid | 2,4-diaminobenzenesulfonic acid | red |
| 105 | F | 2-amino-4-(methylaminomethyl)-benzenesulfonic acid | 8-benzoylamino-1-hydroxy-naphthalene-3,6-disulfonic acid | 2,4-diaminobenzenesulfonic acid | yellowish red |
| 106 | F | 2-amino-5-(aminomethyl)-naphthalene-1-sulfonic acid | 8-benzoylamino-1-hydroxy-naphthalene-3,5-disulfonic acid | 2,4-diaminobenzenesulfonic acid | bluish red 514 nm |
| 107 | F | 2-amino-4-(methylaminomethyl)-benzenesulfonic acid | 8-acetylamino-1-hydroxy-naphthalene-3,6-disulfonic acid | 2,4-diaminobenzenesulfonic acid | red 504, 526 nm |

TABLE 7-continued

| No. | X | D | K | W | Hue λ$_{max}$ (H$_2$O) |
|---|---|---|---|---|---|
| 108 | F | naphthalene with SO$_3$H, SO$_3$H, SO$_3$H, NH$_2$ substituents | 1-OH, 6-NH$_2$-, 3-SO$_3$H naphthalene | benzene with SO$_3$H, *NH$_2$, NH$_2$ | orange |
| 109 | F | benzene with SO$_3$H, NH$_2$, CH$_3$O | 1-OH, 6-NH$_2$-, 3-SO$_3$H naphthalene | benzene with SO$_3$H, *NH$_2$, NH$_2$ | scarlet 503 nm |
| 110 | F | benzene with SO$_3$H, NH$_2$, CH$_3$O, SO$_3$H | 1-OH, 6-NH$_2$-, 3-SO$_3$H naphthalene | benzene with SO$_3$H, *NH$_2$, NH$_2$ | orange 498 nm |
| 111 | F | H$_3$OS—C$_6$H$_4$—N:N—C$_6$H$_3$(SO$_3$H)—NH$_2$ | 1-OH, 6-NH$_2$-, 3-SO$_3$H naphthalene | benzene with SO$_3$H, *NH$_2$, NH$_2$ | red |
| 112 | F | benzene with SO$_3$H, NH$_2$, H$_3$C, SO$_3$H | 1-OH, 6-NH$_2$-, 3-SO$_3$H naphthalene | benzene with SO$_3$H, *NH$_2$, NH$_2$ | orange |
| 113 | F | benzene with SO$_3$H, NH$_2$, H$_3$C.O | 1-OH, 6-NH$_2$, 3-SO$_3$H naphthalene | benzene with SO$_3$H, *NH$_2$, CH$_2$—HNCH$_3$ | scarlet 504 nm |
| 114 | F | benzene with SO$_3$H, NH$_2$, H$_3$C.O | 1-OH, 6-NH$_2$, 3-SO$_3$H naphthalene | benzene with SO$_3$H, H$_2$N, NH$_2$, SO$_3$H | scarlet 504 nm |
| 115 | F | benzene with SO$_3$H, NH$_2$, H$_3$C.O | 1-OH, 6-NH$_2$, 8-SO$_3$H, 3-SO$_3$H naphthalene | benzene with SO$_3$H, NH$_2$, NH$_2$ | scarlet |

TABLE 7-continued

| No. | X | D | K | W | Hue $\lambda_{max}$ (H$_2$O) |
|---|---|---|---|---|---|
| 116 | F | naphthalene-1-sulphonic acid | 4,5-dihydroxy... (OH, SO$_3$H, SO$_3$H, NH$_2$) | benzene (SO$_3$H, *NH$_2$, NH$_2$) | scarlet |
| 117 | F | benzene (SO$_3$H, NH$_2$, *NH$_2$) | naphthalene (OH, SO$_3$H, NHCOCH$_3$) | benzene (SO$_3$H, *NH$_2$, NH$_2$) | orange |
| 118 | F | benzene (SO$_3$H, NH$_2$, *NH$_2$) | naphthalene (OH, SO$_3$H, SO$_3$H) | benzene (SO$_3$H, *NH$_2$, NH$_2$) | orange 488 nm |
| 119 | F | benzene (SO$_3$H, *H$_2$N, NH$_2$) | naphthalene (OH, SO$_3$H, SO$_3$H) | benzene (SO$_3$H, *NH$_2$, NH$_2$) | bluish red |
| 120 | F | naphthalene (SO$_3$H, NH$_2$, SO$_3$H) | naphthalene (OH, NH.CO-C$_6$H$_4$-NH$_2$, SO$_3$H, SO$_3$H) | benzene (SO$_3$H, *NH$_2$, NH$_2$) | bluish red |
| 121 | F | benzene (SO$_3$H, *H$_2$N, NH$_2$) | pyrazole (COOH, HO, N-C$_6$H$_4$-SO$_3$H) | benzene (SO$_3$H, *NH$_2$, NH$_2$) | golden yellow $\lambda_{max}$ = 448 nm |

+)The N atoms designated by * are connected to the triazinyl radical.

EXAMPLE 122

23.6 g of 7-amino-1,3-naphthalenedisulphonic acid monosodium salt were stirred in 150 ml of water/30 g of ice and 20 ml of concentrated hydrochloric acid, and 17 ml of an aqueous sodium nitrite solution (300 g of NaNO$_2$/l) were added dropwise at 5° to 10° C. After stirring at 5° to 10° C. for one hour, excess nitrous acid was removed using sulphamic acid.

This cream-coloured suspension was metered into a neutral solution of the coupling component prepared from 13.5 g of N-(3-aminophenyl)-acetamide hydrochloride, 50 ml of water, 50 g of ice and about 30 ml of a 10% strength aqueous lithium hydroxide solution over a period of 30 minutes. During this addition, the pH of the reaction mixture was kept constant at 6.0 to 6.5 using 20% strength aqueous potassium bicarbonate solution. If possible, the temperature should not exceed 10° C. After addition had been completed, stirring was continued for 30 minutes, during which the pH was further kept constant.

15.2 g of 2,4-diaminobenzenesulphonic acid monosodium salt were stirred in 100 ml of water and dissolved at pH 6 using 10% strength lithium hydroxide solution. The solution was heated to 40° C., and 12 g of 5-chloro-4,6-difluoropyrimidine were added. During this condensation reaction, the pH was kept constant at 5.8 to 6.2 using lithium hydroxide solution. After 2 hours at 40° C., hardly any more change in pH could be observed, and condensation was complete according to HPLC analysis. The precipitated lithium fluoride was separated off by filtration. The mixture was then cooled to 0° C. with about 200 g of ice and reacted at this temperature with 10 g of trifluoro-s-triazine. The pH of the second condensation was kept constant between 6.0 and 6.5 by simultaneously metering in 10% strength lithium hydroxide solution. After 15 minutes at 0° to 2° C., the reaction was complete.

The warm red-brown coupling solution of 8° C. prepared above was metered into this colourless condensation solution at 0° C. over a period of 20 minutes, during which the pH was kept constant between 7.0 and 7.2 using 20% sodium carbonate solution. The mixture was heated to 25° C. at a constant pH of 7.0 to 7.2 over a period of 3 hours. After an additional stirring phase of one hour, the reaction was complete. The dyestuff solution was clarified in order to separate off insoluble components, such as lithium fluoride, and salted out with 50 g of sodium chloride. The precipitated dyestuff was filtered off with suction and dried, giving 61 g of an orange-red powder ($\lambda_{max}$=406 nm (H$_2$O)), which has the structure

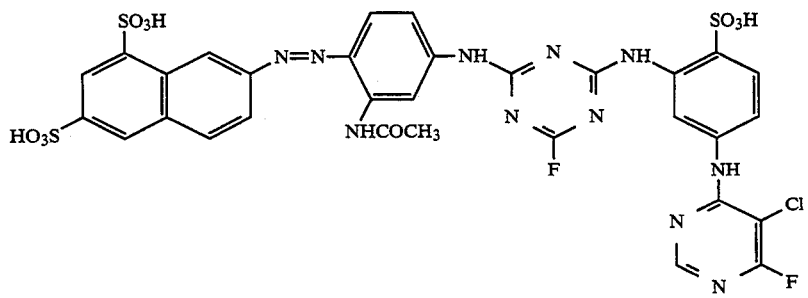

and dyes cotton in golden yellow dyeings having excellent fastness properties.

By varying the diazo component D-NH$_2$, the coupling component containing R$^1$ and R$^2$ and the diamino compound, further valuable golden yellow reactive dyestuffs of the formula

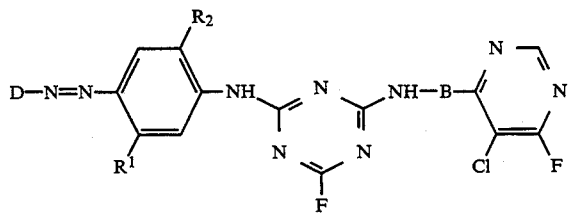

were available in analogy to Example 122, for example those listed in Table 8 below.

TABLE 8

| Ex. | D | R$^1$ | R$^2$ | B*) | $\lambda_{max}$ (H$_2$O) |
|---|---|---|---|---|---|
| 123 | SO$_3$H-naphthalene-SO$_3$H | CH$_3$ | H | SO$_3$H-tolyl-NH— | |
| 124 | SO$_3$H-naphthalene-SO$_3$H | H | OCH$_3$ | SO$_3$H-tolyl-NH— | |
| 125 | SO$_3$H-naphthalene-SO$_3$H | NHCONH$_2$ | H | SO$_3$H-tolyl-NH— | |
| 126 | SO$_3$H-naphthalene-SO$_3$H | NHCOCH$_2$OH | H | SO$_3$H-tolyl(SO$_3$H)-NH— | 408 nm |

TABLE 8-continued

| Ex. | D | R¹ | R² | B*) | $\lambda_{max}$ (H₂O) |
|---|---|---|---|---|---|
| 127 | 7-methylnaphthalene-1,3-disulfonic acid (1-SO₃H, 3-SO₃H) | NHCOCH₂OSO₃H | H | 3-methyl-4-SO₃H-phenyl, N(CH₃)- | 412 nm |
| 128 | 7-methylnaphthalene-1,5-disulfonic acid | CH₃ | H | 3-methyl-4-SO₃H-phenyl, NH- | |
| 129 | 7-methylnaphthalene-1,5-disulfonic acid | H | OCH₃ | 3-methyl-4-SO₃H-phenyl, NH- | |
| 130 | 7-methylnaphthalene-1,5-disulfonic acid | OCH₃ | CH₃ | 3-methyl-4-SO₃H-phenyl, NH- | |
| 131 | 7-methylnaphthalene-1,5-disulfonic acid | NHCOCH₃ | H | 3-methyl-4-SO₃H-phenyl, NH- | |
| 132 | 7-methylnaphthalene-1,5-disulfonic acid | NHCOCH₃ | H | 3-methyl-4-SO₃H-phenyl, N(CH₃)- | |
| 133 | 7-methylnaphthalene-1,5-disulfonic acid | NHCONH₂ | H | 3-methyl-4-SO₃H-phenyl, NH- | |
| 134 | 7-methylnaphthalene-1,5-disulfonic acid | NHCOCH₃ | H | 2-methyl-4-(CH₂-N(CH₃)-)-phenyl-SO₃H | |

TABLE 8-continued

| Ex. | D | R¹ | R² | B*) | $\lambda_{max}$ (H$_2$O) |
|---|---|---|---|---|---|
| 135 | 1,5-SO$_3$H, 6-SO$_3$H, 7-SO$_3$H naphthalene (HO$_3$S at 6) | NHCOCH$_3$ | H | 4-SO$_3$H, 2-methyl phenyl-NH— | 408 nm |
| 136 | same as 135 | NHCONH$_2$ | H | 4-SO$_3$H, 2-methyl phenyl-NH— | 426 nm |
| 137 | same as 135 | NHCOCH$_3$ | H | 3-SO$_3$H, 4-methyl phenyl-NH— | 410 nm |
| 138 | same as 135 | NHCONH$_2$ | H | 3-SO$_3$H, 4-methyl phenyl-NH— | 429 nm |
| 139 | same as 135 | NHCOCH$_3$ | H | 2-SO$_3$H, 4-methyl phenyl-CH$_2$—N(CH$_3$)— | |
| 140 | same as 135 | NHCONH$_2$ | H | 2-SO$_3$H, 4-methyl phenyl-CH$_2$—N(CH$_3$)— | |
| 141 | same as 135 | NHCONH$_2$ | H | 2-SO$_3$H, 5-SO$_3$H, 4-methyl phenyl-NH— | |
| 142 | 1,5-SO$_3$H, 7-SO$_3$H naphthalene (HO$_3$S-2) | NHCOCH$_3$ | H | 4-SO$_3$H, 2-methyl phenyl-NH— | |
| 143 | same as 142 | NHCONH$_2$ | H | 4-SO$_3$H, 2-methyl phenyl-NH— | |

TABLE 8-continued

| Ex. | D | R¹ | R² | B*) | $\lambda_{max}$ (H$_2$O) |
|---|---|---|---|---|---|
| 144 | 2,4-disulfophenyl (SO$_3$H at 2, HO$_3$S at 4) methyl-substituted | NHCOCH$_3$ | H | 3-methyl-4-sulfophenylamino | 391 nm |
| 145 | 2,4-disulfophenyl methyl-substituted | NHCONH$_2$ | H | 3-methyl-4-sulfophenylamino | 395 nm |
| 146 | 2,4-disulfophenyl methyl-substituted | NHCOCH$_2$OH | H | 3-methyl-4-sulfophenylamino | 392 nm |
| 147 | 2,4-disulfophenyl methyl-substituted | NHCOCH$_3$ | H | 4-methyl-3-sulfophenylamino | 394 nm |
| 148 | 2,4-disulfophenyl methyl-substituted | NHCONH$_2$ | H | N-methyl-4-methyl-3-sulfoanilino | |
| 149 | 2,4-disulfophenyl methyl-substituted | NHCOCH$_3$ | H | 2,5-dimethyl-4-sulfophenylamino | 392 nm |
| 150 | 2,5-disulfophenyl methyl-substituted | NHCOCH$_3$ | H | 3-methyl-4-sulfophenylamino | |
| 151 | 2,5-disulfophenyl methyl-substituted | NHCONH$_2$ | H | 3-methyl-4-sulfophenylamino | |

TABLE 8-continued

| Ex. | D | R¹ | R² | B*) | $\lambda_{max}$ (H₂O) |
|---|---|---|---|---|---|
| 152 | ![structure: benzene with SO₃H, SO₃H, CH₃] | NHCONH₂ | H | ![structure: benzene with SO₃H, CH₃, CH₂—NCH₃] | |
| 153 | ![structure: benzene with HO₃S, CH₃] | NHCOCH₂OSO₃H | H | ![structure: benzene with SO₃H, CH₃, NH—] | |

*)The pyrimidinyl radical is always bound to the N atom of B.

If trifluorotriazine in Example 122 and the examples of Table 8 is replaced by cyanuric chloride, comparable golden yellow bifunctional reactive dyestuffs having excellent fastness properties are obtained which only differ in the dyeing temperature which is 20° C. higher.

EXAMPLE 154

A neutral aqueous solution of 30.9 g of 2-amino-3,6,8-naphthalenetrisulphonic acid disodium salt and 6 g of sodium nitrite in 200 ml of water was metered into a mixture of 40 ml of concentrated hydrochloric acid, 50 g of ice and 50 ml of water over a period of 15 minutes. After stirring at 5° to 10° C. for another 30 minutes, diazotisation was complete. The nitrite excess was removed using sulphamic acid.

This suspension was added to a neutral suspension of the coupling component prepared from 13.5 g of N-(3-aminophenyl)-urea and 100 ml of water over a period of 30 minutes. During this addition, the pH of the reaction mixture was kept constant at 6.0 to 6.5 using 20% strength aqueous potassium bicarbonate solution. If possible, the temperature should not exceed 15° C. After addition had been completed, stirring was continued for 15 minutes, during which the pH of the orange-red solution was further kept constant.

Ice was added to this red-brown coupling solution until a temperature of 0° C. was reached. 12 g of cyanuric fluoride was swiftly added and the pH was simultaneously kept constant at 6.0 to 6.2 by addition of a 20% strength potassium bicarbonate solution. Condensation was complete after 10 minutes. The pH was brought to 5.8 with a few drops of hydrochloric acid, and a solution of 5.8 g of 1,2-diaminopropane in 10 ml of water which was likewise brought to a pH of 5.8 with hydrochloric acid was added to this solution. The red reaction mixture was then heated to 20° C. over a period of 2 hours, during which the pH was maintained at 5.8 to 5.9 with potassium bicarbonate solution. For a short period, this resulted in a solution from which, during an additional stirring phase of one hour, an orange-red precipitate was formed at a pH of 6.0 to 6.1. This dyestuff intermediate was filtered off with suction, and the isolated moist paste was stirred in 200 ml of water at pH 6.0. 12 g of 5-chloro-4,6-difluoropyrimidine were then added, the mixture was heated to 45° C. and condensed at pH 7.5 to 8.0. pH control was carried out by means of sodium carbonate solution. Condensation was complete after about 2 hours. The dyestuff solution was filtered until clear, and the dyestuff was salted out with 25 g of common salt. Filtering off with suction and drying gave 58 g of an orange-red powder ($\lambda_{max}$=428 nm (H₂O)), which has the structure

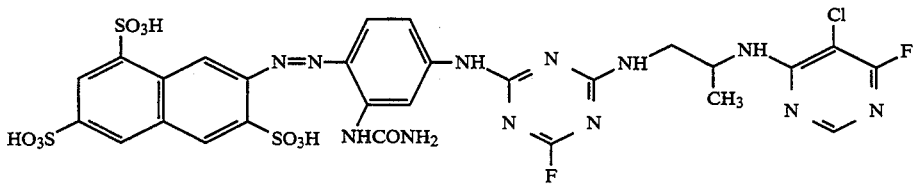

and dyes cotton in reddish yellow hues.

By varying the diazo component D—NH₂, the coupling component containing R¹ and the aliphatic diamino compound, further valuable yellow to golden yellow hues of the following structure could be prepared analogously to Example 154.

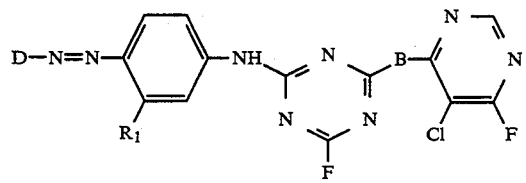

TABLE 9
| Ex. | D | R¹ | B*) | λ$_{max}$ (H$_2$O) |
|---|---|---|---|---|
| 155 | 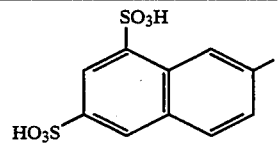 | CH$_3$ | —NH—CH$_2$CH$_2$NH—* | |
| 156 | 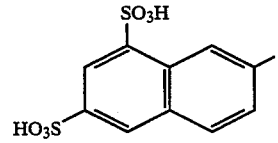 | OCH$_3$ | —NH—CH$_2$—CH(CH$_3$)—NH—* | |
| 157 | 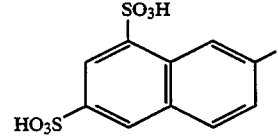 | NHCOCH$_3$ | —NH—CH$_2$—CH(CH$_3$)—NH—* | |
| 158 | 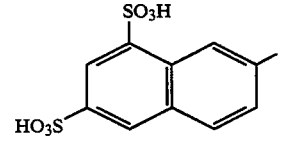 | NHCOCH$_2$OSO$_3$H | —NH—CH$_2$—CH(CH$_3$)—NH—* | 408 nm |
| 159 | 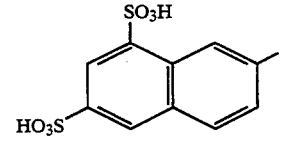 | NHCOCH$_3$ | —N⟨piperazine⟩N—* | |
| 160 | 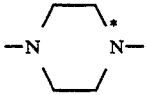 | NHCOCH$_3$ | —NH—CH$_2$—CH(CH$_3$)—NH—* | |
| 161 | 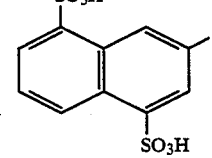 | NHCOCH$_3$ | —NH—CH$_2$—CH(OH)—CH$_2$—NH* | |
| 162 | 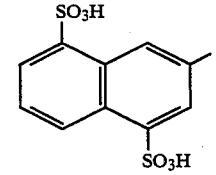 | NHCONH$_2$ | —NHCH$_2$CH$_2$NH—* | |
| 163 | 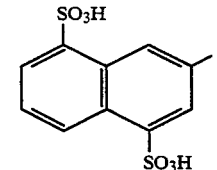 | NHCOCH$_3$ | —NHCH$_2$CH$_2$NH—* | 412 nm |
| 164 | 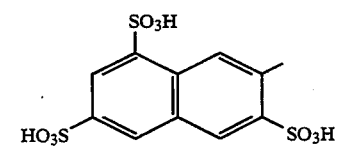 | NHCOCH$_2$OH | —NHCH$_2$CH$_2$NH—* | 410 nm |

TABLE 9-continued

| Ex. | D | R¹ | B*) | λmax (H₂O) |
|---|---|---|---|---|
| 165 | 1,5-SO₃H, 2,7-SO₃H naphthalene (HO₃S at positions) | NHCOCH₃ | —NHCH₂—CH(CH₃)—NH—* | 412 nm |
| 166 | same naphthalene disulfonic D | NHCOCH₃ | —N(piperazine)N—* | 416 nm |
| 167 | same | NHCOCH₃ | —N(piperazine)NCH₂CH₂—NH—* | 410 nm |
| 168 | same | NHCOCH₃ | NH—(CH₂)₄—CH(CO₂H)—NH—* | |
| 169 | same | NHCOCH₃ | NH—(CH₂)₃—NH—* | 412 nm |
| 170 | same | NHCOCH₃ | —N(CH₃)—(CH₂)₃—NH—* | |
| 171 | same | NHCONH₂ | —NH—CH₂CH₂—NH—* | 426 nm |
| 172 | same | NHCONH₂ | —NHCH₂CH(OH)CH₂—NH—* | 428 nm |
| 173 | same | NHCONH₂ | —N(piperazine)N—* | 432 nm |
| 174 | same | NHCONH₂ | —N(piperazine)NCH₂CH₂—NH—* | 416 nm |

TABLE 9-continued

| Ex. | D | R¹ | B*) | $\lambda_{max}$ (H₂O) |
|---|---|---|---|---|
| 175 | naphthalene-1,5,7-trisulfonic acid, 3-methyl (1,5-SO₃H; 7-SO₃H; 3-CH₃) | NHCOCH₃ | —NHCH₂CH(CH₃)NH—* | |
| 176 | naphthalene-1,5,7-trisulfonic acid, 3-methyl | NHCONH₂ | —NHCH₂CH(CH₃)NH—* | |
| 177 | 2-methyl-1,4-benzenedisulfonic acid (1-SO₃H, 4-SO₃H, 2-CH₃... actually 1-SO₃H, 4-HO₃S on benzene with methyl) | NHCOCH₃ | —NHCH₂CH₂NH—* | 396 nm |
| 178 | same as 177 | NHCOCH₃ | —NHCH₂CH(CH₃)NH—* | 397 nm |
| 179 | same as 177 | NHCONH₂ | —NHCH₂CH(CH₃)NH—* | 410 nm |
| 180 | benzene with 1-SO₃H, 4-SO₃H, 2-CH₃ | NHCOCH₃ | —NHCH₂CH(CH₃)NH—* | |
| 181 | same as 180 | NHCONH₂ | piperazinyl: —N(CH₂CH₂)₂N—* | |
| 182 | same as 180 | NHCONH₂ | —NH—(CH₂)—N(CH₃)—* | |

*)The pyrimidinyl radical is always bound to the N atom marked with *.

If trifluorotriazine in Example 154 and the examples of Table 9 is replaced by cyanuric chloride, golden yellow reactive dyestuffs are obtained which have comparably excellent fastness properties, such as

EXAMPLE 183

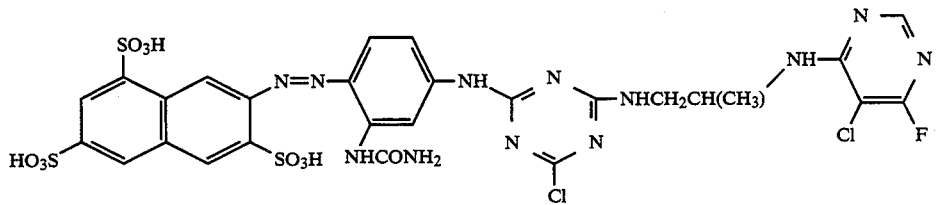

(430 nm)

EXAMPLE 184

As described in Example 122, 15.2 g of sodium 2,4-diaminobenzenesulphonate was first condensed with 12 g of 5-chloro-4,6-difluoropyrimidine and then with 10 g of trifluoro-s-triazine (cyanuric fluoride).

30 g of the dyestuff base of the formula

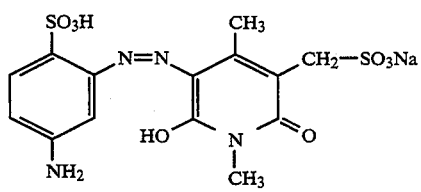

were added to this solution at 0° C. and pH 6.0 to 6.2, and the pH was then kept constant at 7.0 with 20% strength sodium carbonate solution. The mixture was heated to 25° C. at pH 7.0 to 7.2 over a period of 3 hours. The dyestuff solution was clarified by filtration, and 50 g of sodium chloride were added. The mixture was stirred for 1 hour, and the precipitated dyestuff was isolated by filtering it off with suction.

Drying and milling gave about 60 g of a yellow powder ($\lambda_{max}$=424 nm ($H_2O$)) which has the structure

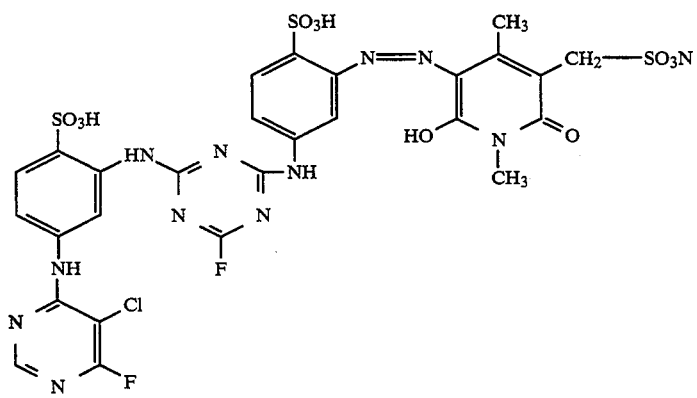

and dyes cotton in brilliant greenish yellow shades.

By varying the pyridine coupling component and the diamino compound, the following further greenish yellow dyestuffs can be prepared analogously to Example 122 and 154;

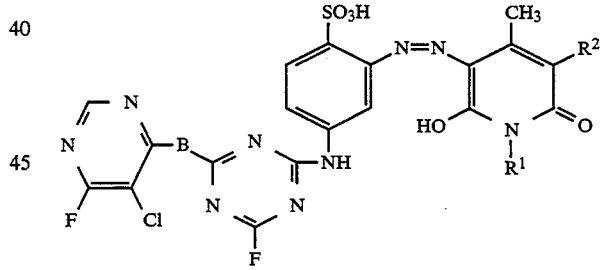

TABLE 10

| Ex. | B | $R^1$ | $R^2$ |
|---|---|---|---|
| 184 | —HN—⟨benzene, SO₃H⟩—*NH— | $C_2H_5$ | $CH_2$—$SO_3H$ |
| 185 | —HN—⟨benzene, SO₃H⟩—*NH— | $CH_2CH_2SO_3H$ | H |

TABLE 10-continued

| Ex. | B | R¹ | R² |
|---|---|---|---|
| 186 | —HN—⟨C₆H₃(SO₃H)⟩—NH—* | CH₂CH₂SO₃H | CONH₂ |
| 187 | —HN—⟨C₆H₃(SO₃H)⟩—NH—* | CH₃ | CH₂—SO₃H |
| 188 | —HN—⟨C₆H₃(SO₃H)⟩—NH—* | C₂H₅ | CH₂—SO₃H |
| 189 | —N(piperazine)N—* | C₂H₅ | CH₂—SO₃H |
| 190 | —N(piperazine)N—* | CH₃ | CH₂—SO₃H |
| 191 | NH—CH₂—CH₂—NH* | CH₃ | CH₂—SO₃H |
| 192 | NH—CH₂—CH₂—NH* | CH₂CH₂SO₃H | H |

The N atoms designated by * are bound to the pyrimidinyl radical.

If the dyestuff base in Example 184 is replaced by a comparable pyrazolone chromophore, dyestuffs such as

EXAMPLE 193

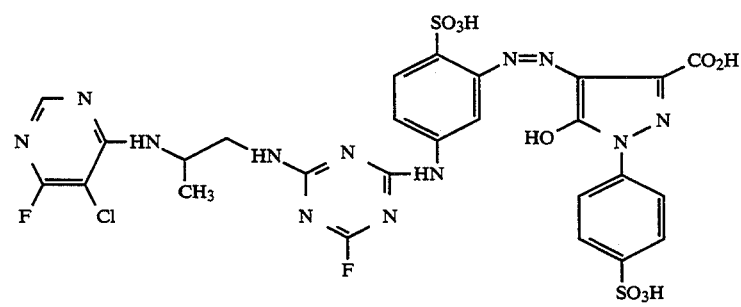

which dyes cotton in clear yellow shades ($\lambda_{max}$=448 nm (H₂O)) can also be prepared.

If the aminoazo compounds listed in Table 11 below are reacted analogously to Example 97.3 under suitable conditions with the reactive component from Example 97.1, dyestuffs are obtained which dye cotton in the hues mentioned.

TABLE 11

| Ex. | Aminoazo compound | Hue |
|-----|-------------------|-----|
| 194 | | dark red |
| 195 | | dark red |
| 196 | | dark red |
| 197 | | dark red |
| 198 | | dark red |
| 199 | | dark red |
| 200 | | dark red |
| 201 | | dark red |

TABLE 11-continued

| Ex. | Aminoazo compound | Hue |
|---|---|---|
| 202 | [structure: 3-amino-6-sulfo-phenol coupled via Cu-complex O—Cu—O and N=N to 3-hydroxy-2,7-naphthalenedisulfonic acid] | dark red |
| 203 | [structure: 2-hydroxy-3-sulfo-5-amino-phenyl azo coupled via O—Cu—O to 1-hydroxy-2-(azo)-3,8-naphthalenedisulfonic acid] | dark red |
| 204 | [structure: 2-hydroxy-3-sulfo-5-amino-phenyl azo coupled via O—Cu—O to 1-hydroxy-2-(azo)-4,8-naphthalenedisulfonic acid] | dark red |
| 205 | [structure: 2-hydroxy-3-sulfo-5-amino-phenyl azo coupled via O—Cu—O to 1-hydroxy-2-(azo)-3,6-naphthalenedisulfonic acid] | dark red |
| 206 | [structure: 2-hydroxy-4-sulfo-5-methyl-phenyl azo coupled via O—Cu—O to 1-hydroxy-2-(azo)-3-sulfo-6-amino-naphthalene] | dark red |
| 207 | [structure: 2-hydroxy-4-methoxy-5-sulfo-phenyl azo coupled via O—Cu—O to 1-hydroxy-2-(azo)-3-sulfo-7-amino-naphthalene] | dark red |
| 208 | [structure: 2-hydroxy-4-sulfo-5-methoxy-phenyl azo coupled via O—Cu—O to 8-hydroxy-7-(azo)-1,4-disulfo-6-amino-naphthalene] | red-violet |
| 209 | [structure: 2-hydroxy-5-sulfo-phenyl azo coupled via O—Cu—O to 8-hydroxy-7-(azo)-1,4-disulfo-6-amino-naphthalene] | dark red |

TABLE 11-continued

| Ex. | Aminoazo compound | Hue |
|---|---|---|
| 210 | [structure] | dark red |

1:2 Cr complex of

| 211 | [structure] | grey-blue (black) |

1:2 Co complex of

| 212 | [structure] | yellow-brown |
| 213 | [structure] | blue |
| 214 | [structure] | blue |
| 215 | [structure] | blue |

TABLE 11-continued

| Ex. | Aminoazo compound | Hue |
|---|---|---|
| 216 | | blue |
| 217 | | navy |

If the condensation products obtained according to Example 97.2 or 97.3 from the aminoazo compounds listed in Table 12 below with the reactive component from Example 97.1 are reacted in a known manner at equimolar amounts of hydrogen peroxide, copper complex dyestuffs are obtained which dye cotton in the hues mentioned, for example from the aminoazo compound from Example 218 the dyestuff of the formula

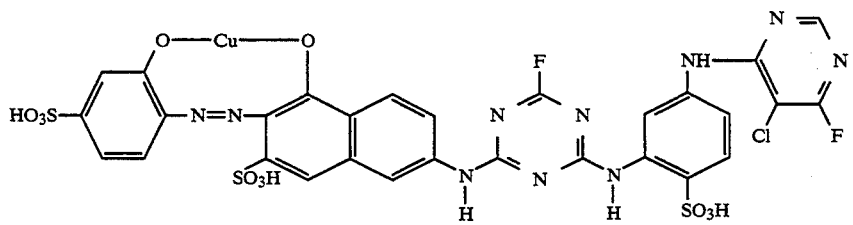

pH 5 to 7 and 20° C. to 60° C. in aqueous solution with

TABLE 12

| Ex. | Aminoazo compound | Hue |
|---|---|---|
| 218 | | dark red |
| 219 | | dark red |
| 220 | | dark red |
| 221 | | dark red |

TABLE 12-continued
| Ex. | Aminoazo compound | Hue |
|---|---|---|
| 222 | | blue |
| 223 | | blue |
| 224 | | blue |
| 225 | | blue |
| 226 | | navy |
If aminodisazo dyestuffs of the general formula
are reacted with the reactive component from Example 97.1 analogously to Example 97, dyestuffs of the general formula from Table 13
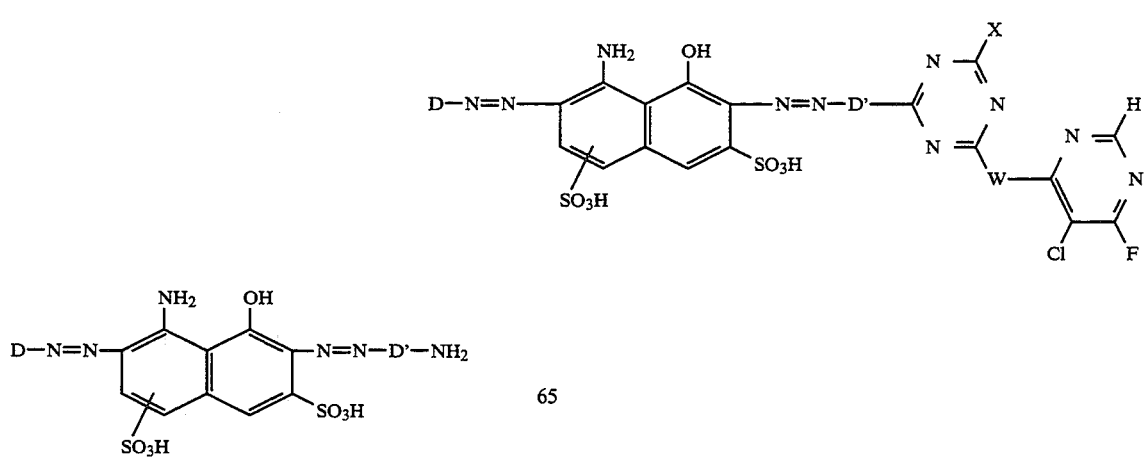
are obtained which dye cotton in the hues mentioned.

TABLE 13

| No. | Y | D | K | D' | W | Hue |
|---|---|---|---|---|---|---|
| 227 | F | 2-amino-1,4-benzenedisulfonic acid (SO₃H, NH₂, HO₃S) | 8-amino-1-hydroxynaphthalene-3,6-disulfonic acid | 1,4-phenylenediamine | 2,4-diaminobenzenesulfonic acid (*NH₂) | Black |
| 228 | F | 2-amino-1,4-benzenedisulfonic acid | 8-amino-1-hydroxynaphthalene-3,6-disulfonic acid | 2,4-diaminobenzenesulfonic acid (*NH₂) | 2,4-diaminobenzenesulfonic acid (*NH₂) | Navy Black |
| 229 | F | 4-aminobenzenesulfonic acid | 8-amino-1-hydroxynaphthalene-3,6-disulfonic acid | 2,4-diaminobenzenesulfonic acid (*NH₂) | 2,4-diaminobenzenesulfonic acid (*NH₂) | Navy Black |
| 230 | F | 2-aminonaphthalene-1,5-disulfonic acid | 8-amino-1-hydroxynaphthalene-3,6-disulfonic acid | 2,4-diaminobenzenesulfonic acid (*NH₂) | 2,4-diaminobenzenesulfonic acid (*NH₂) | Black |
| 231 | F | 4-aminobenzenesulfonic acid | 8-amino-1-hydroxynaphthalene-3,6-disulfonic acid | 3-amino-4-sulfo-N-methylbenzylamine (HN*—CH₃) | 2,4-diaminobenzenesulfonic acid (*NH₂) | Navy |
| 232 | F | 4-aminobenzenesulfonic acid | 8-amino-1-hydroxynaphthalene-2,5-disulfonic acid | 2,4-diaminobenzenesulfonic acid (*NH₂) | 2,4-diaminobenzenesulfonic acid (*NH₂) | Navy |
| 233 | F | 2-amino-4-chlorobenzenesulfonic acid | 8-amino-1-hydroxynaphthalene-2,5-disulfonic acid | 2,4-diaminobenzenesulfonic acid (*NH₂) | 2,4-diaminobenzenesulfonic acid (*NH₂) | Navy |

+)The N atoms designated by * are linked to the triazinyl radical

The following dyestuffs which dye cotton in the hues mentioned

234

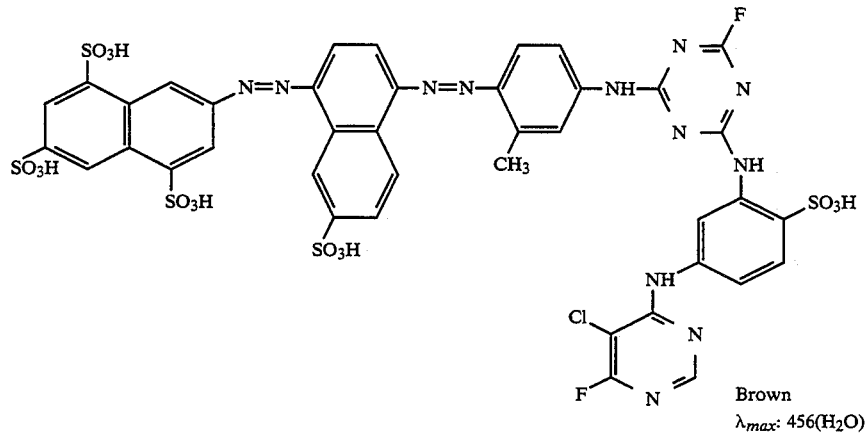

Brown
λ_max: 456(H2O)

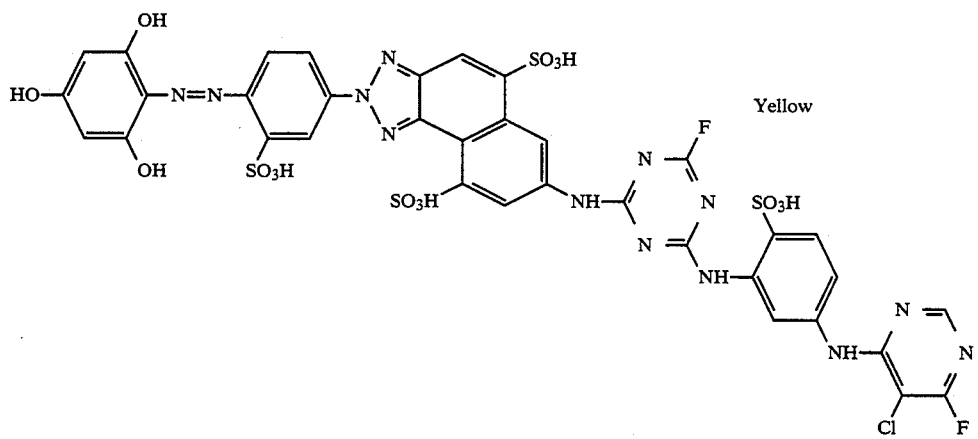

Yellow can be prepared analogously to Example 97.3.

EXAMPLE 236

18.8 g of 2,4-diaminobenzenesulphonic acid are dissolved in 80 ml of water by neutralisation with 10% strength lithium hydroxide solution and condensed at 25° to 40° C. with 15.4 g of 2,4,6-trifluoropyrimidine at pH 5.5 to 6.0. After consumption of lithium hydroxide is complete, 19.3 g of cyanuric chloride are added to the solution of the condensation product, the temperature is maintained at 20° to 25° C. and the pH at 5.0 using lithium hydroxide. When no more diazotisable amino group can be detected, the second condensation step is concluded, and a solution or viscous suspension of the compound in the form of its lithium salt has been formed.

46.5 g of 1-amino-4-(2'-aminomethyl-4'-methyl-6'-sulphophenylamino)-anthraquinone-2-sulphonic acid are dissolved in 300 ml of water and 10 g of caprolactam with neutralisation at pH at 7° and 70° C. After cooling to room temperature, the solution is added to the condensation product from Example 1.1, and the pH in the reaction mixture is maintained at 6.0 to 6.5 with 10% strength sodium carbonate solution or lithium hydroxide solution. When consumption of the alkaline condensating agent has come to a standstill after several hours, and a chromatographic sample indicates that the coloured educt has disappeared, the solution is salted out with 20% sodium chloride, the dyestuff is filtered off with suction and washed with 20% strength sodium chloride solution and dried at 50° C. in vacuo. The dyestuff of the formula

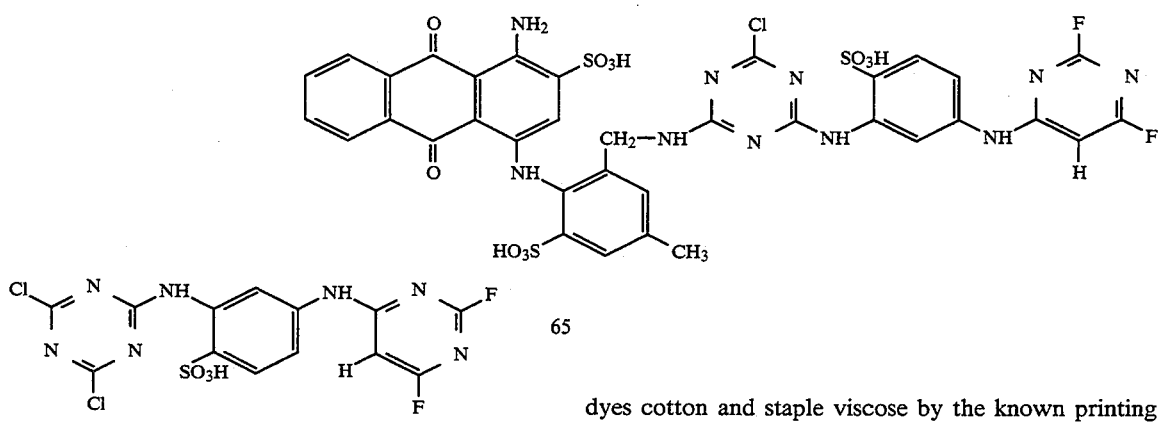

dyes cotton and staple viscose by the known printing and continuous processes in a high fixation yield in brilliant reddish blue shades having excellent wet fastness properties. $\lambda_{max}$=621 nm, 583 nm in $H_2O$.

solution. The blue powder obtained after drying at 40° C. in vacuo has the formula

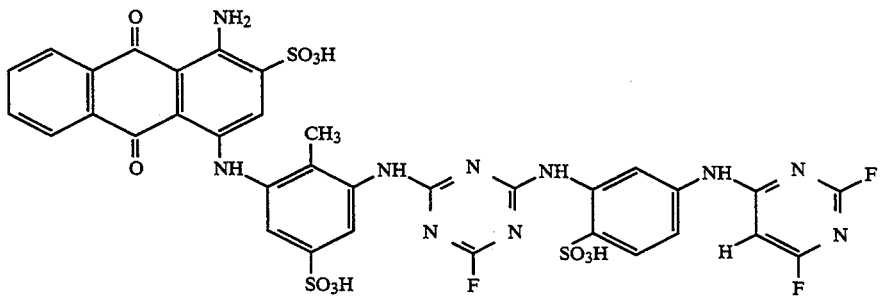

and dyes cotton in neutral blue shades. $\lambda_{max}$=611 nm in $H_2O$.

EXAMPLE 237

If the condensation product obtained from 2,4-diaminobenzene and 2,4,6-trifluoropyrimidine in Example 236 is reacted with 14.2 g of cyanuric fluoride instead of cyanuric chloride at 0° to 5° C. and pH 4.5 to 5.0, and the difluorotriazinyl product obtained is then condensed with the dyestuff from Example 1.2 at 0° to 10° C. and pH 6.0, a dyestuff of the formula

EXAMPLE 239

39.9 g of 4-amino-6-(2',4'-difluoro-6'-pyrimidinylamino)-benzene-1,3-disulphonic acid (prepared by sulphonation of the condensation product of 2,4-diaminobenzenesulphonic acid with 2,4,6-trifluoropyrimidine in 4.5 times the amount of 20 to 30%

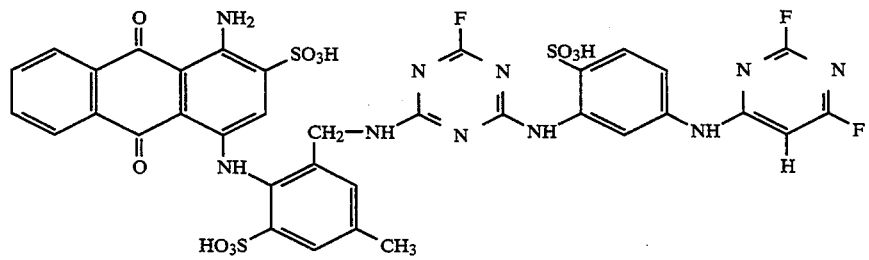

is obtained, which after suitable work-up likewise dyes cellulose fibres in high fixation yields in brilliant blue shades. $\lambda_{max}$=621 nm, 583 nm in $H_2O$.

EXAMPLE 238

The condensation product obtained from 18.8 g of 2,4-diaminobenzenesulphonic acid, 15.4 g of 2,4,6-trifluoropyrimidine and 14.2 g of cyanuric fluoride as mentioned in Example 237 is introduced into a neutralised solution of 41.9 g of 1-amino-4-(3'-amino-2'-methyl-5'-sulphophenylamino)-anthraquinone-2-sulphonic acid in 500 ml of water at 10° to 15° C., and the pH is maintained at 5.5 to 6.0 with 10% strength sodium carbonate solution. After reaction is complete, the dyestuff is salted out with sodium chloride, filtered off with suction and washed with 10% strength sodium chloride strength oleum, pouring the oleum solution onto icewater and removing the sulphuric acid by precipitation with calcium carbonate) are condensed in 250 ml of water with 19.4 g of cyanuric chloride at 15° C. and pH 4.5 to 5.0. After condensation is complete, the pH is brought to 7 and the temperature to 20° C.

A solution of 34.8 g of 1-amino-4-(4'-aminocyclohexylamino)-anthraquinone-2-sulphonic acid in 380 ml of water, which has been brought to a pH of 11.5, is then run in at such a rate that a pH of 8.5 to 9.0 is maintained in the reaction mixture by simultaneous metering-in of 2N sodium hydroxide solution. The solid obtained is salted out with potassium chloride, filtered off with suction, washed and dried at 50° C. in vacuo. It has the formula

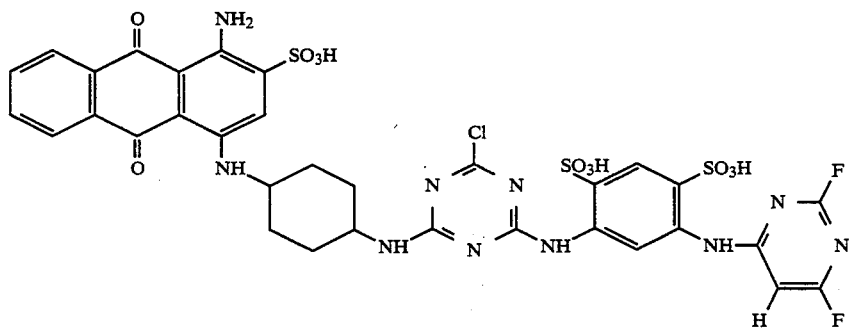

and dyes and prints cellulose fibres by the known techniques in very high fixation yields in bright blue shades. $\lambda_{max}=634$ nm, 592 nm in $H_2O$.

EXAMPLE 240

53.1 g of 1-amino-4-(3'-amino-5'-sulpho-2',4',6'-trimethylphenylamino)-anthraquinone-2-sulphonic acid are dissolved in 530 parts of water at pH 6.

12.4 g of cyanuric chloride are dissolved in 100 ml of methyl ethyl ketone, and the solution is poured onto 100 g of ice. The dyestuff solution is then added dropwise to the cyanuric chloride suspension at 0° to 10° C., and the pH in the reaction mixture is maintained at 4.5 using 10% strength sodium carbonate solution. After reaction is complete, 41.8 g of the condensation product obtained from 2,5-diaminobenzene-1,4-disulphonic acid and 2,4,6-trifluoro-pyrimidine are added in the form of an aqueous sodium salt solution, the pH is maintained at 6.0, the temperature at 25° C. for 3 hours, and later at 35° to 40° C. After condensation is complete, the product is salted out and dried.

The dyestuff obtained of the formula

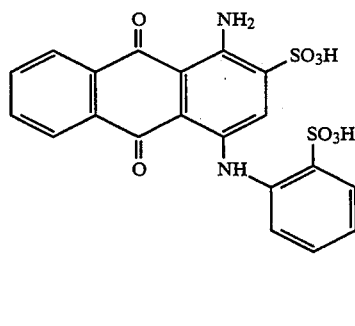

produces on cellulose fibres by the known continuous and printing processes brilliant reddish blue dyeings in very high fixation yields.

EXAMPLE 241

18.8 g of 2,5-diaminobenzenesulphonic acid are condensed in 150 ml of water analogously to Example 236 with 15.4 g of 2,4,6-trifluoropyrimidine. 14.2 g of cyanuric fluoride are added dropwise to the solution of the condensation product at 0° to 5° C., and the pH is maintained during this addition at 4.5 to 5.0. A neutralised solution of 45 g of 1-amino-4-(4'-N-methylaminomethyl-2'-sulpho-phenylamino)anthraquinone-2-sulphonic acid in 600 ml of water is added to the product formed of the formula

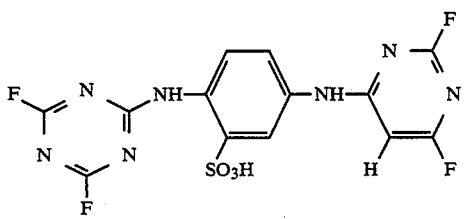

the pH is maintained at 5.5 to 6.0, and the temperature is allowed to rise gradually to 15° C. over a period of 3 hours. After reaction is complete, the dyestuff is isolated by salting out, buffered at pH 6.0 by addition of 3% of primary and secondary sodium phosphate and dried. The product of the formula

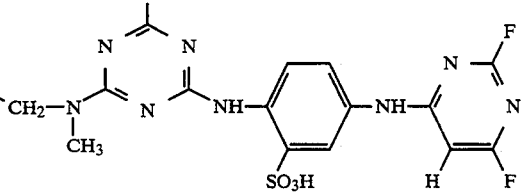

dyes cellulose fibres by the dyeing techniques customary for reactive dyestuffs in neutral blue hues. $\lambda_{max}=600$ nm in $H_2O$.

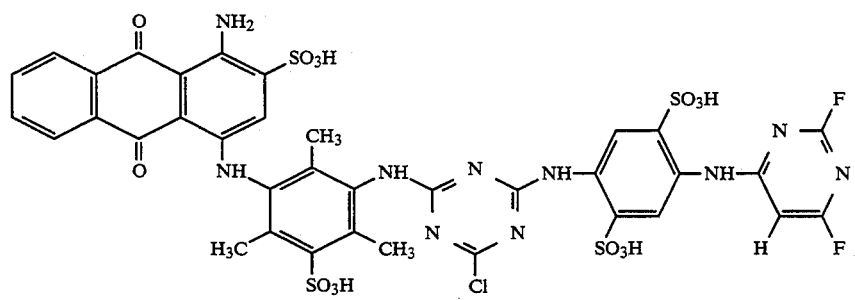

EXAMPLE 242

The condensation product prepared by the procedure of Example 236 from 9.4 g of 2,4-diaminobenzenesulphonic acid, 7.7 g of 2,4,6-trifluoropyrimidine and 9.65 g of cyanuric chloride is introduced into a neutralised solution of 21 g of 1-amino-4-(3'-amino-4'-sulphophenylamino)-anthraquinone-2-sulphonic acid in 250 ml of water, the temperature is maintained at 25° C. and the pH at 6.0 to 6.5 using 20% strength sodium carbonate solution or 10% strength lithium hydroxide solution. Isolation of the product by salting out, followed by drying, gives a dyestuff of the formula

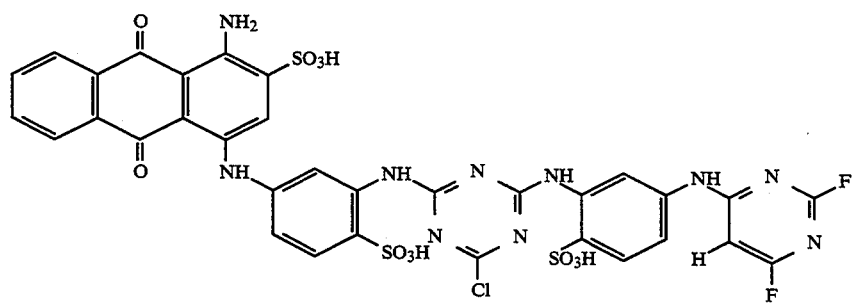

which dyes cotton in blue hues and high fixation yields. $\lambda_{max}=596$ nm in H$_2$O.

Analogously to Examples 236 to 242, the following dyestuffs of the general formula

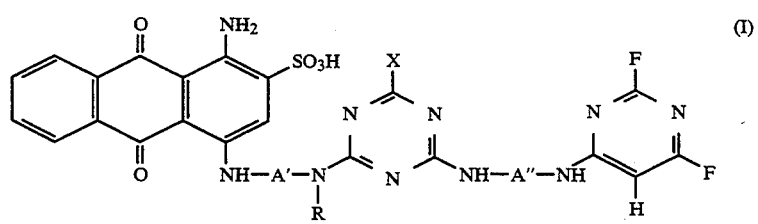

(I)

in which the substituents have the meanings given in the table below, can also be prepared.

TABLE 14

| No. | A' | R | X | A'' |
|---|---|---|---|---|
| 243 | cyclohexyl | H | F | 2,5-disulfo-phenyl |
| 244 | cyclohexyl | H | F | 2,5-disulfo-phenyl |
| 245 | cyclohexyl | H | Cl | 2,5-disulfo-phenyl |
| 246 | cyclohexyl | H | F | 2,4-disulfo-phenyl |
| 247 | 2,5-dimethyl-4-sulfo-benzyl | H | Cl | 4-sulfo-phenyl |

TABLE 14-continued

| No. | A' | R | X | A'' |
|---|---|---|---|---|
| 248 | 2,5-dimethyl-4-sulfo-benzyl | H | Cl | 2,5-dimethyl-4-sulfo-phenyl |
| 249 | 2,6-dimethyl-4-sulfo-phenyl | H | F | 2,5-dimethyl-4-sulfo-phenyl |
| 250 | 2,6-dimethyl-4-sulfo-phenyl | H | F | 2,5-disulfo-phenyl |
| 251 | 2,5-dimethyl-4-sulfo-phenyl | H | F | 2,5-dimethyl-4-sulfo-phenyl |
| 252 | 2,3,5,6-tetramethyl-4-sulfo-phenyl | H | F | 4-sulfo-phenyl |

TABLE 14-continued

| No. | A' | R | X | A" |
|---|---|---|---|---|
| 253 | 2,4,6-trimethyl-3-sulfophenyl (CH3, CH3, CH3, SO3H) | H | Cl | 4-methyl-2,5-disulfophenyl (SO3H, SO3H) |
| 254 | 2,4,6-trimethyl-3-sulfobenzyl (—CH2—, CH3, CH3, CH3, SO3H) | CH3 | F | 4-methyl-2-sulfophenyl (SO3H) |
| 255 | 2,4,6-trimethyl-3-sulfobenzyl (—CH2—, CH3, CH3, CH3, SO3H) | CH3 | Cl | 4-methyl-2-sulfophenyl (SO3H) |
| 256 | 4-methyl-3-sulfobenzyl (—CH2—, SO3H) | CH3 | Cl | 4-methyl-2-sulfophenyl (SO3H) |
| 257 | 3-methylphenyl | H | F | 4-methyl-2,5-disulfophenyl (SO3H, SO3H) |
| 258 | 4-methyl-2-sulfophenyl (SO3H) | CH3 | F | 4-methyl-2-sulfophenyl (SO3H) |
| 259 | 2,6-dimethylphenyl (CH3, CH3) | H | F | 4-methyl-2,5-disulfophenyl (SO3H, SO3H) |

Example 260

17.6 g of the triphendioxazine compound of the formula

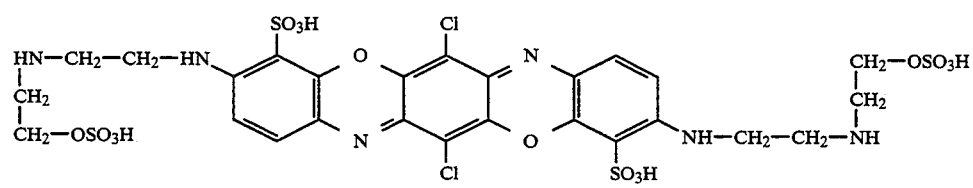

are dissolved in 600 ml of water by bringing the pH to 9 with 2N sodium hydroxide solution. The condensation product of the formula

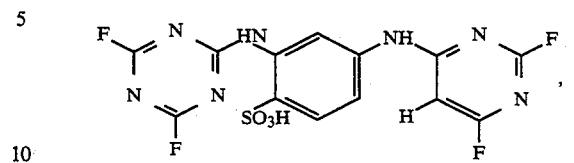

prepared from 9.8 g of 2,4-diaminobenzenesulphonic acid, 8.0 g of 2,4,6-trifluoropyrimidine and 7.2 g of cyanuric fluoride is added to the solution at 0° to 10° C., and the pH of the reaction mixture is maintained at 8.5 to 9.0. After reaction is complete, the dyestuff of the formula

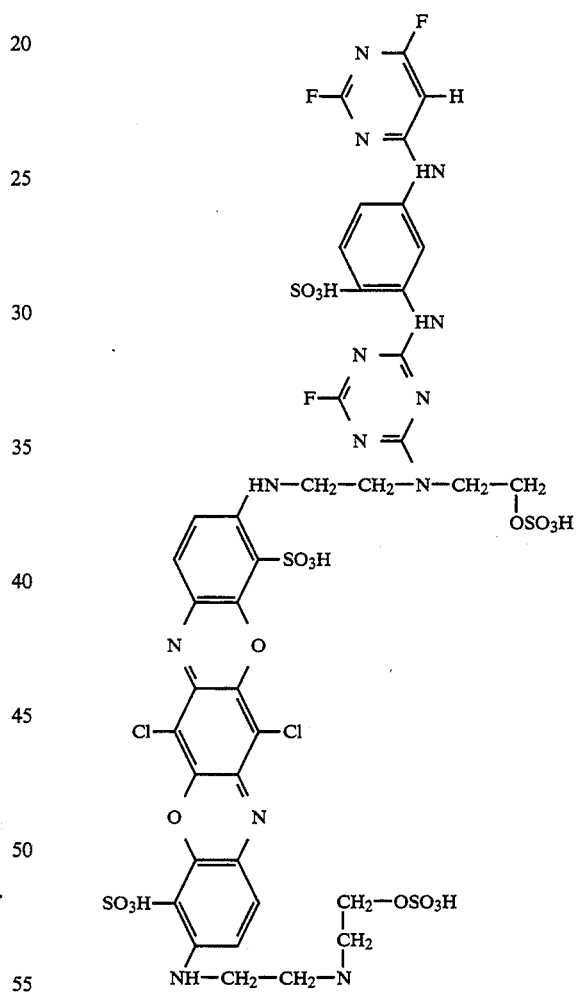

-continued

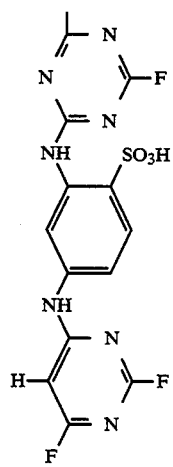

is isolated by salting out and dried at 50° C. in vacuo.

EXAMPLE 261

47.3 g of 4-amino-6-(2′,4′-difluoro-6′-pyrimidinylamino)benzenesulphonic acid are condensed in 350 ml of water with 22.4 g of cyanuric chloride by the procedure of Example 239.

30.0 g of the triphendioxazine compound of the formula

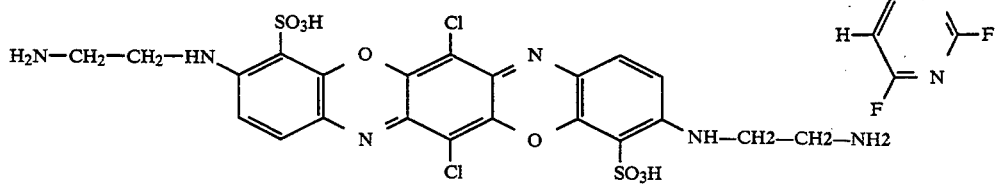

are dissolved in 500 ml by addition of 70 ml of 2N sodium hydroxide solution.

Both products are added evenly at 20° C. to 80 ml of previously introduced water at such a rate that a pH of 9.0 to 9.5 is established in the resulting reaction mixture. After the components have been combined, the pH is further maintained at this value using 2N sodium hydroxide solution until condensation is complete.

The resulting solid of the formula

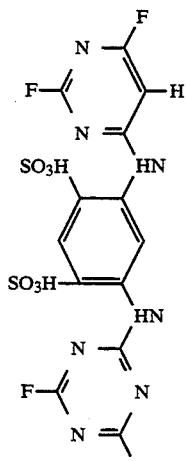

-continued (II)

is salted out and dried at 50° C. in vacuo. It dyes cotton in strong blue shades. $\lambda_{max}=623$ nm in $H_2O$.

Analogously to Examples 260 and 261, further triphendioxazine reactive dyestuffs of the general formula

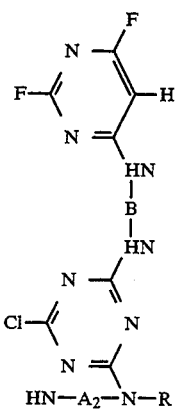

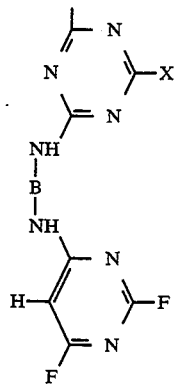

in which the substituents have the meanings given in the table, can be prepared. (Colour indicator numbers according to Colour Index Hue Indication Chart).

TABLE 15

| No. | $A_2$ | R | X | B | Colour indicator number |
|---|---|---|---|---|---|
| 262 | —(CH$_2$)$_3$— | H | F | HO$_3$S-C$_6$H$_2$(CH$_3$)$_2$-SO$_3$H | 14 |
| 263 | —(CH$_2$)$_2$— | H | F | HO$_3$S-C$_6$H$_2$(CH$_3$)$_2$-SO$_3$H | 14 |
| 264 | —(CH$_2$)$_4$— | H | Cl | C$_6$H$_2$(CH$_3$)$_2$(SO$_3$H)$_2$ | 14 |
| 265 | —(CH$_2$)$_3$— | CH$_3$ | F | HO$_3$S-C$_6$H$_2$(CH$_3$)$_2$-SO$_3$H | 14 |
| 266 | —(CH$_2$)$_2$— | CH$_2$—CH$_2$—OSO$_3$H | F | HO$_3$S-C$_6$H$_2$(CH$_3$)$_2$-SO$_3$H | 14 |
| 267 | —(CH$_2$)$_3$— | H | F | C$_6$H$_2$(CH$_3$)$_2$(SO$_3$H)$_2$ | 14 |

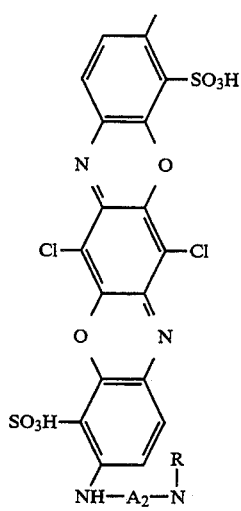

EXAMPLE 268

48.2 g of the copper phthalocyanine component of the formula

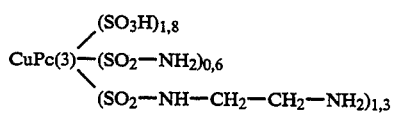

prepared by the procedure given in European Patent 0,073,267 are dissolved in 450 ml of water at a pH of 7. A suspension of the condensation product which was previously prepared by the procedure of Example 236 from 12.5 g of 2,4-diaminobenzenesulphonic acid, 10.3 g of 2,4,6-trifluoropyrimidine and 12.9 g of cyanuric chloride is then added at 20° to 25° C., and the pH in the reaction mixture is maintained at 7.0 to 7.5 by addition of 2N sodium hydroxide solution. When the consumption of the sodium hydroxide solution has come to a standstill, the dyestuff formed of the formula

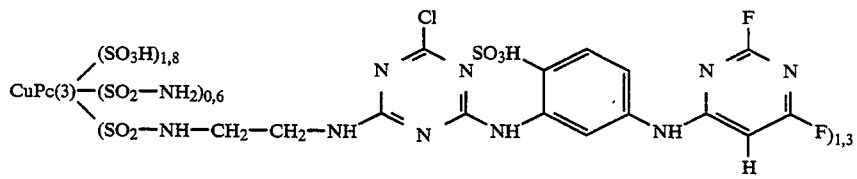

is salted out with sodium chloride and dried. The blue-green powder produces on cotton and staple viscose in high fixation yield clear greenish blue prints and dyeings having excellent wet fastness properties. $\lambda_{max} = 669$ nm, 627 nm in $H_2O$.

EXAMPLE 269

If equimolar amounts of a nickel phthalocyanine component of the formula

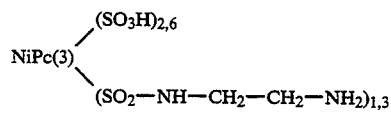

prepared by the procedure given in German Offenlegungsschrift 3,405,204 are used in Example 268 instead of the copper phthalocyanine component, a nickel phthalocyanine dyestuff of the formula

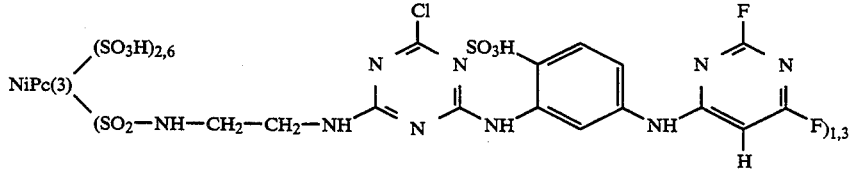

is obtained. $\lambda_{max} = 662$ nm in $H_2O$.

The dyestuff produces on cotton and staple viscose clear bluish green dyeings having excellent wet fastness properties in a high fixation yield.

Analogously, further metal phthalocyanine reactive dyestuffs of the general formula

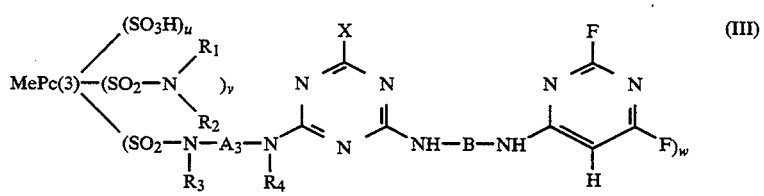

in which the meanings of the substituents and the indices are given in Examples No. 270 to 285 in the table below, can be synthesised.

TABLE 16

| No. | Me | R$_1$ | R$_2$ | R$_3$ | R$_4$ | A$_3$ | X | B | u | v | w |
|---|---|---|---|---|---|---|---|---|---|---|---|
| 270 | Cu | H | H | CH$_3$ | CH$_3$ | —(CH$_2$)$_2$— | Cl | 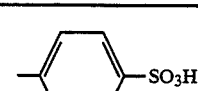 | 1,9 | 0,8 | 1,1 |
| 271 | Cu | — | — | H | H | —(CH$_2$)$_2$— | Cl |  | 2,6 | 0 | 1,3 |

TABLE 16-continued
| No. | Me | R₁ | R₂ | R₃ | R₄ | A₃ | X | B | u | v | w |
|---|---|---|---|---|---|---|---|---|---|---|---|
| 272 | Cu | H | CH₂—CH₂—SO₃H | H | H | —(CH₂)₂— | Cl | 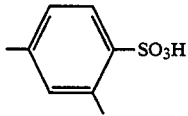 | 2,0 | 0,6 | 1,3 |
| 273 | Cu | CH₃ | CH₂—CH₂—SO₃H | H | H | —(CH₂)₂— | F | 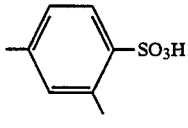 | 1,9 | 0,6 | 1,3 |
| 274 | Cu | H | H | H | H | —(CH₂)₂— | F | 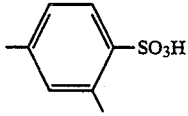 | 1,9 | 0,6 | 1,3 |
| 275 | Cu | H | H | H | H | 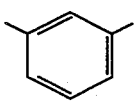 | Cl | 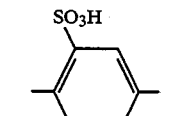 | 2,6 | 0 | 1,3 |
| 276 | Cu | H | CH₂—CH₂—OSO₃H | H | CH₃ | —(CH₂)₃— | Cl | 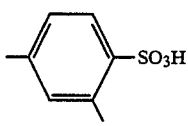 | 2,4 | 0,5 | 1,0 |
| 277 | Cu | H | H | H | H | —(CH₂)₂— | Cl | 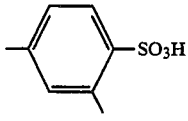 | 1,9 | 0,5 | 1,0 |
| 278 | Cu | H | H | H | H | —(CH₂)₃— | Cl | 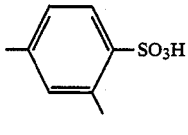 | 2,4 | 0,4 | 1,5 |
| 279 | Ni | H | H | H | H | —(CH₂)₂— | Cl | 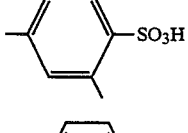 | 2,1 | 0,4 | 1,3 |
| 280 | Ni | H | H | CH₃ | CH₃ | —(CH₂)₂— | F | 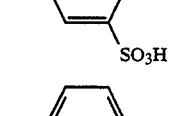 | 2,7 | 0 | 1,2 |
| 281 | Cu | H | H | R₃ + R₄ = CH₂—CH₂—(CH₂)₂— | | | Cl | 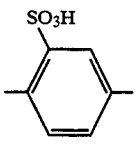 | 2,1 | 0,5 | 1,3 |
| 282 | Cu | H | H | H | H |  SO₃H | Cl |  | 2,2 | 0,5 | 1,2 |

TABLE 16-continued

| | | | Phthalocyanine reactive dyestuffs of the formula III | | | | | | | |
|---|---|---|---|---|---|---|---|---|---|---|
| No. | Me | $R_1$ | $R_2$ | $R_3$ | $R_4$ | $A_3$ | X | B | u | v | w |
| 283 | Cu | H | H | $CH_3$ | $CH_3$ | $-(CH_2)_2-$ | F | 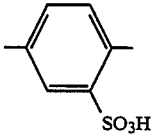 | 2,2 | 0,5 | 1,3 |
| 284 | Ni | — | — | $R_3-R_4 = CH_2-CH_2-$ | | $-(CH_2)_2-$ | Cl | 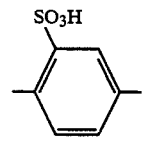 | 2,5 | 0 | 1,3 |
| 285 | Ni | — | — | H | H | $-(CH_2)_2-$ | Cl | 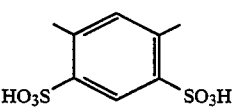 | 2,4 | 0 | 1,4 |

EXAMPLE 286

40 g of 1-amino-4-(2'-aminomethyl-4'-methyl-6'-sulphophenylamino)-anthraquinone-2-sulphonic acid are dissolved in 800 ml of water and 100 ml of acetone by neutralisation with about 45 ml of 2N sodium hydroxide solution at pH 7. The solution is cooled to 10° C., and a solution of 17.5 g of cyanuric chloride in 100 ml of acetone is added dropwise over a period of 15 to 20 minutes. During the dropwise addition, the pH of the reaction mixture is maintained at 6.0 to 7.0 with 2N sodium carbonate solution. When consumption of sodium carbonate has come to a standstill about 1 hour after the addition of the cyanuric chloride, a solution of 40 g of 2-(2-aminoethyl)-aminoethanol in 100 ml of water brought to a pH of 6 with concentrated hydrochloric acid is added, the temperature is raised to 20° to 25° C., and the pH is maintained at 5.5 to 6.0 with 2N sodium hydroxide solution. After condensation is complete, the dyestuff, which essentially has the formula

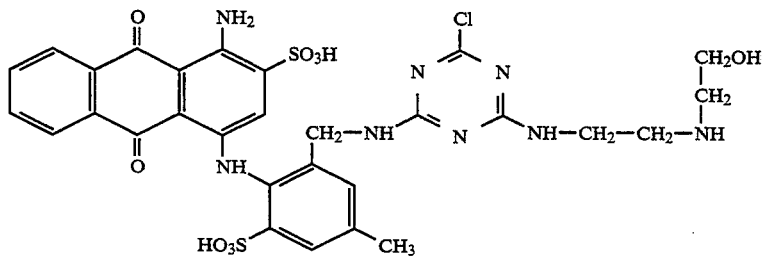

is salted out, filtered off with suction, washed amine-free with saturated sodium chloride solution and dissolved again in 500 ml of water.

14.6 g of 2,4,6-trifluoropyrimidine is added to the solution at 25° C., and the pH is maintained at 7.5 to 8.0 with 2N sodium hydroxide solution. When consumption of sodium hydroxide solution has come to a standstill and the above intermediate can no longer be detected, the resulting product of the formula

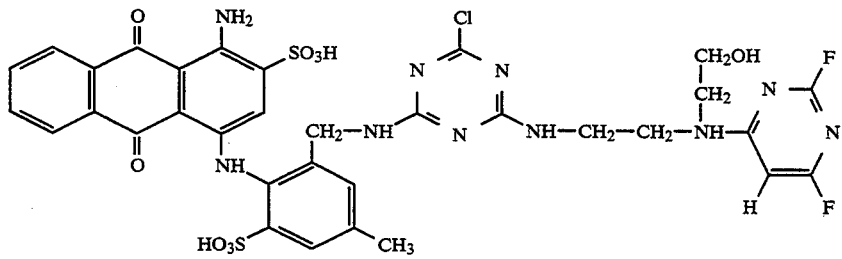

is salted out and dried at 50° C. in vacuo.

The dyestuff produces on cellulose fibres brilliant reddish blue prints having excellent wet fastness properties. $\lambda_{max}=624$ nm, 587 nm in $H_2O$.

EXAMPLE 287

If the corresponding sulphuric acid monoester is used in Example 286 instead of the 2-(2-aminoethyl)-aminoethanol, a dyestuff of the formula

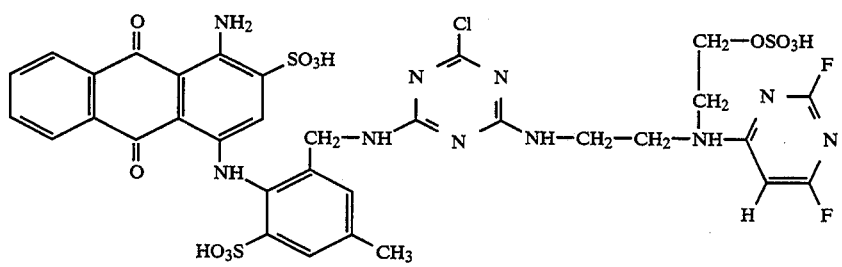

is obtained which, in printing and continuous processes on cotton, has similar fastness properties as the dyestuff from Example 51. $\lambda_{max}$=624 nm, 587 nm in $H_2O$.

Further anthraquinone dyestuffs containing an alkylene-diamine bridging member between the halogenotriazinyl and 2,6-difluoro-4-pyrimidinyl radical are obtained if the following components are used:

TABLE 17

288

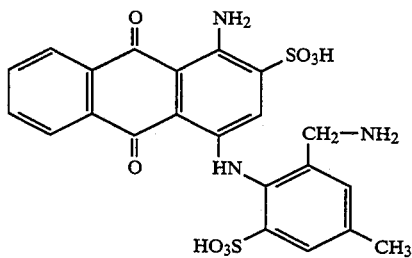 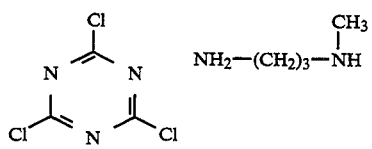 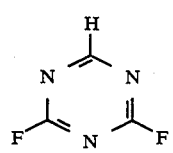

289

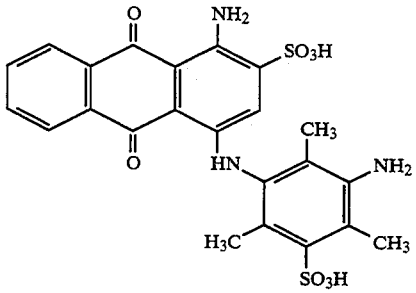 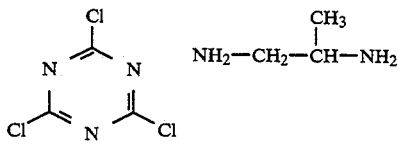 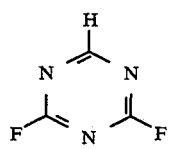

290

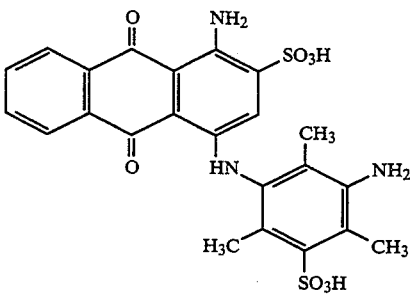 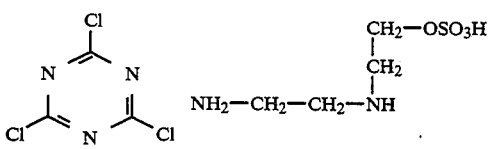 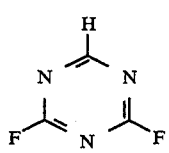

291

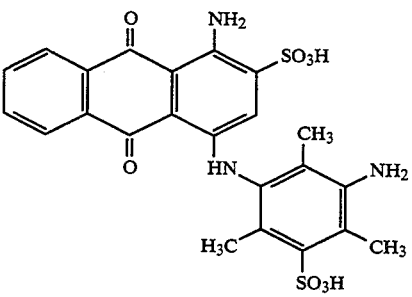 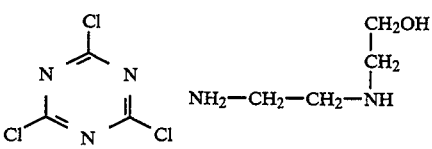 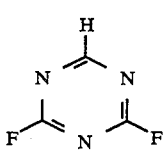

292

TABLE 17-continued
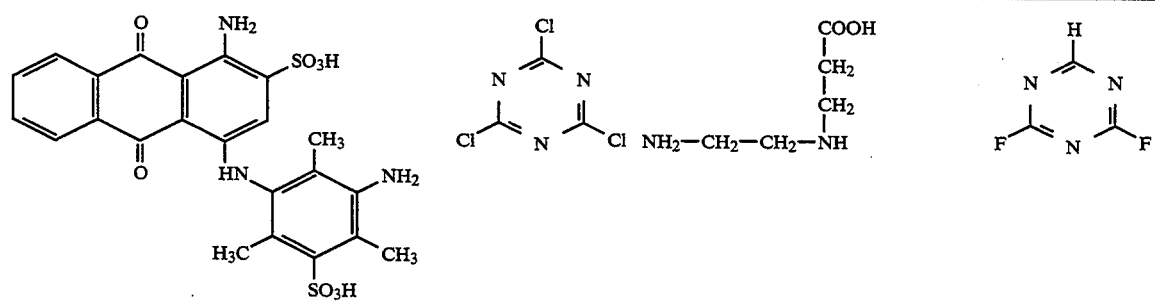
293
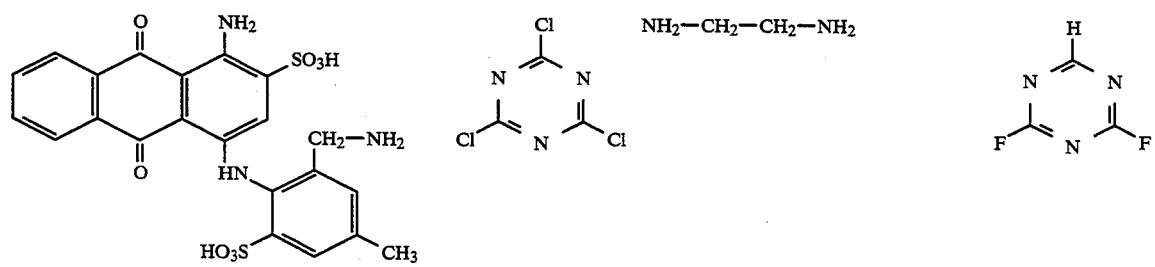
294
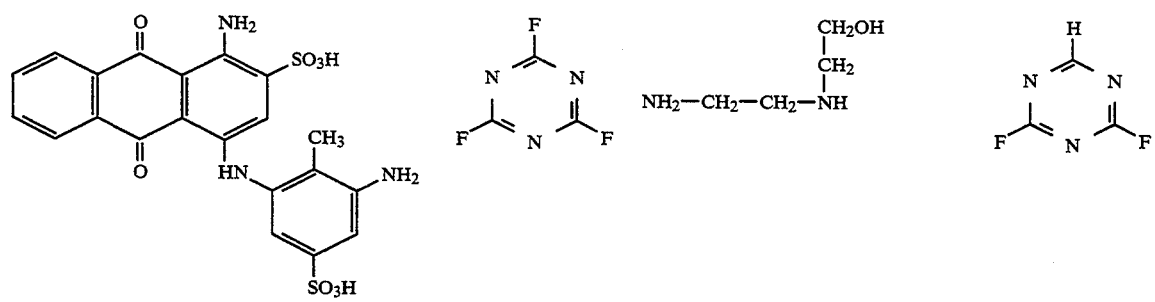
295
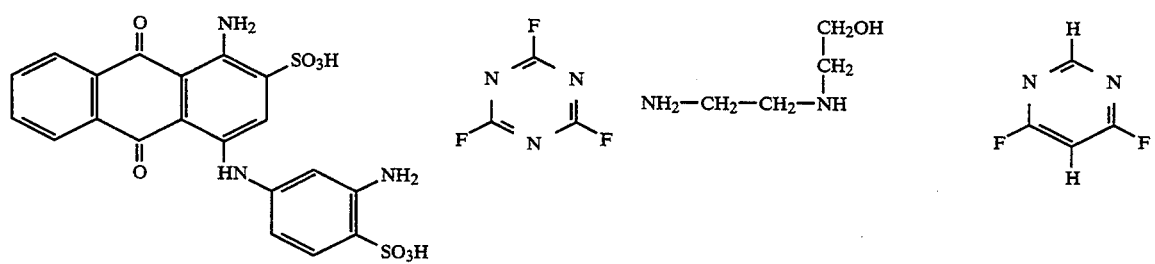
296
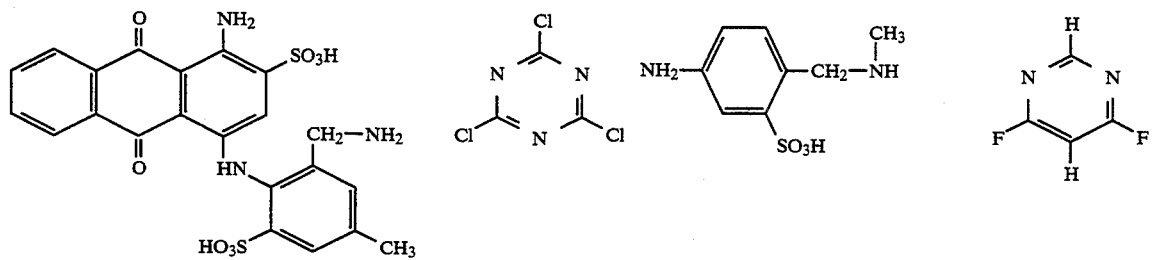
297

TABLE 17-continued

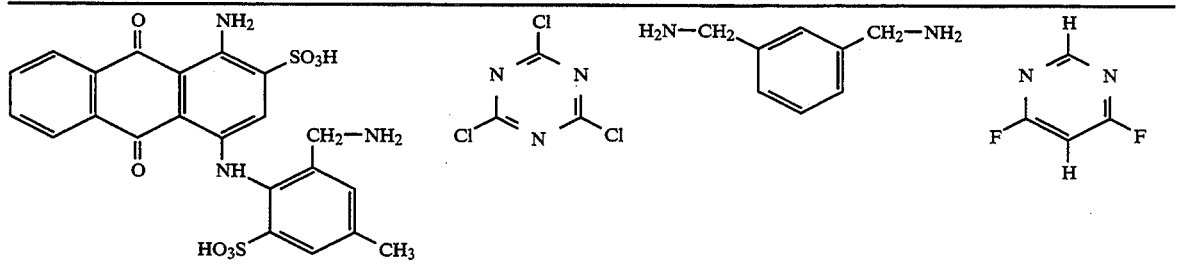

298

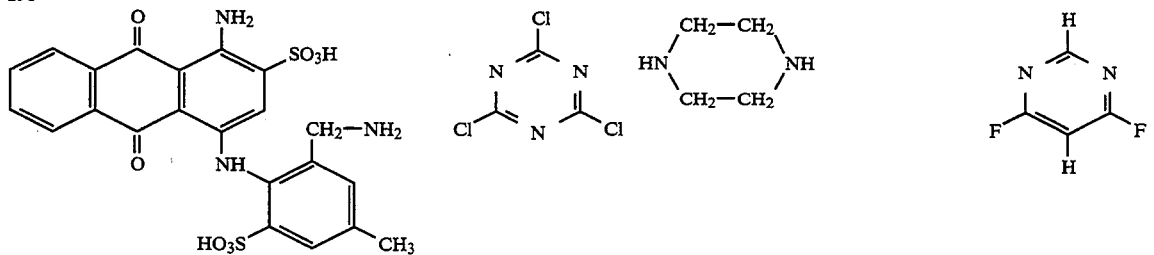

EXAMPLE 299

39.7 g of the copper phthalocyanine compound of the formula

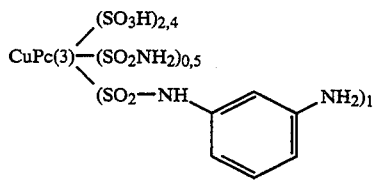

prepared by condensation of copper phthalocyanine (tetrasulphochloride/sulphonic acid) with 3-aminoacetanilide and ammonia, followed by hydrolysis of the acetylamino group with dilute sodium hydroxide solution are dissolved in 450 ml of water at pH 7.

The solution is run into a cyanuric chloride suspension prepared by dissolving 7.6 g of cyanuric chloride in 40 ml of methyl ethyl ketone and pouring the solution onto 60 g of ice. While the dyestuff base is run in, the temperature in the reaction mixture is maintained at 0° to 5° C. by external cooling and the pH at 4.5 to 5.0 using 10% strength sodium carbonate solution. After condensation is complete, a solution of 4.2 g of 2-(2-aminoethyl)-aminoethanol in 40 ml of water brought to a pH of 5.0 is added to the solution obtained.

The temperature is raised to 20° to 25° C. and the pH of the reaction mixture from 5.0 to 6.0 to 6.5 over a period of one hour using 2N sodium hydroxide solution. When consumption of sodium hydroxide solution has come to a standstill indicating that condensation is complete, 7.2 g of 2,4,6-trifluoropyrimidine are added to the reaction mixture, the temperature is maintained at 25° to 28° C. and the pH at 6.5 to 7.0 by addition of further sodium hydroxide solution. After several hours, condensation is complete. The dyestuff is salted out, filtered off with suction and dried in vacuo. It has the formula

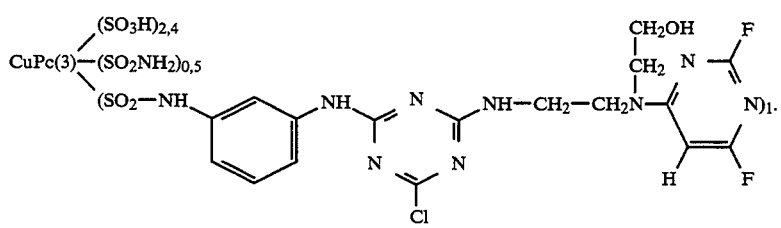

It dyes cotton in a clear greenish blue shade having excellent wet fastness properties and in high fixation yields. $\lambda_{max}=668$ nm in $H_2O$.

Further metal phthalocyanine reactive dyestuffs of the general formula

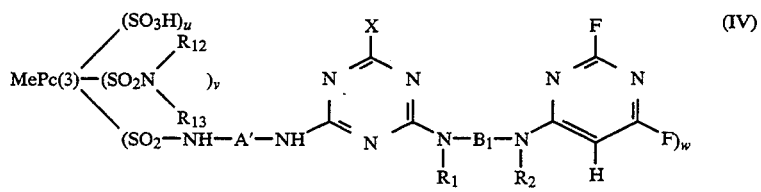

(IV)

in which the meanings of the substituents and indices can be seen from the table below, can be synthesised analogously.

TABLE 18

| No. | Me | R₁₂ | R₁₃ | R₁ | R₂ | A' | B₁ | X | u | v | w |
|---|---|---|---|---|---|---|---|---|---|---|---|
| 300 | Cu | H | H | H | $C_2H_5$ | 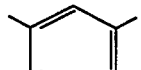 2,4-dimethylbenzene-SO₃H | —(CH₂)₃— | F | 1,1 | 0,5 | 2,3 |
| 301 | Cu | — | — | H | H | 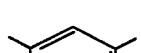 2,4-dimethylbenzene-SO₃H | —CH₂—CH₂— with CH₃ | Cl | 1,4 | 0 | 2,5 |
| 302 | Ni | H | H | H | CH₂—CH₂OH | 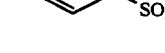 dimethylbenzene | —(CH₂)₂— | Cl | 1,3 | 0 | 2,5 |
| 303 | Cu | CH₃ | CH₂—CH₂—SO₃H | H | CH₃ | 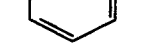 dimethylbenzene | —(CH₂)₃— | Cl | 1,1 | 0,4 | 2,5 |
| 304 | Ni | H | H | H | H |  2,4-dimethylbenzene-SO₃H | —CH₂—CH₂—CH₂—CH₂— (ring)  | F | 1,1 | 0,5 | 2,3 |

EXAMPLE 305

26 g of the sodium salt of the compound of the formula

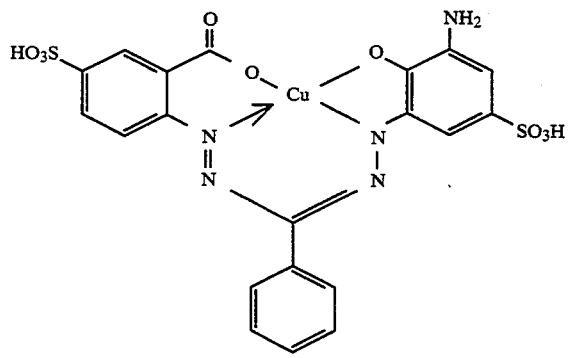

are dissolved in 200 ml of water at pH 7.5. The solution is cooled to 0° C., and 9 g of cyanuric chloride are added, during which the pH is maintained at 5.5 by addition of sodium carbonate solution. After reaction is complete, a neutralised solution of 9.5 g of 2,5-diaminobenzene-1,4-disulphonic acid in 100 ml of water is added dropwise. During this addition, the pH is maintained at 7 with sodium carbonate solution. The temperature is allowed to rise to 25° C. over a period of 2 hours. After condensation is complete, the dyestuff formed is salted out and filtered off with suction.

The dyestuff obtained of the formula

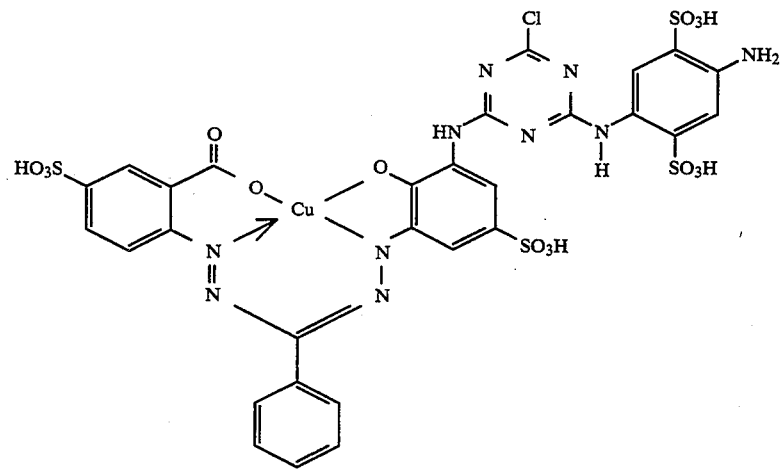

is suspended as a paste in 300 ml of water; the pH of the mixture is brought to 8 to 9 with 10% strength sodium hydroxide solution. 7 g of 2,4,6-trifluoropyrimidine are then added at 40° to 50° C. over a period of 30 minutes, during which the pH is maintained at 8 to 9 with 10% strength sodium hydroxide solution.

After reaction is complete, the dyestuff is salted out, isolated, dried and milled.

The dyestuff thus obtained of the formula

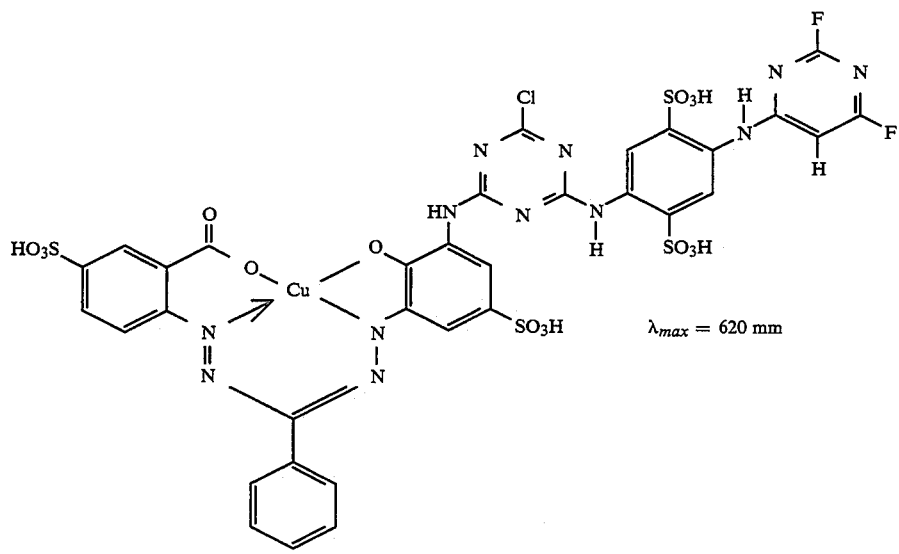

$\lambda_{max} = 620$ mm dyes cotton in blue hues having good fastness properties.

EXAMPLE 306

20 g of 2,5-diaminobenzenesulphonic acid are dissolved in 200 ml of water at a pH of 6.5 to 7.5. 12 g of 2,4,6-trifluoropyrimidine are added at 20° C., and the pH is maintained at 6 to 7. Condensation is completed by heating the mixture to 35° to 45° C. The resulting cloudy solution of the intermediate of the formula

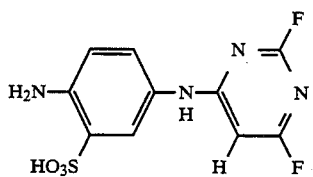

is filtered to give a clear filtrate, which is then cooled to −5° C., followed by addition of 9 ml of cyanuric fluoride. During this, the pH is maintained at 6 with 10% strength sodium hydroxide solution.

35 g of the sodium salt of the compound of the formula

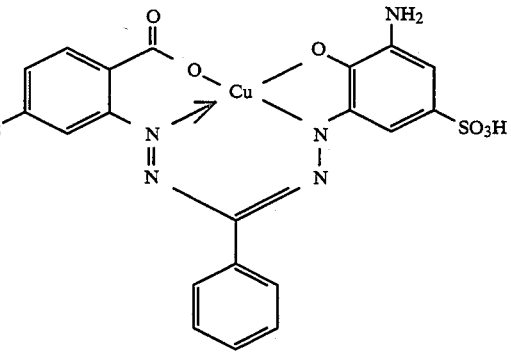

are dissolved in 200 ml of water at pH 7 to 8 and added in portions to the solution of the component of the formula

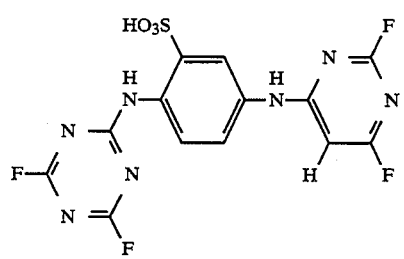

prepared above. During this addition, the pH is maintained at 7 with 10% strength sodium hydroxide solution. The temperature is allowed to rise to 20° C. over a period of 2 hours. The resulting dyestuff of the formula

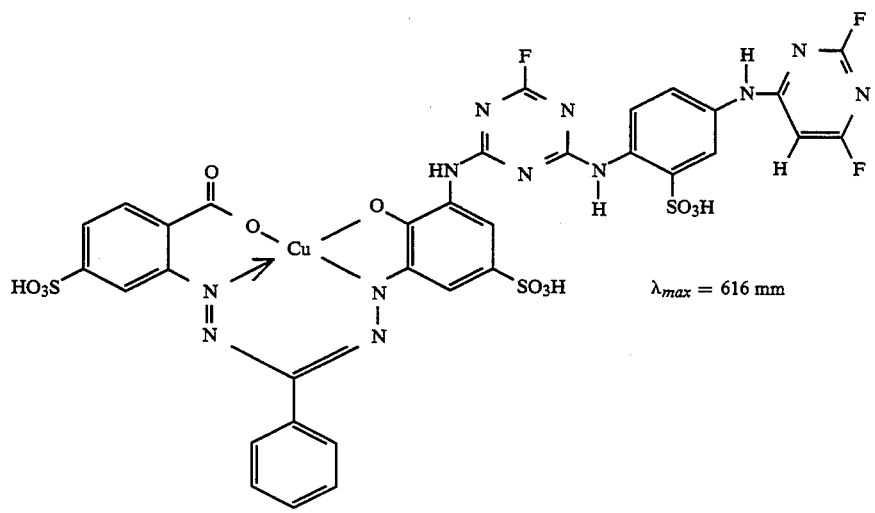

$\lambda_{max} = 616$ mm is salted out, filtered off and dried. It dyes cotton from a long liquor in very high fixation yields in blue hues.

EXAMPLE 307

Further valuable blue formazan dyestuffs according to the invention are obtained by the procedure of Examples 305 or 306 by reacting the components listed in Table 6.

In the bridge —A4—, the N atom designated by * is bound to the C atom of the triazine rings.

The dyestuffs obtained have very good fibre-reactive dyestuff properties and produce, by the dyeing and printing processes customary for cellulose fibres, dyeings and prints of high colour strength and good fastness properties in very high fixation yields.

TABLE 19

| No. | D | Trihalogenotriazine | A4 | $\lambda_{max}$ |
|---|---|---|---|---|
| 308 | N-(2-carboxy-4-sulphophenyl)-N'-(2'-hydroxy-3'-amino-5'-sulphophenyl)-ms-phenylformazan, Cu complex | | | 624 nm |
| 309 | N-(2-carboxy-4-sulphophenyl)-N'-(2'-hydroxy-3'-amino-5'-sulphophenyl)-ms-phenylformazan, Cu complex | | | 616 nm |
| 310 | N-(2-carboxy-4-sulphophenyl)-N'-(2'-hydroxy-3'-amino-5'-sulphophenyl)-ms-phenylformazan, Cu complex | | | 626 nm |
| 311 | N-(2-carboxy-4-sulphophenyl)-N'-(2'-hydroxy-3'-amino-5'-sulphophenyl)-ms-phenylformazan, Cu complex | | | 620 nm |

TABLE 19-continued

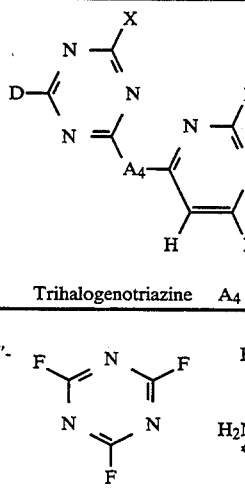

| No. | D | Trihalogenotriazine | A₄ | λ$_{max}$ |
|-----|---|---------------------|-----|-----------|
| 312 | N-(2-carboxy-4-sulphophenyl)-N'-(2'-hydroxy-3'-amino-5'-sulphophenyl)-ms-phenylformazan, Cu complex | 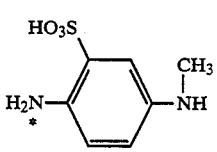 | 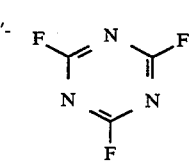 | 622 nm |
| 313 | N-(2-carboxy-5-sulphophenyl)-N'-(2'-hydroxy-3'-amino-5'-sulphophenyl)-ms-phenylformazan, Cu complex | 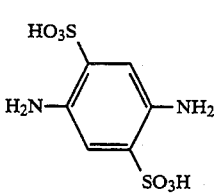 | 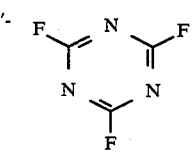 | 610 nm |
| 314 | N-(2-carboxy-5-sulphophenyl)-N'-(2'-hydroxy-3'-amino-5'-sulphophenyl)-ms-phenylformazan, Cu complex | 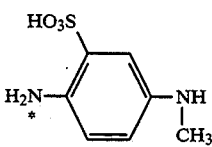 | 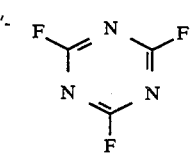 | 616 nm |
| 315 | N-(2-carboxy-5-sulphophenyl)-N'-(2'-hydroxy-3'-amino-5'-sulphophenyl)-ms-phenylformazan, Cu complex | 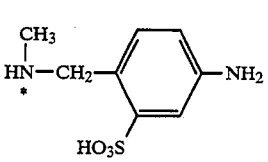 | 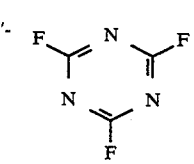 | 618 nm |
| 316 | N-(2-carboxy-5-sulphophenyl)-N'-(2'-hydroxy-3'-amino-5'-sulphophenyl)-ms-phenylformazan, Cu complex | 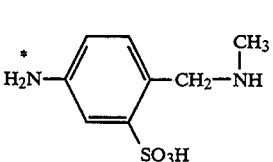 | 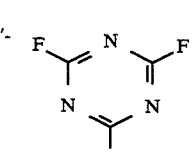 | 620 nm |
| 317 | N-(2-carboxy-5-sulphophenyl)-N'-(2'-hydroxy-3'-amino-5'-sulphophenyl)-ms-phenylformazan, Cu complex | 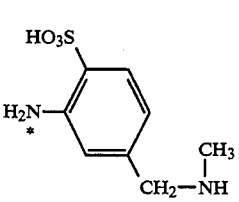 | 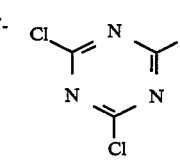 | 622 nm |
| 318 | N-(2-carboxy-5-sulphophenyl)-N'-(2'-hydroxy-3'-amino-5'-sulphophenyl)-ms-phenylformazan, Cu complex | 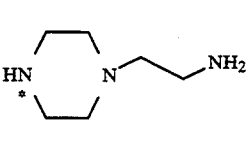 | 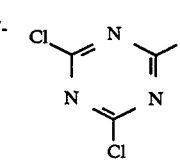 | 614 nm |
| 319 | N-(2-carboxy-5-sulphophenyl)-N'-(2'-hydroxy-3'-amino-5'-sulphophenyl)-ms-phenylformazan, Cu complex | 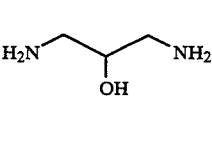 | H₂N―CH₂―CH(OH)―CH₂―NH₂ | 616 nm |

TABLE 19-continued

| No. | D | Trihalogenotriazine | A₄ | λ_max |
|---|---|---|---|---|
| 320 | N-(2-carboxy-5-sulphophenyl)-N'-(2'-hydroxy-3'-amino-5'-sulphophenyl)-ms-phenylformazan, Cu complex | 2,4,6-trifluorotriazine | H₂N–CH₂CH₂CH₂–NH–CH₃ (*on NH₂) | 614 nm |
| 321 | N-(2-carboxy-5-sulphophenyl)-N'-(2'-hydroxy-3'-amino-5'-sulphophenyl)-ms-phenylformazan, Cu complex | 2,4,6-trifluorotriazine | H₂N–CH(CH₃)–CH₂–NH₂ (*on NH₂) | 610 nm |
| 322 | N-(2-carboxy-5-sulphophenyl)-N'-(2'-hydroxy-3'-amino-5'-sulphophenyl)-ms-phenylformazan, Cu complex | 2,4,6-trifluorotriazine | *HN–CH₂CH₂–NH₂ with –CH₂CH₂OH on N | 612 nm |
| 323 | N-(2-carboxy-5-sulphophenyl)-N'-(2'-hydroxy-3'-amino-5'-sulphophenyl)-ms-phenylformazan, Cu complex | 2,4,6-trifluorotriazine | 2-HO₃S, 1-H₂N(*), 4-NH(CH₂CH₃)-phenyl | 615 nm |
| 324 | N-(2-carboxy-4-aminophenyl)-N'-(2'-hydroxy-5'-sulphophenyl)-ms-(2''-sulphophenyl)-formazan, Cu complex | 2,4,6-trichlorotriazine | 2-HO₃S, 1-H₂N(*), 4-NH₂-phenyl | 600 nm |
| 325 | N-(2-carboxy-4-aminophenyl)-N'-(2'-hydroxy-5'-sulphophenyl)-ms-(2''-sulphophenyl)-formazan, Cu complex | 2,4,6-trifluorotriazine | 1-HO₃S, 2-H₂N, 4-NH₂, 5-SO₃H-phenyl | 600 nm |
| 326 | N-(2-carboxy-5-aminophenyl)-N'-(2'-hydroxy-3'-amino-5'-sulphophenyl)-ms-(2''-sulphophenyl)-formazan, Cu complex | 2,4,6-trifluorotriazine | 2-HO₃S, 1-H₂N(*), 4-NH₂-phenyl | 592 nm |
| 327 | N-(2-carboxy-4-aminophenyl)-N'-(2'-hydroxy-3',5'-disulphophenyl)-ms-(2''-sulphophenyl)-formazan, Cu complex | 2,4,6-trifluorotriazine | 1-HO₃S, 2-H₂N, 4-NH₂, 5-SO₃H-phenyl | 608 nm |

TABLE 19-continued

| No. | D | Trihalogenotriazine | A₄ | λ$_{max}$ |
|---|---|---|---|---|
| 328 | N-(2-carboxy-5-sulphophenyl)-N'-(2'-hydroxy-5'-amino-3'-sulphophenyl)-ms-phenylformazan, Cu complex | | | 634 nm |
| 329 | N-(2-carboxy-5-sulphophenyl)-N'-(2'-hydroxy-5'-amino-3'-sulphophenyl)-ms-phenylformazan, Cu complex | | | 636 nm |
| 330 | N-(2-carboxy-4-sulphophenyl)-N'-(2'-hydroxy-5'-amino-3'-sulphophenyl)-ms-phenylformazan, Cu complex | | | 638 nm |
| 331 | N-(2-carboxy-4-sulphophenyl)-N'-(2'-hydroxy-5'-sulphophenyl)-ms-(3''-aminophenyl)-formazan, Cu complex | | | 622 nm |

EXAMPLE 332

332.1

9.9 g of 2,4-diaminobenzenesulphonic acid are dissolved in 100 ml of water together with LiOH at pH 6.5. 7.6 g of 2,4,6-trifluoropyrimidine are added dropwise to this solution at 35° to 40° C. over a period of 30 minutes and the pH is simultaneously maintained at 6.5 with Li₂CO₃. After 2 hours, 100 g of ice and 1 g of NaF are added. 6.6 g of cyanuric fluoride are added at 0° C., and the pH drops to about 3.7 to 3.8. After 5 minutes, the 2nd condensation is complete and, after filtration, a dark solution of the compound

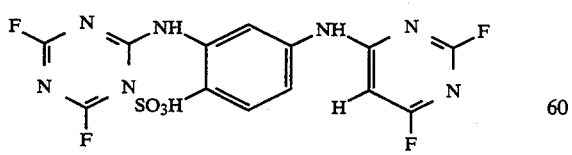

is obtained in the form of its lithium salt.

332.1

10.4 g of 7-amino-4-hydroxy-2-naphthalenesulphonic acid are dissolved in 150 ml of water together with LiOH at pH 7, and the condensation solution from Example 332.1 is added. During this addition, the pH is maintained at 5.5 with Na₂CO₃ solution. After 20 minutes, the pH is raised to 6.5 and, after a further 20 minutes, a suspension of diazotised 1,5-naphthalenedisulphonic acid (14.1 g) is added, and the pH is raised to 6.5.

After 1 hour, the azo coupling is complete, and the dyestuff is salted out, isolated and dried; it has the formula

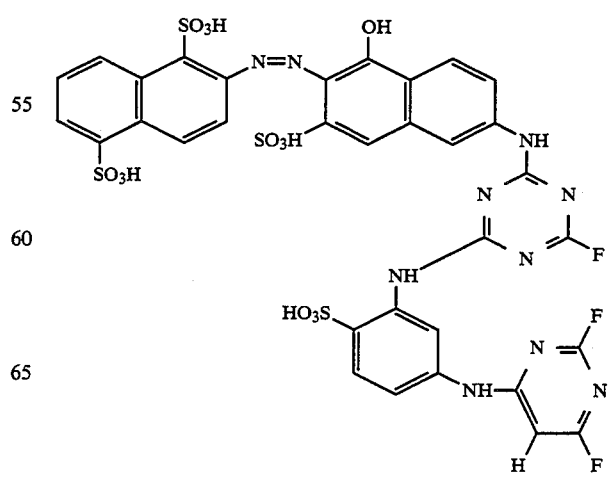

-continued

λmax = 488 nm (H₂O)

and dyes cotton in brilliant orange shades which have very good wet fastness properties.

332.3

A further method of preparing the dyestuff from Example 332.2 consists in condensing the azo dyestuff of the formula

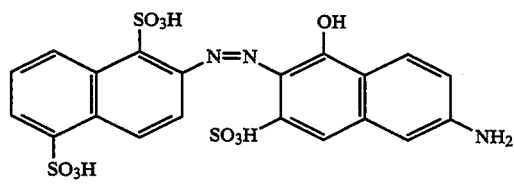

with the reactive component from Example 332.1 at pH 7 to 7.5.

By varying the diazo component (D), coupling component (K) and diamines (W), it is possible to prepare the dyestuff of the general formula

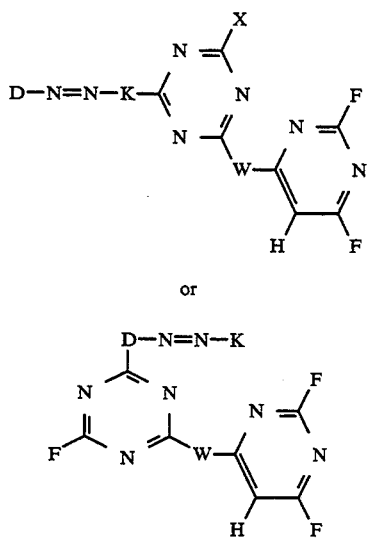

or analogously to Examples 236 and 332; they dye cotton in the hues given.

TABLE 20

| No. | X | D | K | W | Hue λmax (H₂O) |
|-----|---|---|---|---|----------------|
| 333 | F | 2-amino-naphthalene-1,5-disulfonic acid | 8-amino-1-hydroxy-naphthalene-3,6-disulfonic acid | 1,3-diamino-benzene-4-sulfonic acid | bluish red 544 nm |
| 334 | F | 2-amino-benzene-1-sulfonic acid | 8-amino-1-hydroxy-naphthalene-3,6-disulfonic acid | 1,3-diamino-benzene-4-sulfonic acid | yellowish red |
| 335 | F | 2-amino-naphthalene-1,5-disulfonic acid | 8-amino-1-hydroxy-naphthalene-3,6-disulfonic acid | 1,3-diamino-benzene-4-sulfonic acid | bluish red |
| 336 | Cl | 2-amino-naphthalene-1-sulfonic acid | 8-amino-1-hydroxy-naphthalene-3,6-disulfonic acid | 1,3-diamino-benzene-4-sulfonic acid | red |
| 337 | F | 2-amino-naphthalene-1-sulfonic acid | 8-amino-1-hydroxy-naphthalene-3,6-disulfonic acid | 1,3-diamino-benzene-4-sulfonic acid | red |

TABLE 20-continued
| No. | X | D | K | W | Hue λmax (H2O) |
|---|---|---|---|---|---|
| 338 | F | 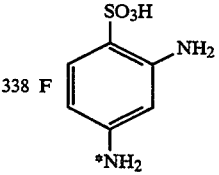 | 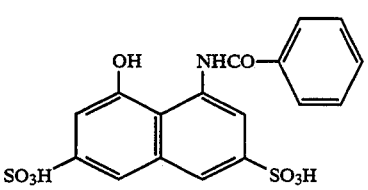 | 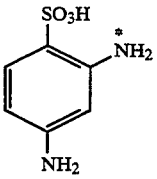 | red 515 nm |
| 339 | F | 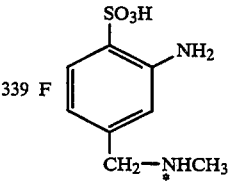 | 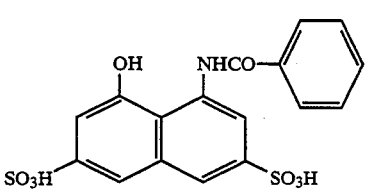 | 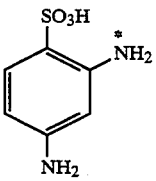 | red |
| 340 | F | 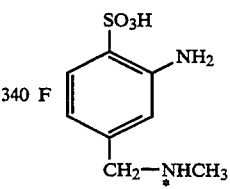 | 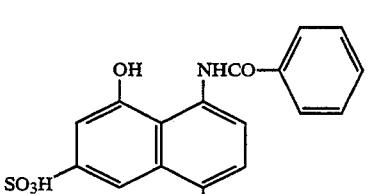 | 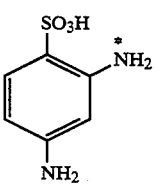 | yellowish red |
| 341 | F | 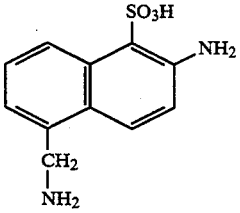 | 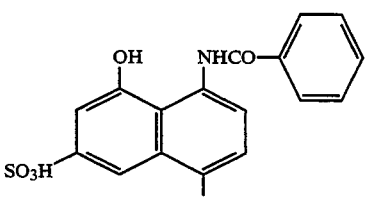 | 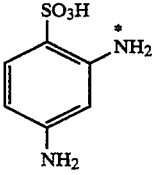 | bluish red 514 nm |
| 342 | F | 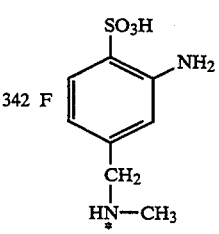 | 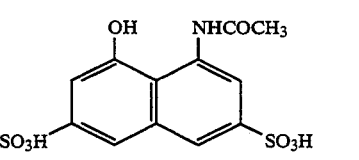 | 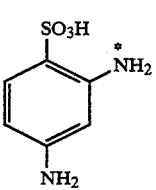 | red 504, 526 nm |
| 343 | F | 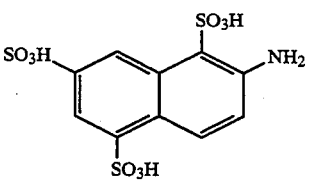 | 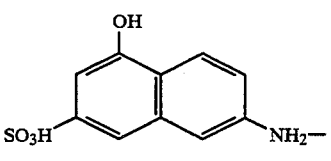 | 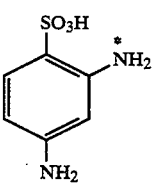 | orange |
| 344 | F | 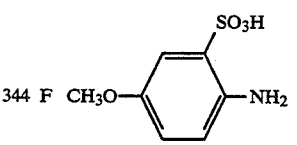 | 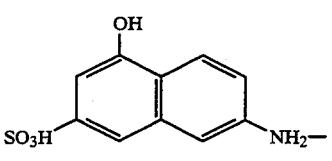 | 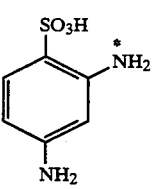 | scarlet 503 nm |

TABLE 20-continued
| No. | X | D | K | W | Hue λ$_{max}$ (H$_2$O) |
|---|---|---|---|---|---|
| 345 | F | 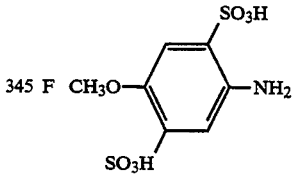 | 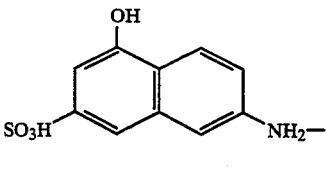 | 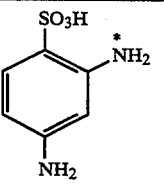 | orange 498 nm |
| 346 | F | 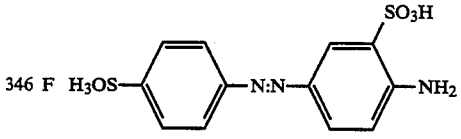 | 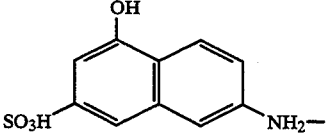 | 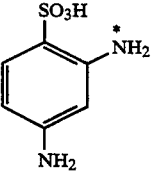 | red |
| 347 | F | 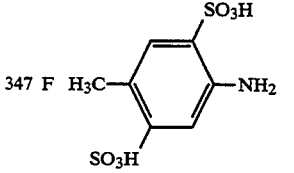 | 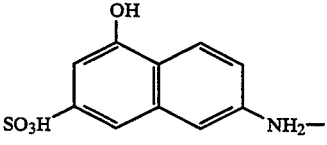 | 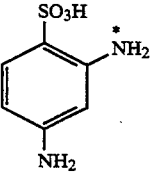 | orange |
| 348 | F | 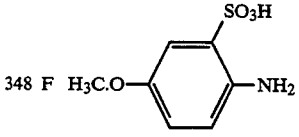 | 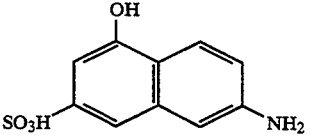 | 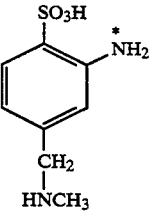 | scarlet 504 nm |
| 349 | F | 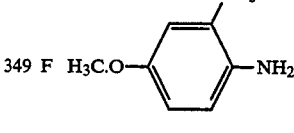 | 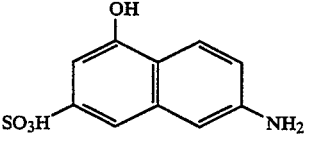 | 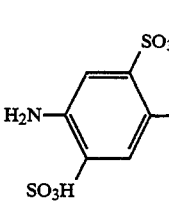 | scarlet 504 nm |
| 350 | F | 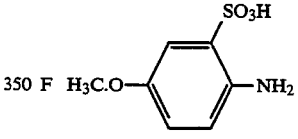 | 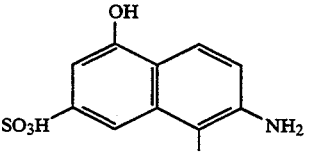 | 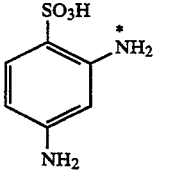 | scarlet |
| 351 | F | 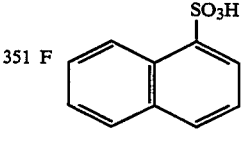 | 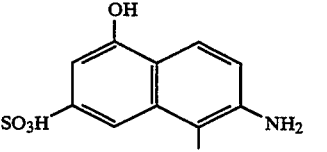 | 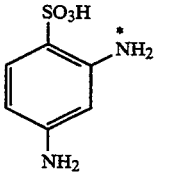 | scarlet |
| 352 | F | 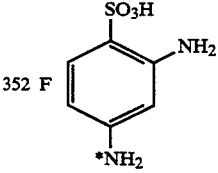 | 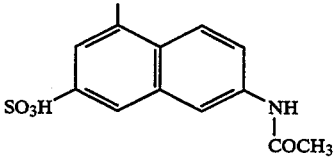 | 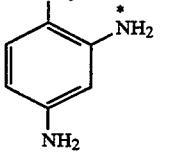 | orange |

TABLE 20-continued

| No. | X | D | K | W | Hue $\lambda_{max}$ (H$_2$O) |
|---|---|---|---|---|---|
| 353 | F | 2-amino-4-amino*-benzenesulphonic acid (SO$_3$H, NH$_2$, *NH$_2$) | 1-hydroxy-naphthalene-3,6-disulphonic acid | 2-amino*-4-amino-benzenesulphonic acid | orange 488 nm |
| 354 | F | 4-amino*-2-amino-benzenesulphonic acid | 1-hydroxy-naphthalene-3,6-disulphonic acid | 2-amino*-4-amino-benzenesulphonic acid | bluish red |
| 355 | F | 2-amino-naphthalene-1,5-disulphonic acid | 8-hydroxy-5-(4-aminobenzoylamino)-naphthalene-2,7-disulphonic acid | 2-amino*-4-amino-benzenesulphonic acid | bluish red |
| 356 | F | 4-amino*-2-amino-benzenesulphonic acid | 1-(4-sulphophenyl)-3-carboxy-5-hydroxy-pyrazole | 2-amino*-4-amino-benzenesulphonic acid | golden yellow $\lambda_{max}$ = 448 nm |

$^{+)}$The N atoms designated by * are connected to the triazinyl radical.

EXAMPLE 357

23.6 g of 7-amino-1,3-naphthalenedisulphonic acid monosodium salt were stirred in 150 ml of water/30 g of ice and 20 ml of concentrated hydrochloric acid, and 17 ml of an aqueous sodium nitrite solution (300 g of Na-NO$_2$/l) were added dropwise at 5° to 10° C. After stirring at 5° to 10° C. for one hour, excess nitrous acid was removed using sulphamic acid.

This cream-coloured suspension was metered into a nuetral solution of the coupling component prepared from 13.5 g of N-(3-aminophenyl)-acetamide hydrochloride, 50 ml of water, 50 g of ice and about 30 ml of a 10% strength aqueous lithium hydroxide solution over a period of 30 minutes. During this addition, the pH of the reaction mixture is kept constant at 6.0 to 6.5 using 20% strength aqueous potassium bicarbonate solution. If possible, the temperature should not exceed 10° C. After addition had been completed, stirring was continued for 30 minutes, during which the pH was further kept constant.

15.2 g of 2,4-diaminobenzenesulphonic acid monosodium salt were stirred in 100 ml of water and dissolved at pH 6 using 10% strength lithium hydroxide solution. The solution was heated to 40° C., and 12 g of 2,4,6-trifluoropyrimidine were added. During this condensation reaction, the pH was kept constant at 5.8 to 6.2 using lithium hydroxide solution. After 2 hours at 40° C., hardly any more change in pH could be observed, and condensation was complete according to HPLC analysis. The precipitated lithium fluoride was separated off by filtration. The mixture was then cooled to 0° C. with about 200 g of ice and reacted at this temperature with 10 g of trifluoro-s-triazine. The pH of the second condensation was kept constant between 6.0 and 6.5 by simultaneously metering in 10% strength lithium hydroxide solution. After 15 minutes at 0° to 2° C., the reaction was complete.

The warm red-brown coupling solution of 8° C. prepared above was metered into this colourless condensation solution at 0° C. over a period of 20 minutes, during which the pH was kept constant between 7.0 and 7.2 using 20% sodium carbonate solution. The mixture was heated to 25° C. at a constant pH of 7.0 to 7.2 over a period of 3 hours. After an additional stirring phase of one hour, the reaction was complete. The dyestuff solution was clarified, in order to separate off insoluble components, such as lithium fluoride, and salted out with 50 g of sodium chloride. The precipitated dyestuff was filtered off with suction and dried, giving 61 g of an orange-red powder ($\lambda_{max}$=406 nm (H$_2$O)), which has the structure

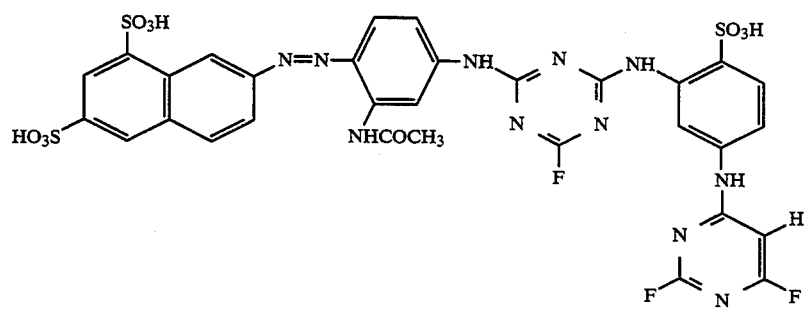

and dyes cotton in golden yellow dyeings having excellent fastness properties.

By varying the diazo component D—NH$_2$, the coupling component containing R$^1$ and R$^2$ and the diamino compound, further valuable golden yellow reactive dyestuffs of the formula

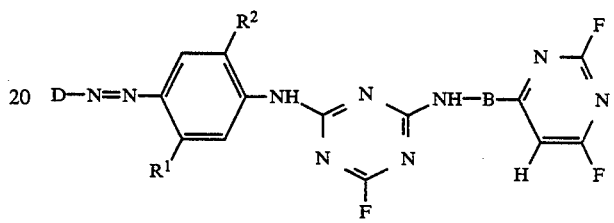

were available in analogy to Example 357, for example those listed in Table 21 below.

TABLE 21

| Ex. | D | R$^1$ | R$^2$ | B*) | $\lambda_{max}$ (H$_2$O) |
|---|---|---|---|---|---|
| 358 | 7-substituted naphthalene-1,3-disulfonic acid (SO$_3$H, HO$_3$S) | CH$_3$ | H | 2-methyl-4-amino-benzenesulfonic acid (SO$_3$H, NH—) | |
| 359 | 7-substituted naphthalene-1,3-disulfonic acid (SO$_3$H, HO$_3$S) | H | OCH$_3$ | 2-methyl-4-amino-benzenesulfonic acid (SO$_3$H, NH—) | |
| 360 | 7-substituted naphthalene-1,3-disulfonic acid (SO$_3$H, HO$_3$S) | NHCONH$_2$ | H | 2-methyl-4-amino-benzenesulfonic acid (SO$_3$H, NH—) | |
| 361 | 7-substituted naphthalene-1,3-disulfonic acid (SO$_3$H, HO$_3$S) | NHCOCH$_2$OH | H | 2-methyl-4-amino-benzene-1,5-disulfonic acid (SO$_3$H, NH—, SO$_3$H) | 408 nm |
| 362 | 7-substituted naphthalene-1,3-disulfonic acid (SO$_3$H, HO$_3$S) | NHCOCH$_2$OSO$_3$H | H | 2-methyl-4-(N-methylamino)-benzenesulfonic acid (SO$_3$H, —NCH$_3$) | 412 nm |

TABLE 21-continued

| Ex. | D | R¹ | R² | B*) | $\lambda_{max}$ (H$_2$O) |
|---|---|---|---|---|---|
| 363 | 1,5-naphthalenedisulfonic acid (3-methyl) | CH$_3$ | H | 2-methyl-4-amino-benzenesulfonic acid (NH-) | |
| 364 | 1,5-naphthalenedisulfonic acid (3-methyl) | H | OCH$_3$ | 2-methyl-4-amino-benzenesulfonic acid (NH-) | |
| 365 | 1,5-naphthalenedisulfonic acid (3-methyl) | OCH$_3$ | CH$_3$ | 2-methyl-4-amino-benzenesulfonic acid (NH-) | |
| 366 | 1,5-naphthalenedisulfonic acid (3-methyl) | NHCOCH$_3$ | H | 2-methyl-4-amino-benzenesulfonic acid (NH-) | |
| 367 | 1,5-naphthalenedisulfonic acid (3-methyl) | NHCOCH$_3$ | H | 2-methyl-4-(N-methylamino)-benzenesulfonic acid (-NCH$_3$) | |
| 368 | 1,5-naphthalenedisulfonic acid (3-methyl) | NHCONH$_2$ | H | 2-methyl-4-amino-benzenesulfonic acid (NH-) | |
| 369 | 1,5-naphthalenedisulfonic acid (3-methyl) | NHCOCH$_3$ | H | 2-methyl-4-(dimethylaminomethyl)-benzenesulfonic acid (CH$_2$-NCH$_3$) | |
| 370 | 2,6-naphthalenedisulfonic acid with additional SO$_3$H (3-methyl, trisulfonic) | NHCOCH$_3$ | H | 2-methyl-4-amino-benzenesulfonic acid (NH-) | 408 nm |

TABLE 21-continued

| Ex. | D | R¹ | R² | B*) | $\lambda_{max}$ (H₂O) |
|---|---|---|---|---|---|
| 371 | 1,6,7-naphthalene with SO₃H (1), HO₃S (6), SO₃H (7) | NHCONH₂ | H | 4-SO₃H-3-methylphenyl-NH— | 426 nm |
| 372 | 1,6,7-naphthalene trisulfonic acid | NHCOCH₃ | H | 3-SO₃H-4-methylphenyl-NH— | 410 nm |
| 373 | 1,6,7-naphthalene trisulfonic acid | NHCONH₂ | H | 3-SO₃H-4-methylphenyl-NH— | 429 nm |
| 374 | 1,6,7-naphthalene trisulfonic acid | NHCOCH₃ | H | 4-SO₃H-3-methyl-benzyl-N(CH₃)— | |
| 375 | 1,6,7-naphthalene trisulfonic acid | NHCONH₂ | H | 4-SO₃H-3-methyl-benzyl-N(CH₃)— | |
| 376 | 1,6,7-naphthalene trisulfonic acid | NHCONH₂ | H | 2,5-di-SO₃H-4-methylphenyl-NH— | |
| 377 | 1,5,7-naphthalene trisulfonic acid | NHCOCH₃ | H | 4-SO₃H-3-methylphenyl-NH— | |
| 378 | 1,5,7-naphthalene trisulfonic acid | NHCONH₂ | H | 4-SO₃H-3-methylphenyl-NH— | |
| 379 | 2,4-disulfo-toluene | NHCOCH₃ | H | 4-SO₃H-3-methylphenyl-NH— | 391 nm |

TABLE 21-continued

| Ex. | D | R¹ | R² | B*) | $\lambda_{max}$ (H₂O) |
|---|---|---|---|---|---|
| 380 | 2,4-disulfo-methylbenzene (SO₃H, HO₃S, CH₃) | NHCONH₂ | H | 2-methyl-4-(NH-)-benzenesulfonic acid | 395 nm |
| 381 | 2,4-disulfo-methylbenzene | NHCOCH₂OH | H | 2-methyl-4-(NH-)-benzenesulfonic acid | 392 nm |
| 382 | 2,4-disulfo-methylbenzene | NHCOCH₃ | H | 4-methyl-3-sulfo-(NH-)-benzene | 394 nm |
| 383 | 2,4-disulfo-methylbenzene | NHCONH₂ | H | 4-methyl-3-sulfo-(N-CH₃)-benzene | |
| 384 | 2,4-disulfo-methylbenzene | NHCOCH₃ | H | 2,5-dimethyl-4-sulfo-(NH-)-benzene | 392 nm |
| 385 | 2,5-disulfo-methylbenzene | NHCOCH₃ | H | 2-methyl-4-(NH-)-benzenesulfonic acid | |
| 386 | 2,5-disulfo-methylbenzene | NHCONH₂ | H | 2-methyl-4-(NH-)-benzenesulfonic acid | |
| 387 | 2,5-disulfo-methylbenzene | NHCONH₂ | H | 2-methyl-4-(CH₂-NCH₃)-benzenesulfonic acid | |

TABLE 21-continued

| Ex. | D | R¹ | R² | B*) | $\lambda_{max}$ (H₂O) |
|---|---|---|---|---|---|
| 388 | HO₃S—⟨phenyl⟩— | NHCOCH₂OSO₃H | H | SO₃H, CH₃, —NH— on phenyl | |

*)The pyrimidinyl radical is always bound to the N atom of B.

If trifluorotriazine in Example 357 and the examples of Table 21 is replaced by cyanuric chloride, comparable golden yellow bifunctional reactive dyestuffs having excellent fastness properties are obtained which only differ in the dyeing temperature which is 20° C. higher.

EXAMPLE 389

A neutral aqueous solution of 30.9 g of 2-amino-3,6,8-naphthalenetrisulphonic acid disodium salt and 6 g of sodium nitrite in 200 ml of water was metered into a mixture of 40 ml of concentrated hydrochloric acid, 50 g of ice and 50 ml of water over a period of 15 minutes. After stirring at 5° to 10° C. for another 30 minutes, diazotisation was complete. The nitrite excess was removed using sulphamic acid.

This suspension was added to a neutral suspension of the coupling component prepared from 13.5 g of N-(3-aminophenyl)-urea and 100 ml of water over a period of 30 minutes. During this addition, the pH of the reaction mixture was kept constant at 6.0 to 6.5 using 20% strength aqueous potassium bicarbonate solution. If possible, the temperature should not exceed 15° C. After addition had been completed, stirring was continued for 15 minutes, during which the pH of the orange-red solution was further kept constant.

Ice was added to this red-brown coupling solution until a temperature of 0° C. was reached. 12 g of cyanuric fluoride was swiftly added and the pH was simultaneously kept constant at 6.0 to 6.2 by addition of a 20% strength potassium bicarbonate solution. Condensation was complete after 10 minutes. The pH was brought to 5.8 with a few drops of hydrochloric acid, and a solution of 5.8 g of 1,2-diaminopropane in 10 ml of water which was likewise brought to a pH of 5.8 with hydrochloric acid was added to this solution. The red reaction mixture was then heated to 20° C. over a period of 2 hours, during which the pH was maintained at 5.8 to 5.9 with potassium bicarbonate solution. For a short period, this resulted in a solution from which, during an additional stirring phase of one hour, an orange-red precipitate was formed at a pH of 6.0 to 6.1. This dyestuff intermediate was filtered off with suction, and the isolated moist paste was stirred in 200 ml of water at pH 6.0. 12 g of 2,4,6-trifluoropyrimidine were added, the mixture was heated to 45° C. and condensed at pH 7.5 to 8.0. pH control was carried out by means of sodium carbonate solution. Condensation was complete after about 2 hours. The dyestuff solution was filtered until clear, and the dyestuff was salted out with 25 g of common salt. Filtering off with suction and drying gave 58 g of an orange-red powder ($\lambda_{max}$=428 nm (H₂O)), which has the structure

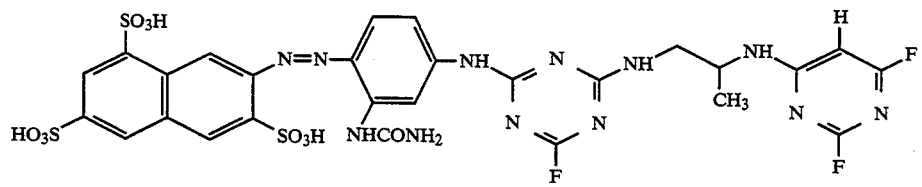

and dyes cotton in reddish yellow hues.

By varying the diazo component D—NH₂, the coupling component containing R¹ and the aliphatic diamino compound, further valuable yellow to golden yellow hues of the following structure could be prepared analogously to Example 389.

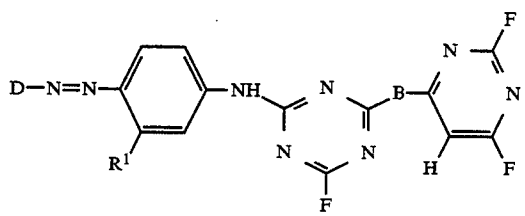

TABLE 22

| Ex. | D | R¹ | B*) | $\lambda_{max}$ (H₂O) |
|---|---|---|---|---|
| 390 | HO₃S—⟨naphthyl-SO₃H⟩— | CH₃ | * —NH—CH₂CH₂NH— | |

| Ex. | D | R¹ | B*) | λ$_{max}$ (H$_2$O) |
|---|---|---|---|---|
| 391 | naphthalene-1,6-disulfonic acid, 7-methyl (SO$_3$H at 1, HO$_3$S at 6, methyl at 7) | OCH$_3$ | —NH—CH$_2$—CH(CH$_3$)—NH—* | |
| 392 | naphthalene-1,6-disulfonic acid, 7-methyl | NHCOCH$_3$ | —NH—CH$_2$—CH(CH$_3$)—NH—* | |
| 393 | naphthalene-1,6-disulfonic acid, 7-methyl | NHCOCH$_2$OSO$_3$H | —NH—CH$_2$—CH(CH$_3$)—NH—* | 408 nm |
| 394 | naphthalene-1,6-disulfonic acid, 7-methyl | NHCOCH$_3$ | —N(piperazine)N—* | |
| 395 | naphthalene-1,5-disulfonic acid, 7-methyl | NHCOCH$_3$ | —NH—CH$_2$—CH(CH$_3$)—NH—* | |
| 396 | naphthalene-1,5-disulfonic acid, 7-methyl | NHCOCH$_3$ | —NH—CH$_2$—CH(OH)—CH$_2$—NH* | |
| 397 | naphthalene-1,5-disulfonic acid, 7-methyl | NHCONH$_2$ | —NHCH$_2$CH$_2$NH—* | |
| 398 | naphthalene-1,3,6-trisulfonic acid, 7-methyl | NHCOCH$_3$ | —NHCH$_2$CH$_2$NH—* | 412 nm |
| 399 | naphthalene-1,3,6-trisulfonic acid, 7-methyl | NHCOCH$_2$OH | —NHCH$_2$CH$_2$NH—* | 410 nm |
| 400 | naphthalene-1,3,6-trisulfonic acid, 7-methyl | NHCOCH$_3$ | —NHCH$_2$—CH(CH$_3$)—NH—* | 412 nm |

TABLE 22-continued

| Ex. | D | R¹ | B*) | $\lambda_{max}$ (H$_2$O) |
|---|---|---|---|---|
| 401 | 1,6,7-trisulfo-3-methyl-naphthalene (SO₃H at 1,6; SO₃H at 7; CH₃ at 3) | NHCOCH₃ | —N(piperazine)N—* | 416 nm |
| 402 | same | NHCOCH₃ | —N(piperazine)NCH₂CH₂—NH—* | 410 nm |
| 403 | same | NHCOCH₃ | NH—(CH₂)₄—CH(CO₂H)—NH—* | |
| 404 | same | NHCOCH₃ | NH—(CH₂)₃—NH—* | 412 nm |
| 405 | same | NHCOCH₃ | —N(CH₃)—(CH₂)₃—NH—* | |
| 406 | same | NHCONH₂ | —NH—CH₂CH₂—NH—* | 426 nm |
| 407 | same | NHCONH₂ | —NHCH₂CH(OH)CH₂—NH—* | 428 nm |
| 408 | same | NHCONH₂ | —N(piperazine)N—* | 432 nm |
| 409 | same | NHCONH₂ | —N(piperazine)NCH₂CH₂—NH—* | 416 nm |
| 410 | 4,7-disulfo-3-methyl-1-sulfonaphthalene | NHCOCH₃ | —NHCH₂CH(CH₃)NH—* | |

TABLE 22-continued

| Ex. | D | R¹ | B*) | $\lambda_{max}$ (H₂O) |
|---|---|---|---|---|
| 411 | naphthalene with SO₃H, HO₃S, SO₃H | NHCONH₂ | —NHCH₂CH(CH₃)NH—* | |
| 412 | benzene with SO₃H, HO₃S | NHCOCH₃ | —NHCH₂CH₂NH—* | 396 nm |
| 413 | benzene with SO₃H, HO₃S | NHCOCH₃ | —NHCH₂CH(CH₃)NH—* | 397 nm |
| 414 | benzene with SO₃H, HO₃S | NHCONH₂ | —NHCH₂CH(CH₃)NH—* | 410 nm |
| 415 | benzene with SO₃H, SO₃H | NHCOCH₃ | —NHCH₂CH(CH₃)NH—* | |
| 416 | benzene with SO₃H, SO₃H | NHCONH₂ | piperazinyl —N⟨⟩N—* | |
| 417 | benzene with SO₃H, SO₃H | NHCONH₂ | —NH—(CH₂)—N(CH₃)—* | |

*)The pyrimidinyl radical is always bound to the N atom marked with *.

If trifluorotriazine in Example 389 and the examples of Table 22 is replaced by cyanuric chloride, golden yellow reactive dyestuffs which have comparably excellent fastness properties, such as

EXAMPLE 418

EXAMPLE 419

As described in Example 357, 15.2 g of monosodium 2,4-diaminobenzenesulphonate were first condensed with 12 g of 2,4,6-trifluoropyrimidine and then with 10 g of trifluoro-s-triazine (cyanuric fluoride).

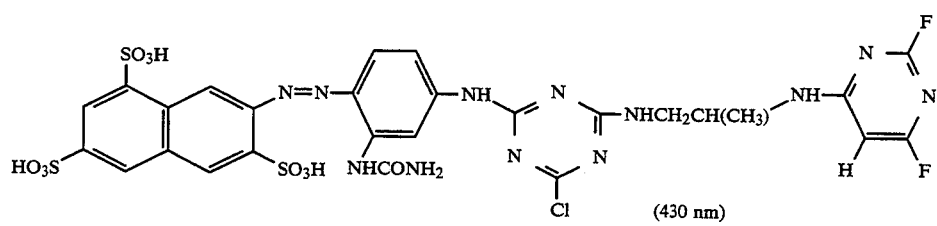

(430 nm)

30 g of the dyestuff base of the formula

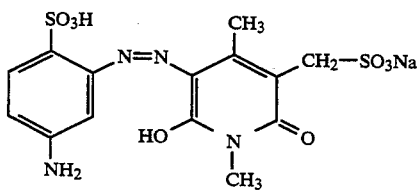

were added to this solution at 0° C. and pH 6.0 to 6.2, and the pH was then kept constant at 7.0 with 20% strength sodium carbonate solution. The mixture was heated to 25° C. at pH 7.0 to 7.2 over a period of 3 hours. The dyestuff solution was clarified by filtration, and 50 g of sodium chloride were added. The mixture was stirred for 1 hour, and the precipitated dyestuff was isolated by filtering it off with suction.

Drying and milling gave about 60 g of a yellow powder ($\lambda_{max}$=424 nm ($H_2O$)) which has the structure

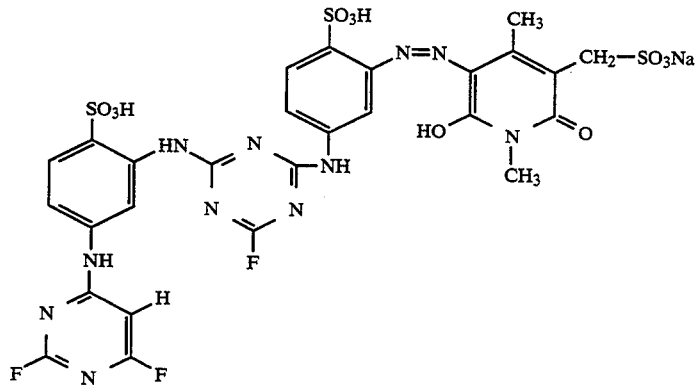

and dyes cotton in brilliant greenish yellow shades.

By varying the pyridone coupling component and the diamino compound, the following further greenish yellow dyestuffs can be prepared analogously to Example 357 and 389:

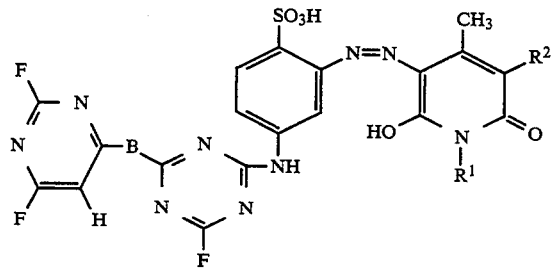

TABLE 23

| Ex. | B | R[1] | R[2] |
|---|---|---|---|
| 419 | —HN—C6H3(SO3H)—*NH— | $C_2H_5$ | $CH_2$—$SO_3H$ |
| 420 | —HN—C6H3(SO3H)—*NH— | $CH_2CH_2SO_3H$ | H |
| 421 | —HN—C6H3(SO3H)—*NH— | $CH_2CH_2SO_3H$ | $CONH_2$ |
| 422 | —HN—C6H3(SO3H)—*NH— | $CH_3$ | $CH_2$—$SO_3H$ |

TABLE 23-continued

| Ex. | B | $R^1$ | $R^2$ |
|---|---|---|---|
| 423 | 2-HN-, 5-NH-* benzene with SO₃H at position adjacent to HN | $C_2H_5$ | $CH_2-SO_3H$ |
| 424 | piperazine (—N N—*) | $C_2H_5$ | $CH_2-SO_3H$ |
| 425 | piperazine (—N N—*) | $CH_3$ | $CH_2-SO_3H$ |
| 426 | NH—CH₂—CH₂—NH* | $CH_3$ | $CH_2-SO_3H$ |
| 427 | NH—CH₂—CH₂—NH* | $CH_2CH_2SO_3H$ | H |

The N atoms designated by * are bound to the pyrimidinyl radical.

If the dyestuff base in Example 419 is replaced by a comparable pyrazolone chromophore, dyestuffs such as

EXAMPLE 428

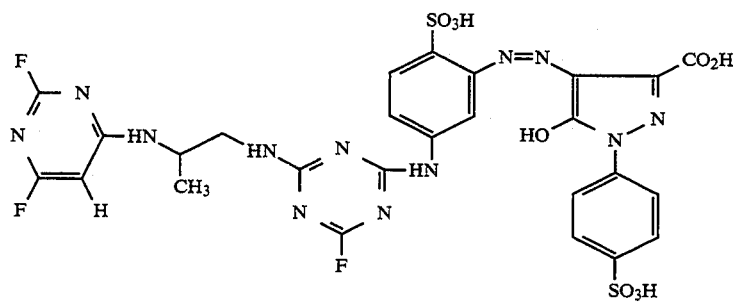

which dyes cotton in clear yellow shades ($\lambda_{max}$=448 nm (H₂O)) can also be prepared.

If the aminoazo compounds listed in Table 24 below are reacted analogously to Example 332.3 under suitable conditions with the reactive component from Example 332.1, dyestuffs are obtained which dye cotton in the hues mentioned.

TABLE 24

| Ex. | Aminoazo compound | Hue |
|---|---|---|
| 429 | Cu-complex azo naphthalene structure with SO₃H groups and NH₂ | dark red |
| 430 | Cu-complex azo naphthalene structure with SO₃H groups and NH₂ (isomer) | dark red |

TABLE 24-continued

| Ex. | Aminoazo compound | Hue |
|---|---|---|
| 431 | | dark red |
| 432 | | dark red |
| 433 | | dark red |
| 434 | | dark red |
| 435 | | dark red |
| 436 | | dark red |
| 437 | | dark red |
| 438 | | dark red |

TABLE 24-continued

| Ex. | Aminoazo compound | Hue |
|---|---|---|
| 439 | [Cu complex: 4-amino-2-hydroxy-6-sulfophenyl azo to 1-hydroxy-4,8-disulfonaphthalene] | dark red |
| 440 | [Cu complex: 4-amino-2-hydroxy-6-sulfophenyl azo to 1-hydroxy-3,6-disulfonaphthalene] | dark red |
| 441 | [Cu complex: 2-hydroxy-4-sulfo-5-methylphenyl azo to 1-hydroxy-3-sulfo-6-aminonaphthalene] | dark red |
| 442 | [Cu complex: 2-hydroxy-4-methoxy-5-sulfophenyl azo to 1-hydroxy-3-sulfo-7-aminonaphthalene] | dark red |
| 443 | [Cu complex: 2-hydroxy-4-sulfo-5-methoxyphenyl azo to 1-hydroxy-4,8-disulfo-6-aminonaphthalene] | red-violet |
| 444 | [Cu complex: 2-hydroxy-5-sulfophenyl azo to 1-hydroxy-4,8-disulfo-6-aminonaphthalene] | dark red |
| 445 | [Cu complex: 2-hydroxy-5-sulfophenyl azo to 1-hydroxy-3,8-disulfo-7-aminonaphthalene] | dark red |

1:2 Cr complex of

| 446 | [2-hydroxy-5-nitrophenyl azo to 1-hydroxy-3,6-disulfo-8-aminonaphthalene] | grey-blue (black) |

TABLE 24-continued

| Ex. | Aminoazo compound | Hue |
|---|---|---|
| 1:2 Co complex of | | |
| 447 | [structure] | yellow-brown |
| 448 | [structure] | blue |
| 449 | [structure] | blue |
| 450 | [structure] | blue |
| 451 | [structure] | blue |
| 452 | [structure] | navy |

If the condensation products obtained according to Example 332.2 or 332.3 from the aminoazo compounds listed in Table 25 below are reacted with the reactive component from Example 332.1 in a known manner at pH 5 to 7 and 20° C. to 60° C. in aqueous solution with equimolar amounts of hydrogen peroxide, copper complex dyestuffs are obtained which dye cotton in the hues mentioned, for example from the aminoazo compound from Example 453 the dyestuff of the formula
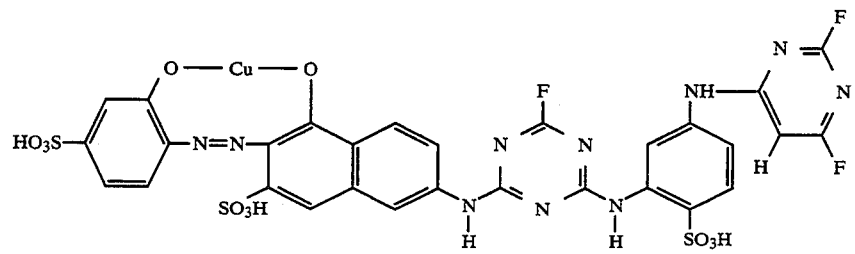
TABLE 25
| Ex. | Aminoazo compound | Hue |
|---|---|---|
| 453 | | dark red |
| 454 | | dark red |
| 455 | | dark red |
| 456 | | dark red |
| 457 | | blue |
| 458 | | blue |
| 459 | | blue |

TABLE 25-continued
| Ex. | Aminoazo compound | Hue |
|---|---|---|
| 460 | | blue |
| 461 | | navy |
If aminodisazo dyestuffs of the general formula
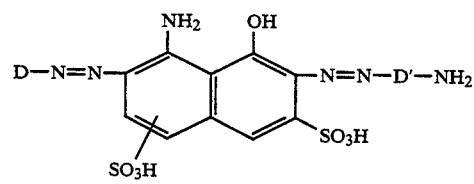
are reacted with the reactive component from Example 332.1 analogously to Example 332, dyestuffs of the general formula of Table 26
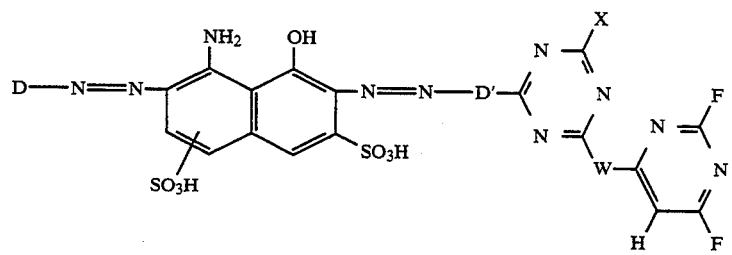
are obtained which dye cotton in the hues mentioned.
TABLE 26
| No. | Y | D | K | D' | W | Hue |
|---|---|---|---|---|---|---|
| 462 | F | | | | | Black |
| 463 | F | | | | | Navy/Black |
| 464 | F | | | | | Navy/Black |

TABLE 26-continued

| No. | Y | D | K | D' | W | Hue |
|---|---|---|---|---|---|---|
| 465 | F | 2-amino-naphthalene-1,5-disulfonic acid | 8-amino-1-hydroxy-naphthalene-3,6-disulfonic acid | 2,4-diamino-benzenesulfonic acid (*NH₂ at 4) | 2,4-diamino-benzenesulfonic acid (*NH₂ at 2) | Black |
| 466 | F | 4-amino-benzenesulfonic acid | 8-amino-1-hydroxy-naphthalene-3,6-disulfonic acid | 3-amino-4-sulfo-benzyl-N-methylamine | 2,4-diamino-benzenesulfonic acid (*NH₂ at 2) | Navy |
| 467 | F | 4-amino-benzenesulfonic acid | 8-amino-1-hydroxy-naphthalene-5,7-disulfonic acid | 2,4-diamino-benzenesulfonic acid (*NH₂ at 4) | 2,4-diamino-benzenesulfonic acid (*NH₂ at 2) | Navy |
| 468 | F | 2-amino-5-chloro-benzenesulfonic acid | 8-amino-1-hydroxy-naphthalene-5,7-disulfonic acid | 2,4-diamino-benzenesulfonic acid (*NH₂ at 4) | 2,4-diamino-benzenesulfonic acid (*NH₂ at 2) | Navy |

⁺⁾The N atoms designated by * are linked to the triazinyl radical

The following dyestuffs which dye cotton in the hues mentioned

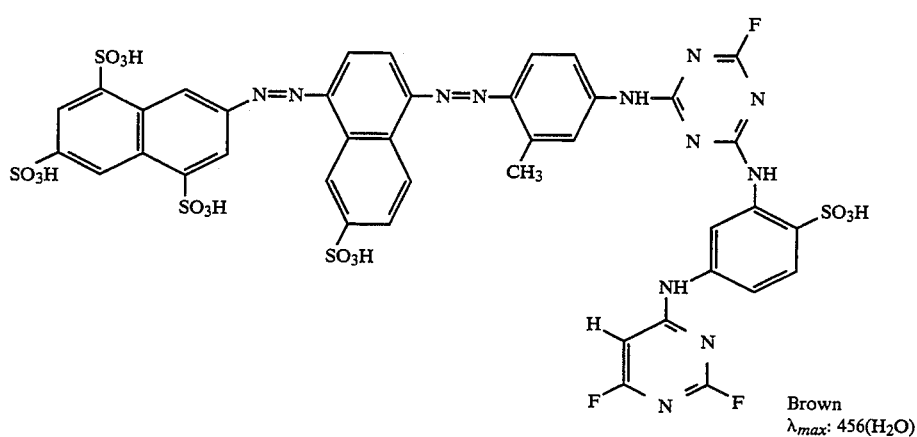

469

Brown
$\lambda_{max}$: 456(H₂O)

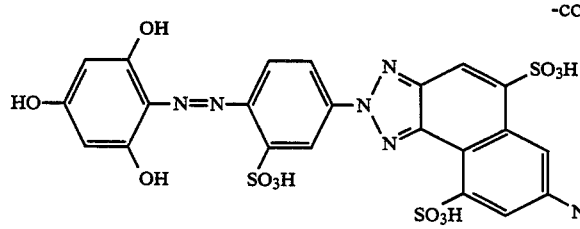

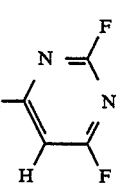

470

Yellow can be prepared analogously to Example 332.3.

We claim:

1. (Once amended) A reactive dyestuff of the formula (I)

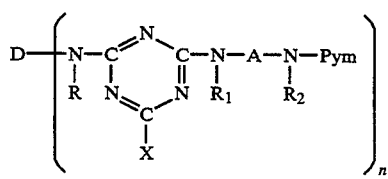

in which
D denotes the radical of an organic dyestuff excluding one containing a group of the formula $SO_2X$ wherein X is $-CH=CH_2$ or $-CH_2-CH_2-Y$ wherein Y is a group which can be eliminated by alkali, R, $R_1$ and $R_2$, independently of one another, denote hydrogen, or substituted or unsubstituted $C_{1-4}$-alkyl, A denotes a substituted or unsubstituted aliphatic, aromatic or aromatic-aliphatic bridging member, X denotes Cl or F, Pym denotes the radical

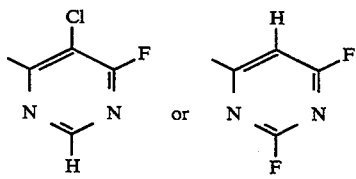

and
n denotes 1 or 2.

2. A reactive dyestuff according to claim 1 of the formula (1a)

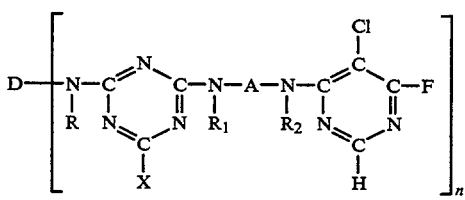

in which

D, R, $R_1$, $R_2$, A, X and n have the meaning given in claim 1.

3. A reactive dyestuff according to claim 1 of the formula (1b)

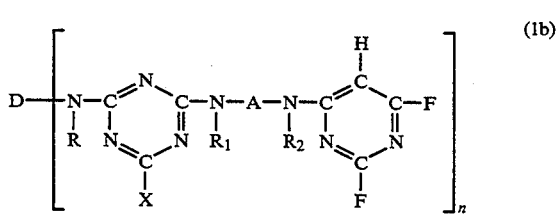

in which

D, R, $R_1$, $R_2$, A, X and n have the meaning given in claim 1.

4. A reactive dyestuff according to claim 1, characterised in that D is the radical of a sulpho-containing organic dyestuff from the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarboximide series.

5. A reactive dyestuff according to claim 1, characterised in that R is methyl, ethyl, propyl, isopropyl, butyl, isobutyl, sec.-butyl, tert.-butyl, β-chloroethyl, β-hydroxyethyl, β-hydroxybutyl, β-cyanoethyl, β-sulphatoethyl, carboxymethyl, sulphomethyl or hydrogen.

6. A reactive dyestuff according to claim 1, characterised in that $R_1$ and $R_2$, independently of one another, are hydrogen, methyl, ethyl, β-hydroxyethyl, β-sulphatoethyl.

7. A reactive dyestuff according to claim 1, characterised in that A is an alkylene radical having 2 to 6 carbon atoms, a naphthylene radical, the radical of a diphenyl or stilbene or a phenylene radical, in which the radical A is unsubstituted or substituted by fluorine, chlorine or bromine, alkyl groups having 1 to 4 carbon atoms, alkoxy groups having 1 to 4 carbon atoms, carboxyl, hydroxyl or sulpho.

8. A reactive dyestuff according to claim 1, characterised in that a) D is the radical of a sulpho-containing organic dyestuff from the mono- or polyazo, metal complexazo, anthraquinone, phthalocyanine, formazan or dioxazine series excluding one containing a group of the formula $SO_2X$ wherein X is —CH=CH₂ or —CH₂—CH₂—Y wherein Y is a group which can be eliminated by alkali, n is 1 or 2, X is Cl or F, R represents hydrogen, methyl or ethyl, R₁, R₂ independently of one another, represent H or C₁-C₄-alkyl which may be substituted by OR, OSO₃H, SO₃H, COOR or halogen, A represents a substituted or unsubstituted phenylene or a substituted or unsubstituted aromatic-aliphatic bridging member or a straight-chain or branched C₁-C₆-alkylene which may be interrupted by hetero atoms or groupings containing hetero atoms such as NR, O or S and which may be substituted by OR, OSO₃H, SO₃H, COOR or halogen, or b) A, n, D, R, R₁ and R₂ have the meaning as in a) and X is F.

9. A reactive dyestuff according to claim 1, selected from the group consisting of c) a reactive dyestuff having the formula

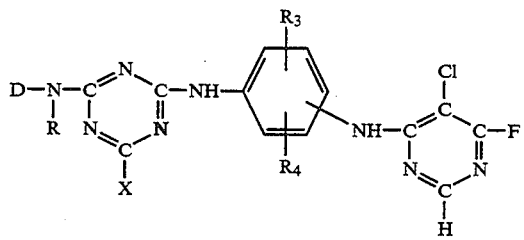
(2)

in which

D is the radical of a sulpho-containing organic dyestuff from the mono- or polyazo, metal complexazo, anthraquinone, phthalocyanine, formazan or dioxazine series excluding one containing a group of the formula SO₂X wherein X is —CH=CH₂ or —CH₂—CH₂—Y wherein Y is a group which can be eliminated by alkali, X is Cl or F, R represents hydrogen, methyl or ethyl, and R₃ and R₄, independently of one another, are hydrogen, methyl, ethyl, methoxy, ethoxy, chlorine, carboxyl or sulpho;

d) a reactive dyestuff according to c), in which

D and R have the same meanings as in c) and

R₃ and R₄, independently of one another, are hydrogen or sulpho;

e) a reactive dyestuff of the formula

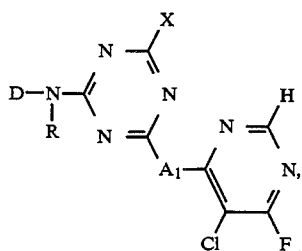
(3)

in which

D, X and R have the same meanings as mentioned in c) and

A₁ represents an aliphatic, straight-chain or branched C₁-C₆-diaminoalkylene which is optionally interrupted by NR₁, O or S and which may be substituted by OR, OSO₃H, SO₃H, COOR or halogen, and R₁ has the same meaning as mentioned in c);

f) a reactive dyestuff of the formula

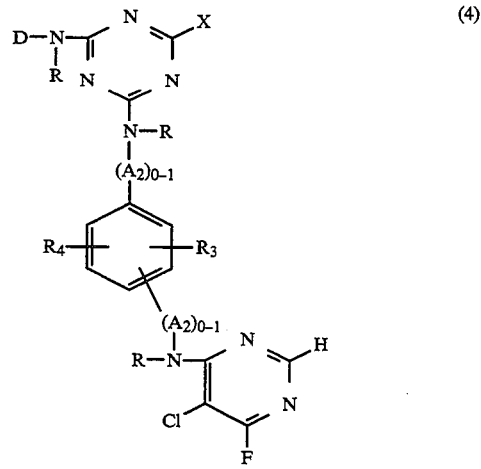
(4)

in which

D, X and R have the same meanings as mentioned in c) and

R₃ and R₄, independently of one another, are H, methyl, ethyl or sulpho, and

A₂ represents an aliphatic, straight-chain or branched C₁-C₆ bridging member which is optionally interrupted by NR₁, O or S and may be substituted by OR, OSO₃H, SO₃H, COOR or halogen; and g) a reactive dyestuff according to c), d), e) and f), in which X represents F.

10. A reactive dyestuff according to claim 1, selected from the group consisting of h) a reactive dyestuff of the formula

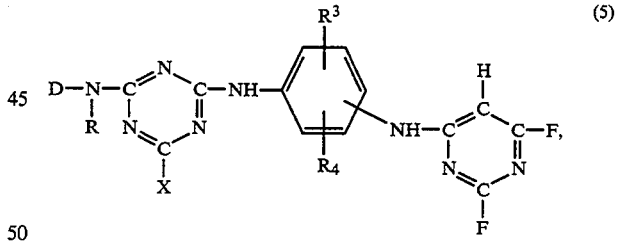
(5)

in which

D is the radical of a sulpho-containing organic dyestuff from the mono- or poly-azo, metal complexazo, anthraquinone, phthalocyanine, formazan or dioxazine series excluding one containing a group of the formula SO₂X wherein X is —CH=CH₂ or —CH₂—CH₂—Y wherein Y is a group which can be eliminated by alkali, X is Cl or F, R represents hydrogen, methyl or ethyl, and R₃ and R₄, independently of one another, are hydrogen, methyl, ethyl, methoxy, ethoxy, chlorine, carboxyl or sulpho.

i) a reactive dyestuff according to h), in which

D and R have the same meanings as in h) and

R₃ and R₄, independently of one another, are hydrogen or sulpho.

j) a reactive dyestuff of the formula

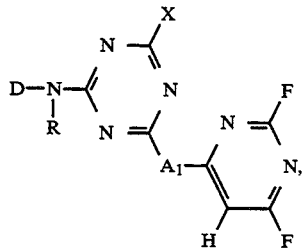
(6)

in which

D, X and R have the same meanings as mentioned in h)

$A_1$ represents aliphatic, straight-chain or branched $C_1-C_6$-diaminoalkylene which may be is optionally interrupted by $NR_1$, O or S and may be substituted by OR, $OSO_3H$, $SO_3H$, COOR or halogen, and $R_1$ has the same meaning as mentioned in h);

k) a reactive dyestuff of the formula

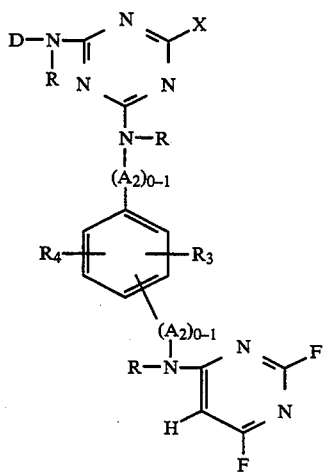
(7)

in which

D, X and R have the same meanings as mentioned in h), $R_3$ and $R_4$, independently of one another, are H, methyl, ethyl or sulpho, and $A_2$ represents an aliphatic, straight-chain or branched $C_1-C_6$ bridging member which is optionally interrupted by $NR_1$, O or S and may be substituted by OR, $OSO_3H$, $SO_3H$, COOR or halogen, and l) a reactive dyestuff according to h), i), j) and k), in which X represents F.

11. A reactive dyestuff according to claim 8 wherein X is F.

12. A reactive dyestuff according to claim 1 wherein any sulphur-containing end groups on D are selected from the group consisting of sulpho ($-SO_3H$), sulphamoyl, or sulphomethyl.

13. A process for the dyeing and printing of natural and synthetic OH- or amido-containing materials, by applying thereto at least one dyestuff according to claim 1.

* * * * *